Feb. 7, 1939.  L. H. KING  2,145,881
DUMPING DEVICE
Filed July 6, 1929 26 Sheets-Sheet 10
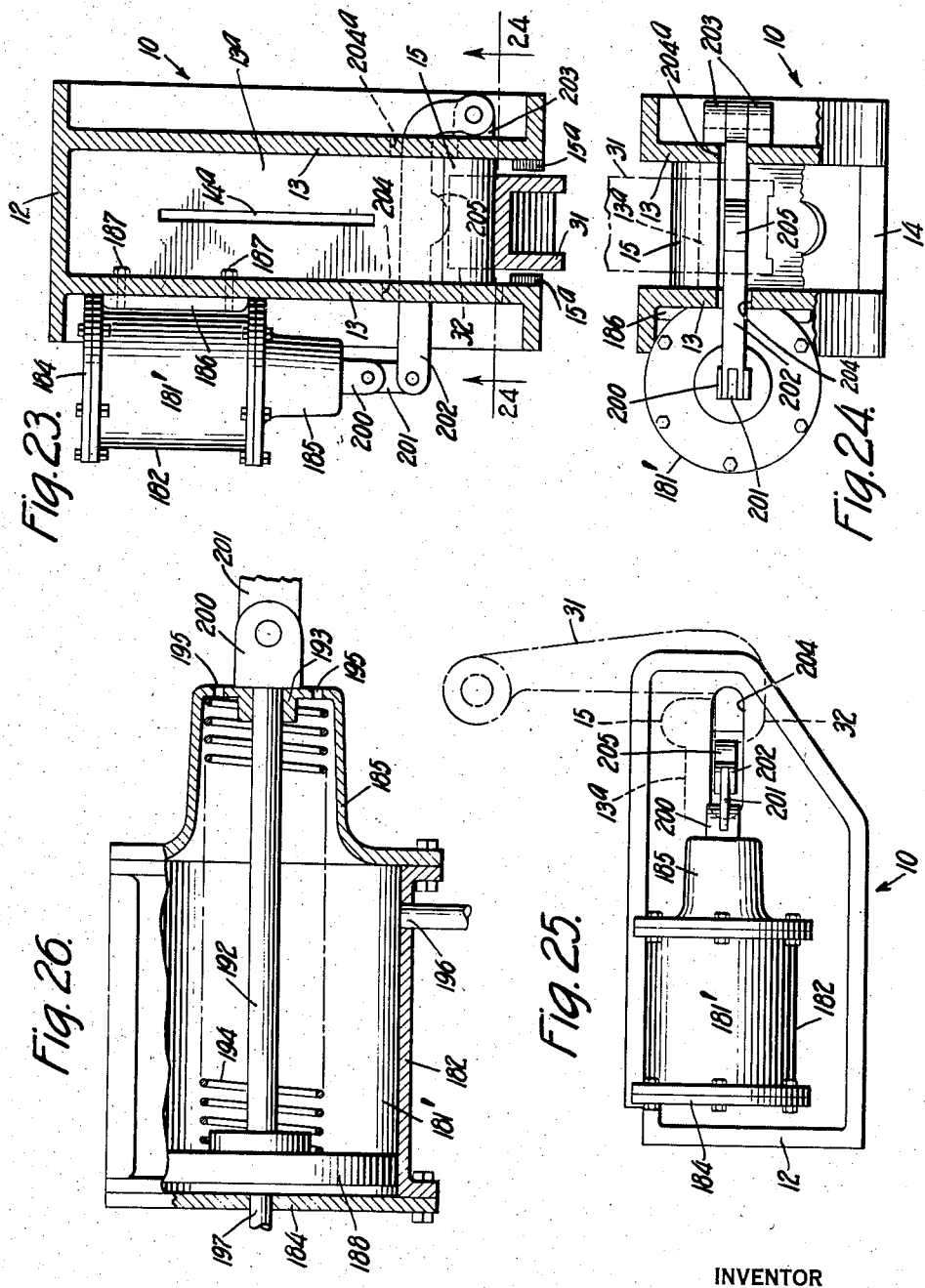
INVENTOR
Landreth H. King.
BY
ATTORNEYS Feb. 7, 1939.  L. H. KING  2,145,881
DUMPING DEVICE
Filed July 6, 1929   26 Sheets-Sheet 11
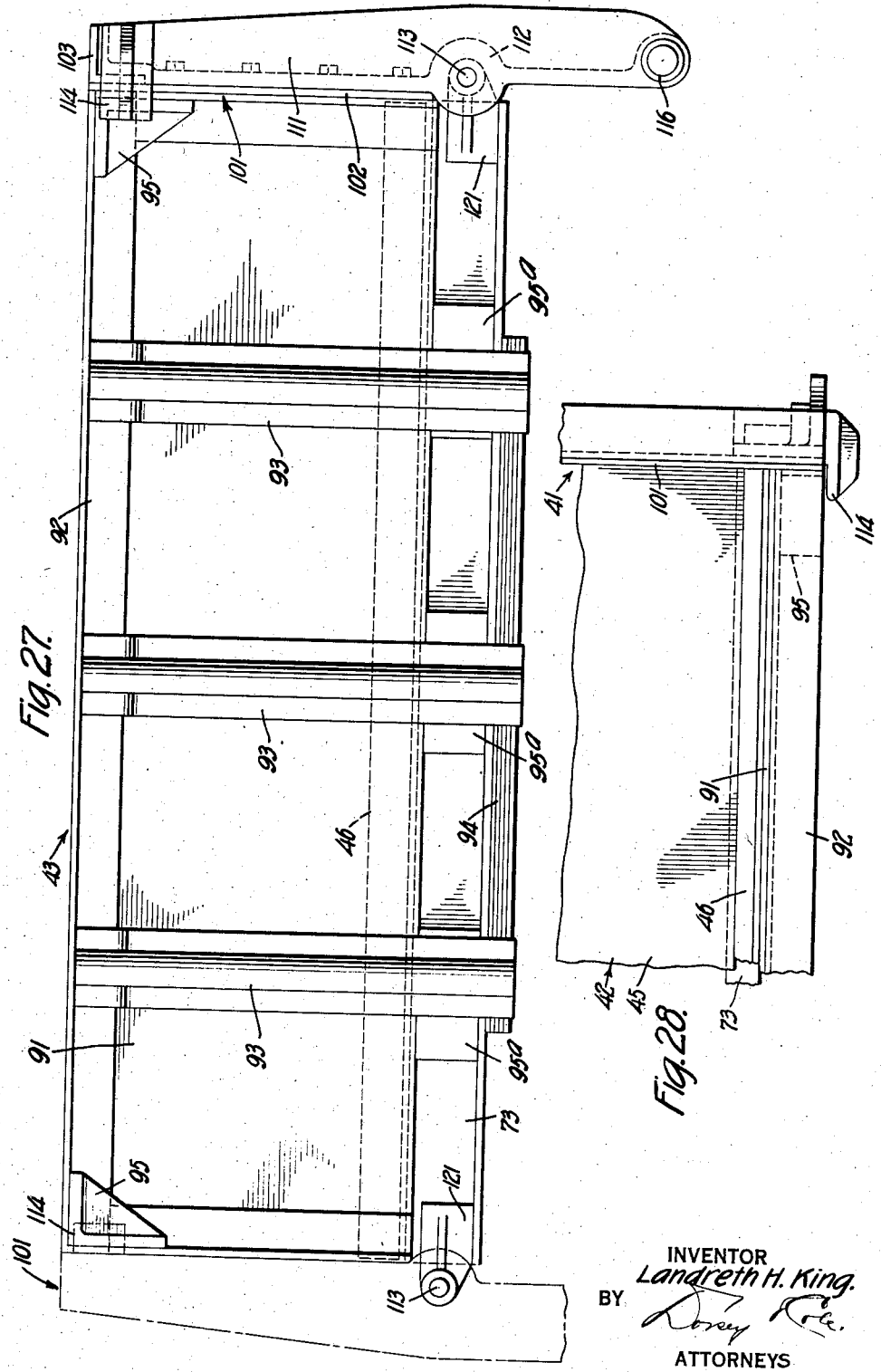
INVENTOR
Landreth H. King.
BY
ATTORNEYS Feb. 7, 1939.  L. H. KING  2,145,881
DUMPING DEVICE
Filed July 6, 1929   26 Sheets-Sheet 12
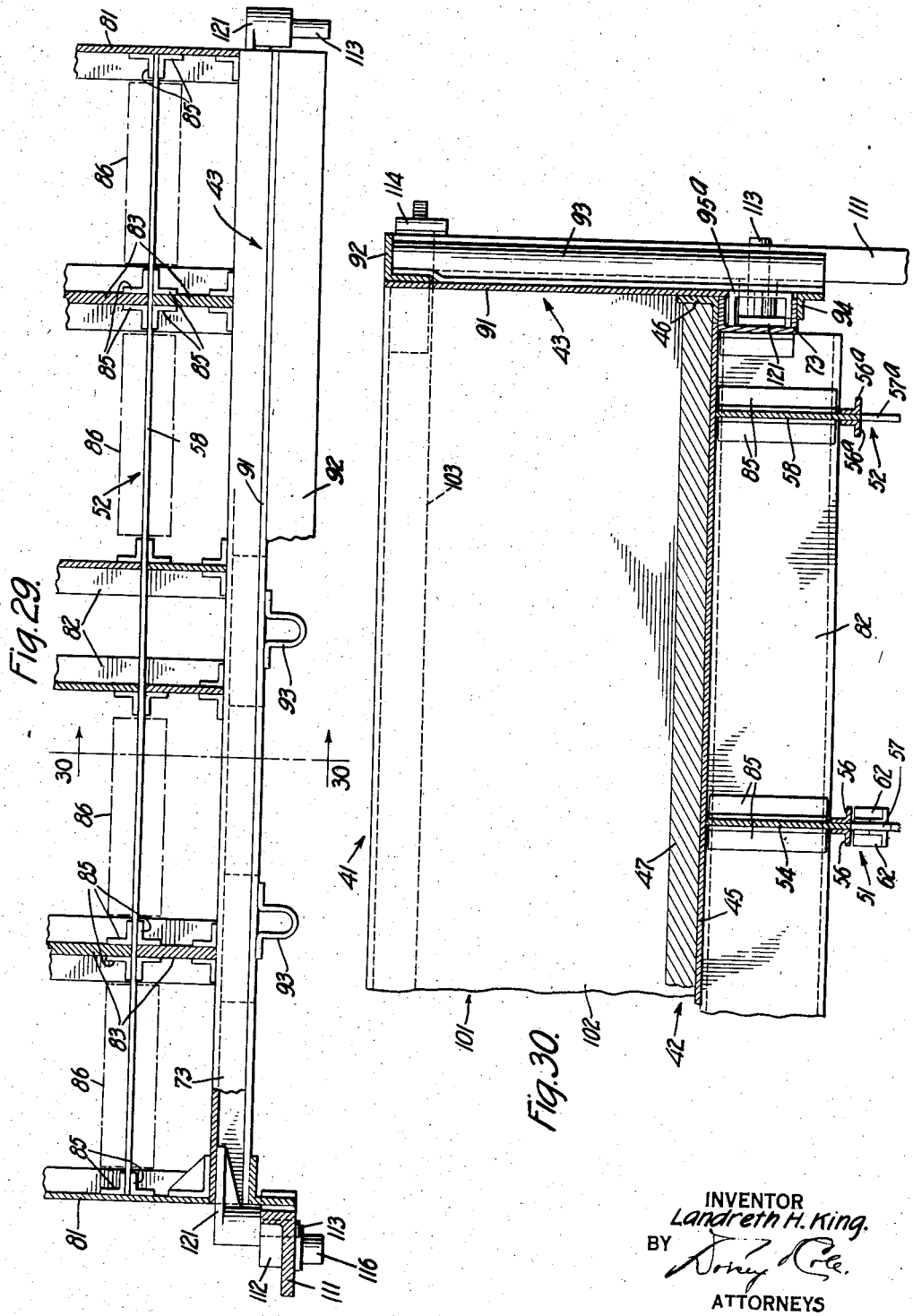
INVENTOR
Landreth H. King.
BY
ATTORNEYS Feb. 7, 1939.　　　　　L. H. KING　　　　　2,145,881
DUMPING DEVICE
Filed July 6, 1929　　　26 Sheets-Sheet 13
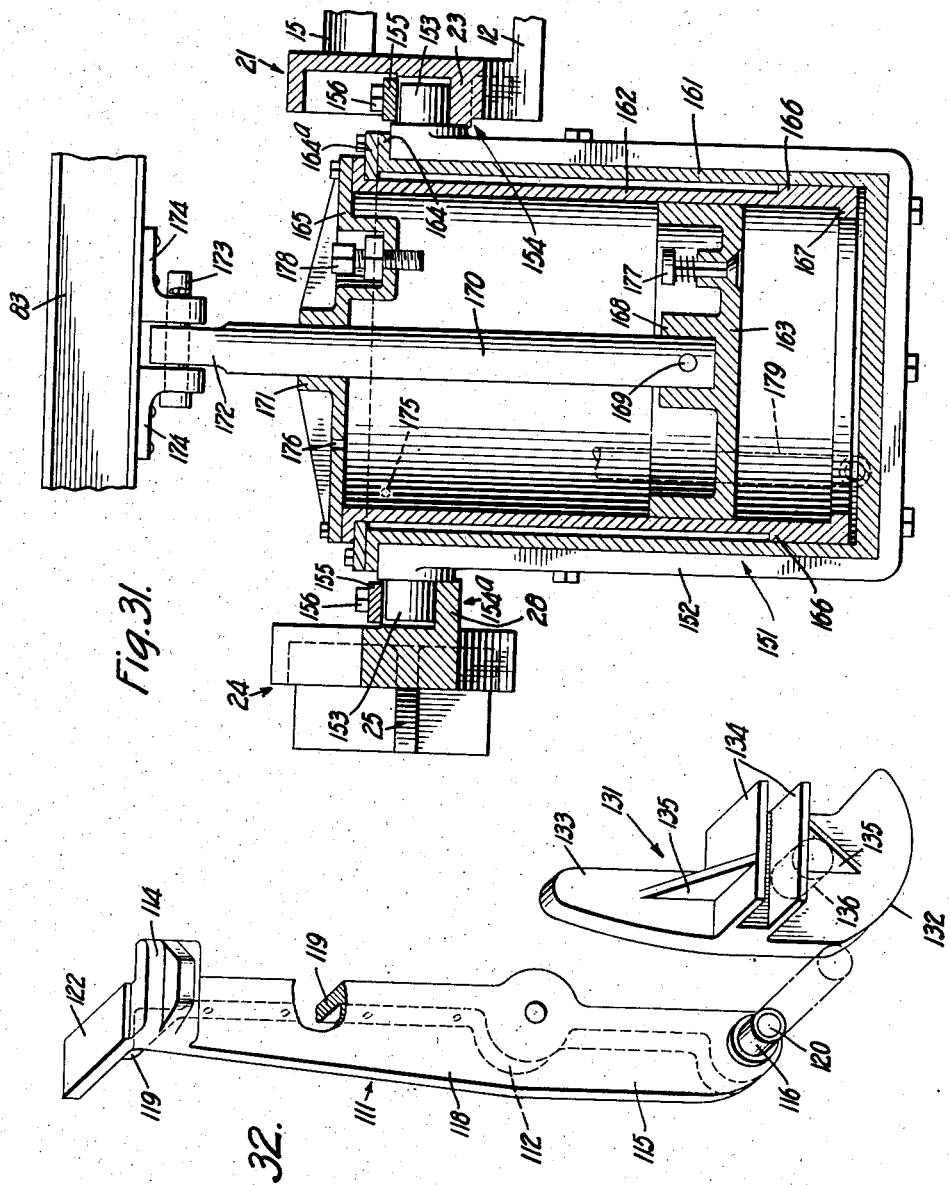
INVENTOR
Landreth H. King.
BY
ATTORNEYS

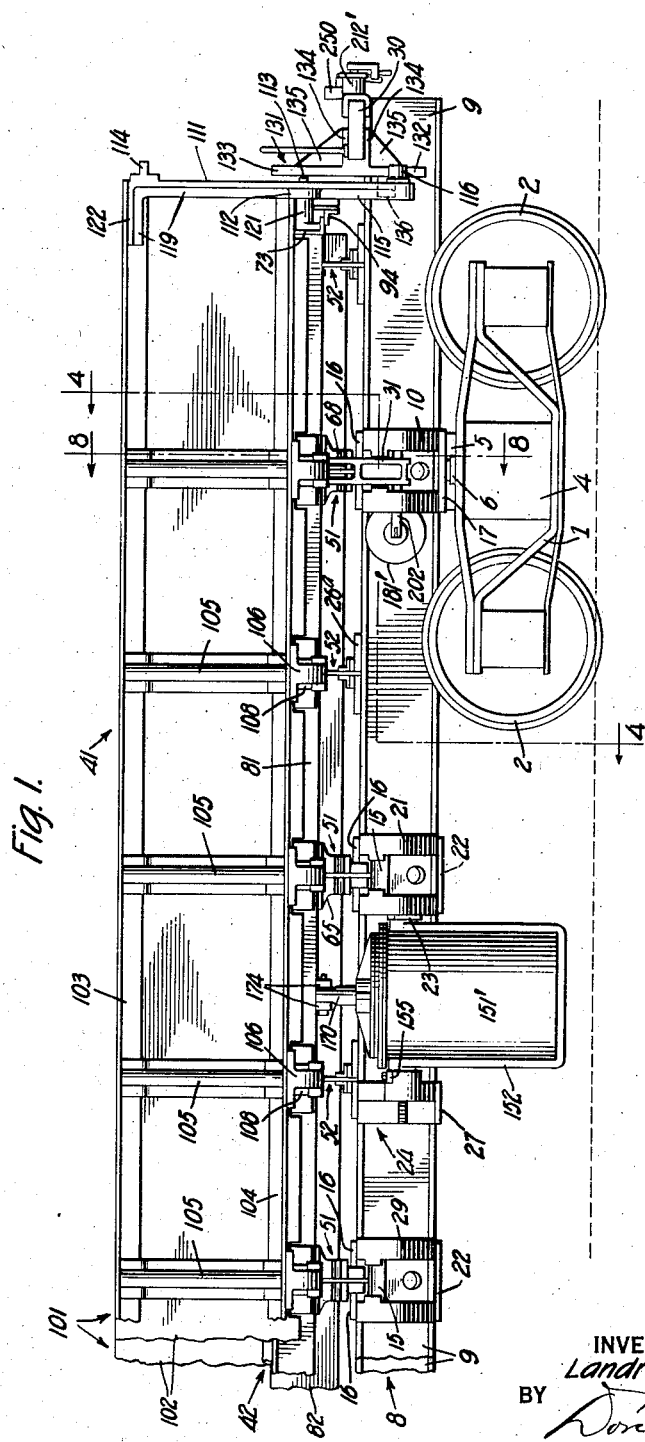

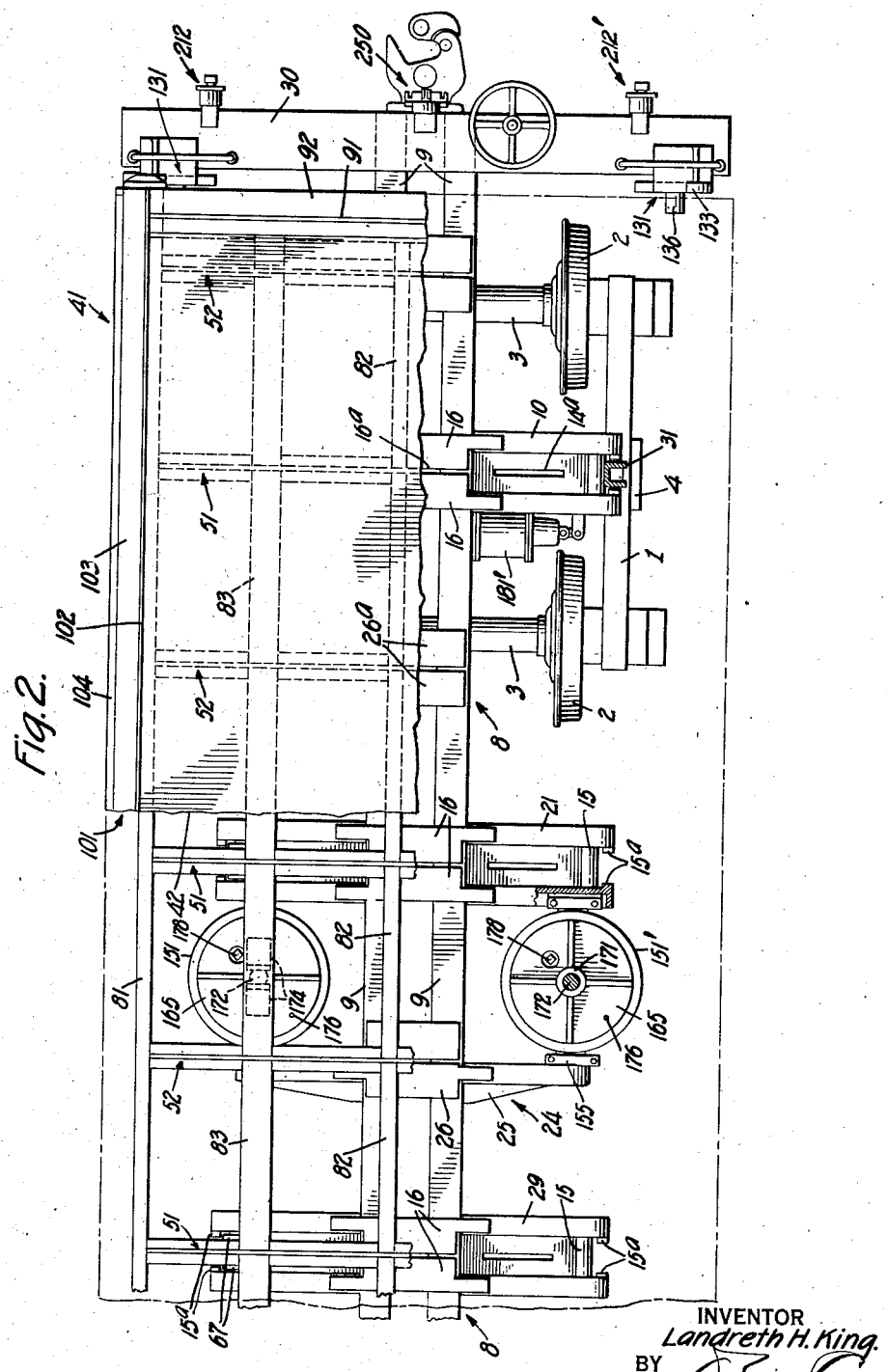

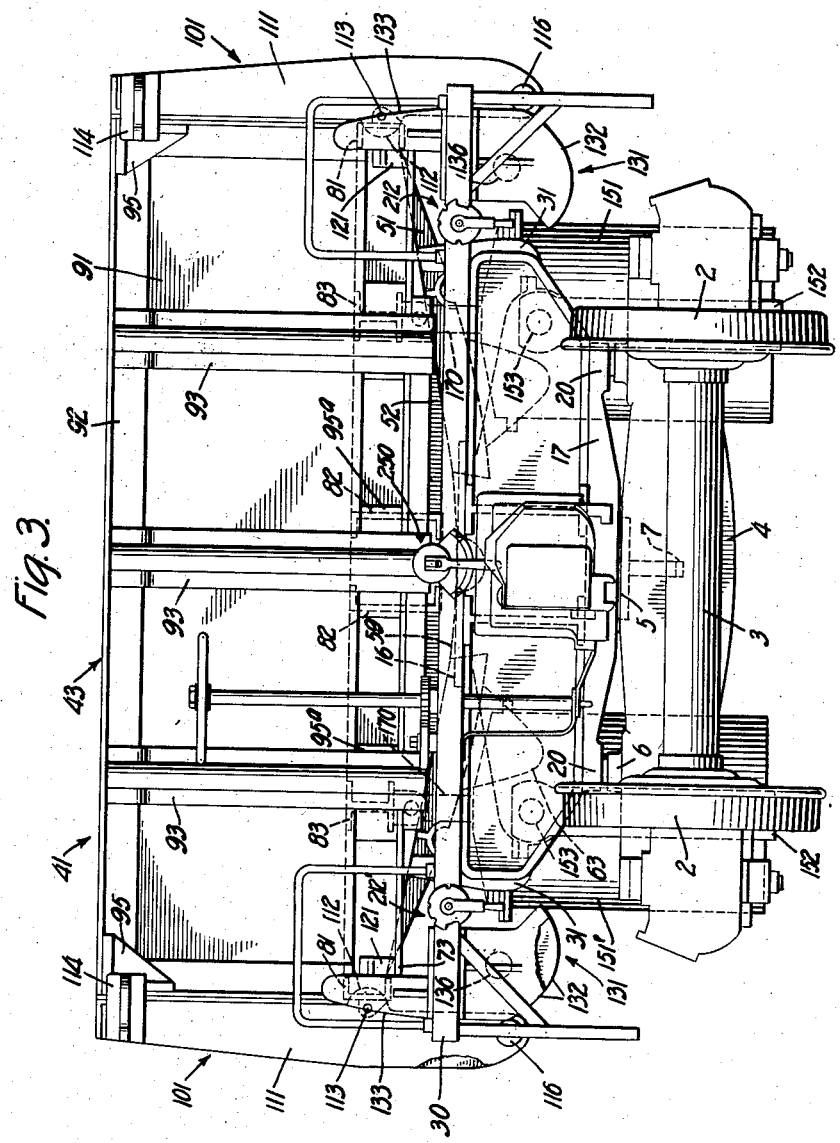

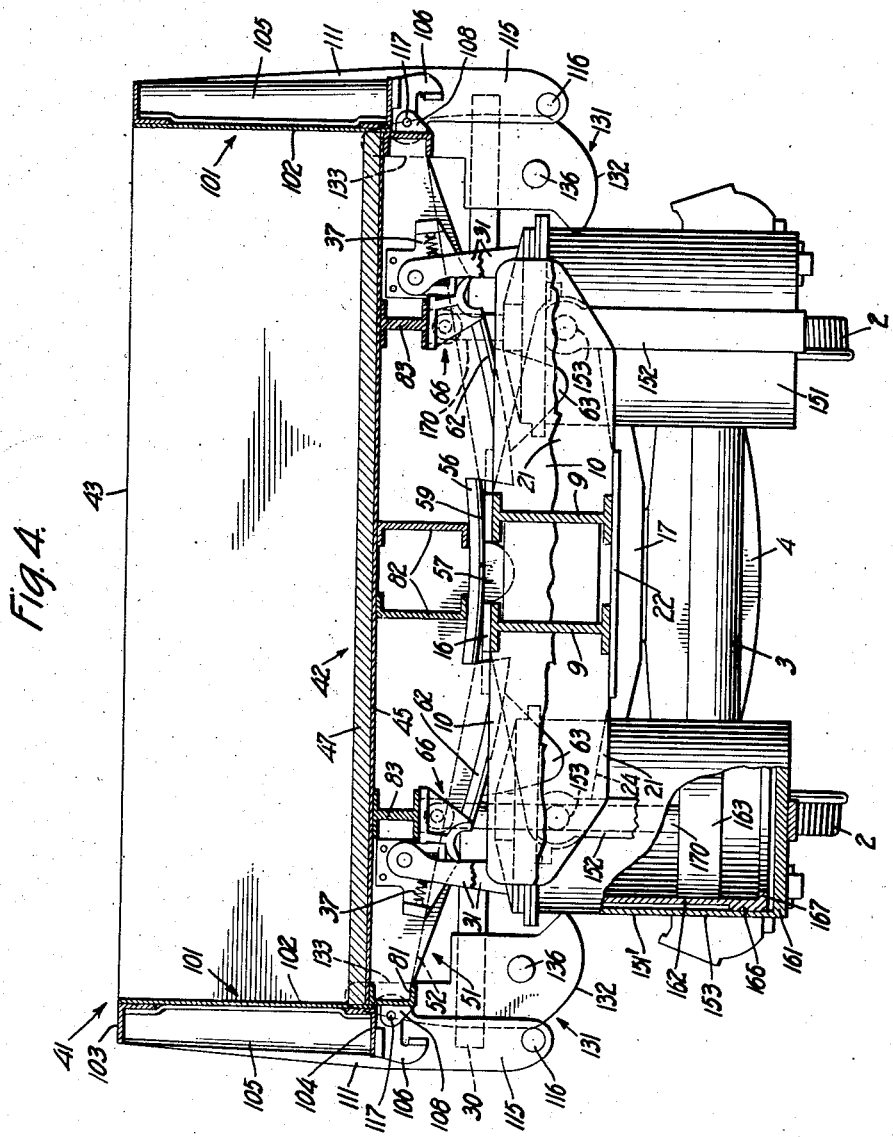

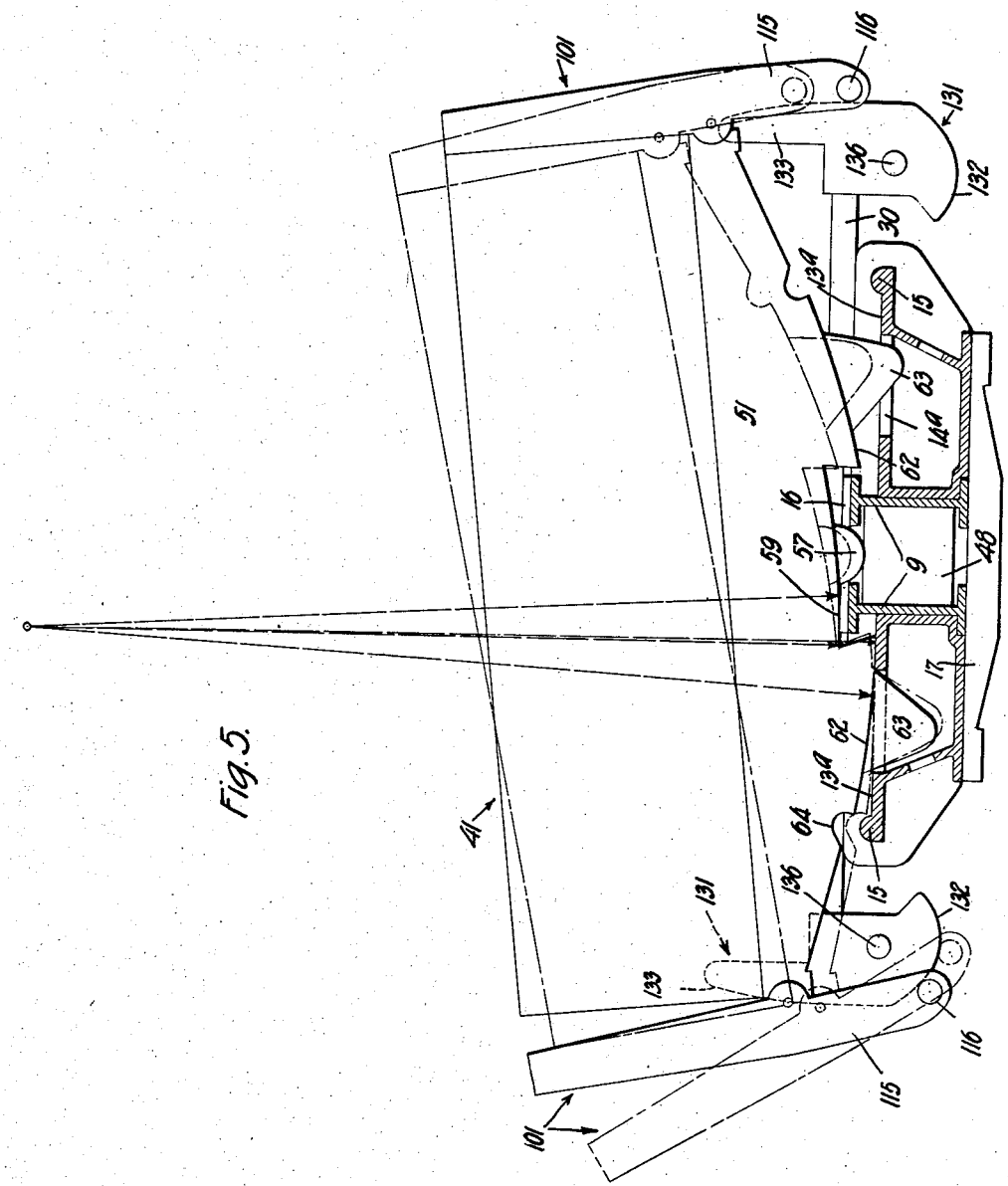

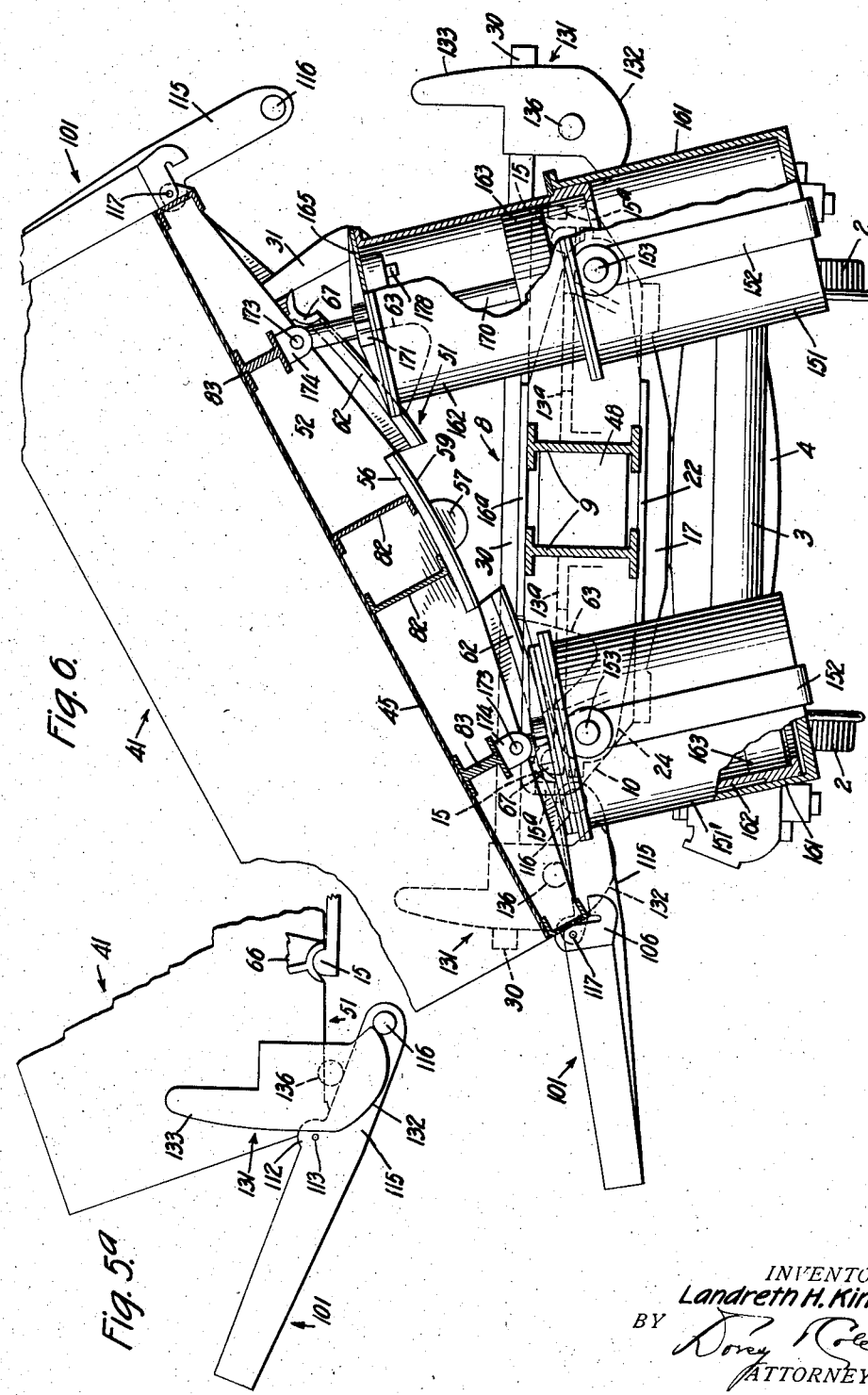

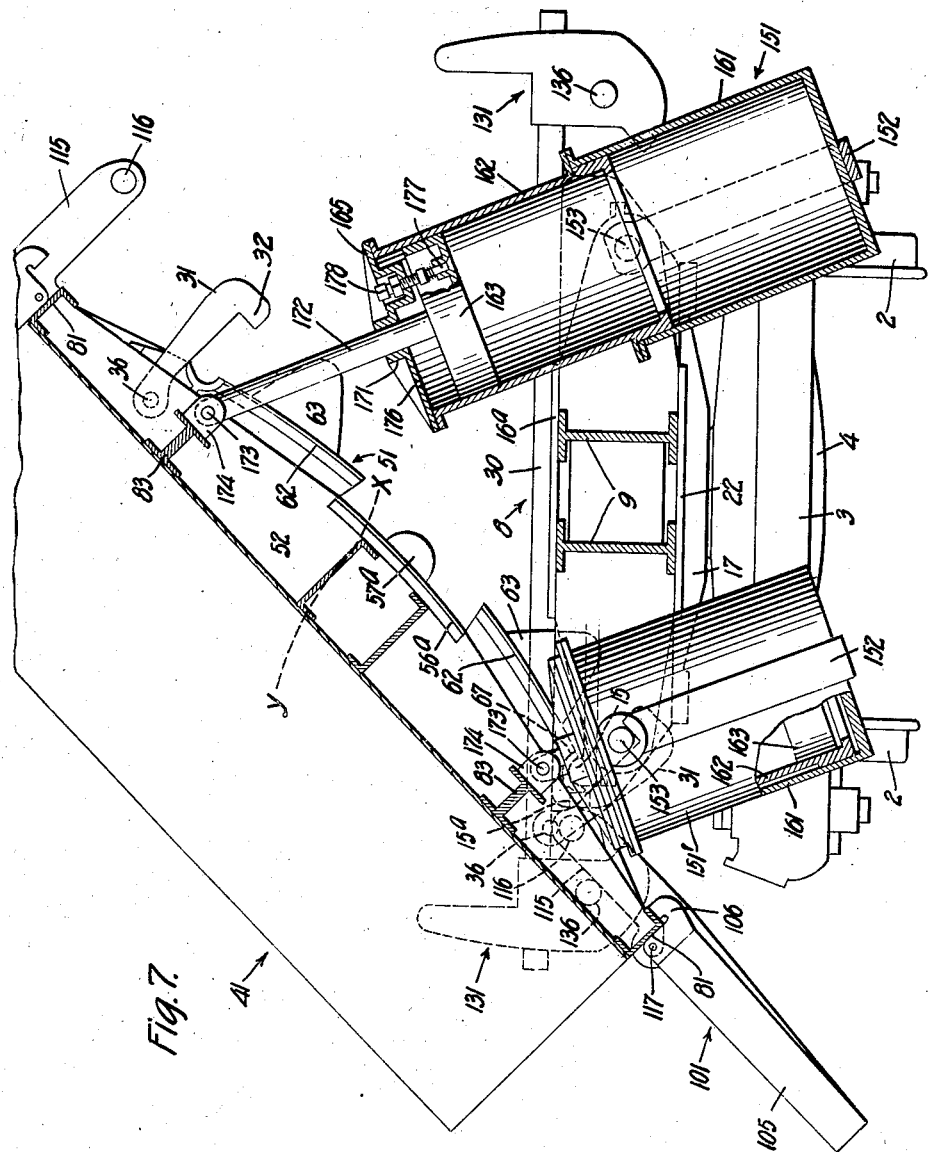

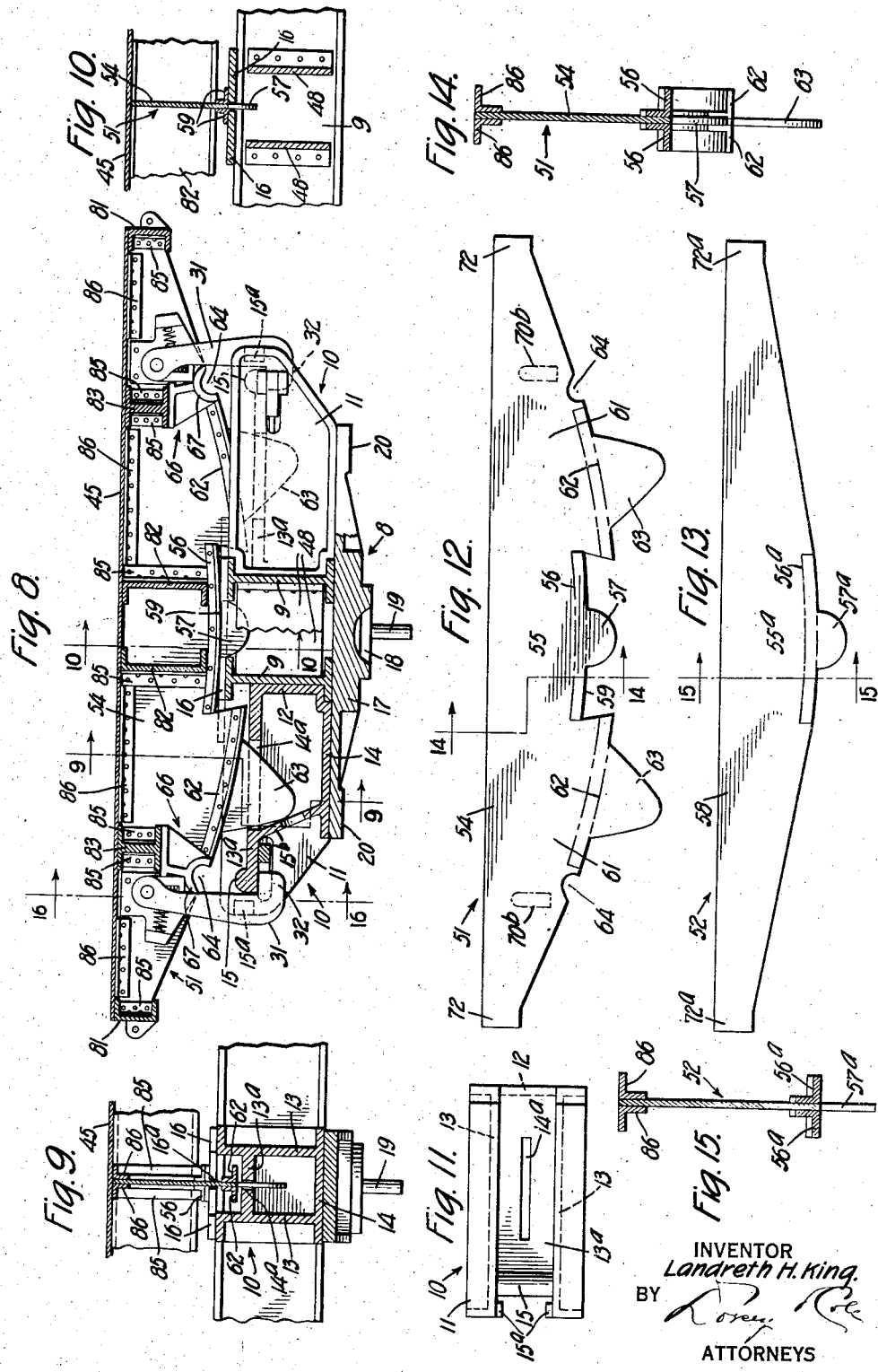

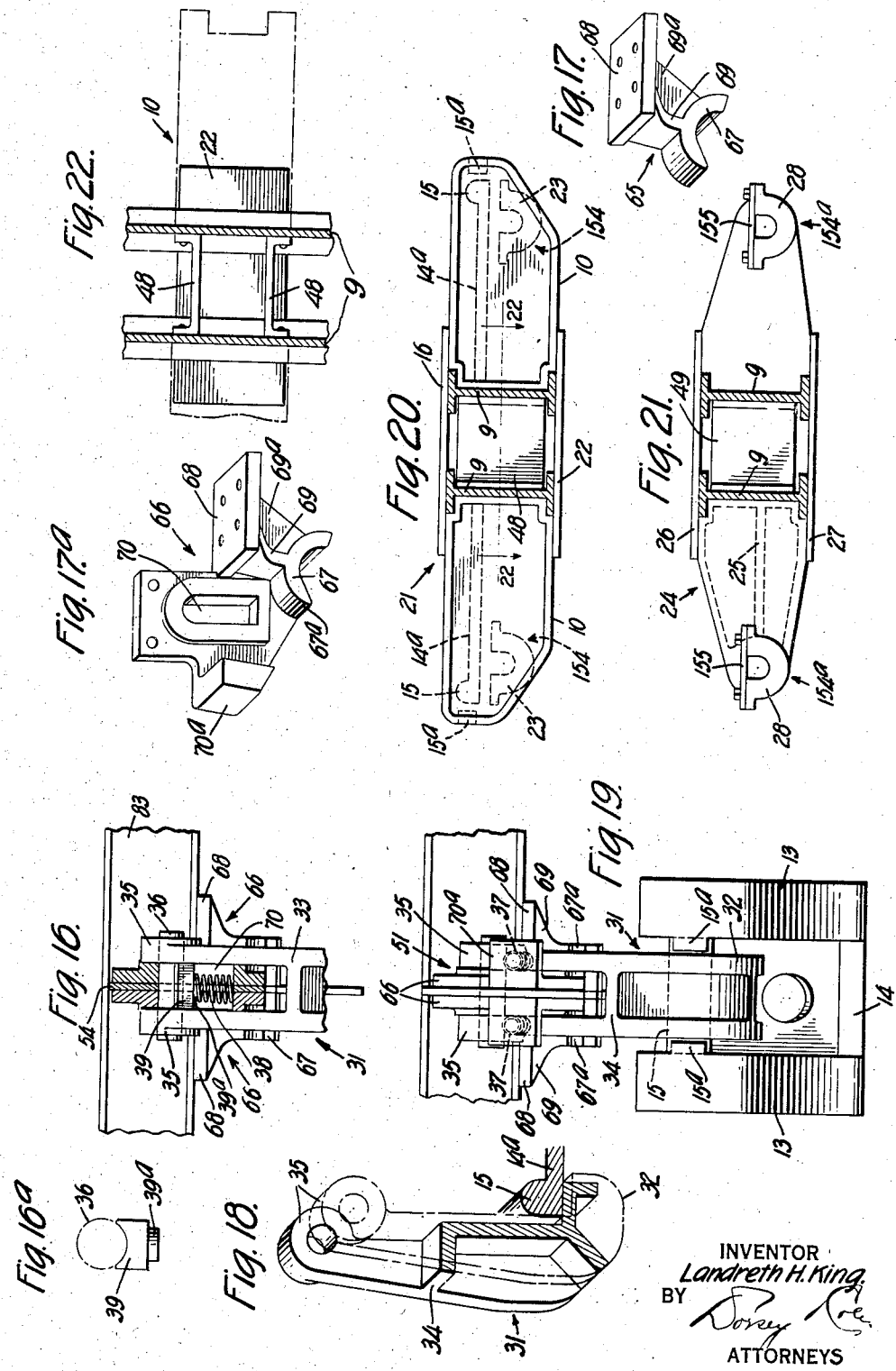

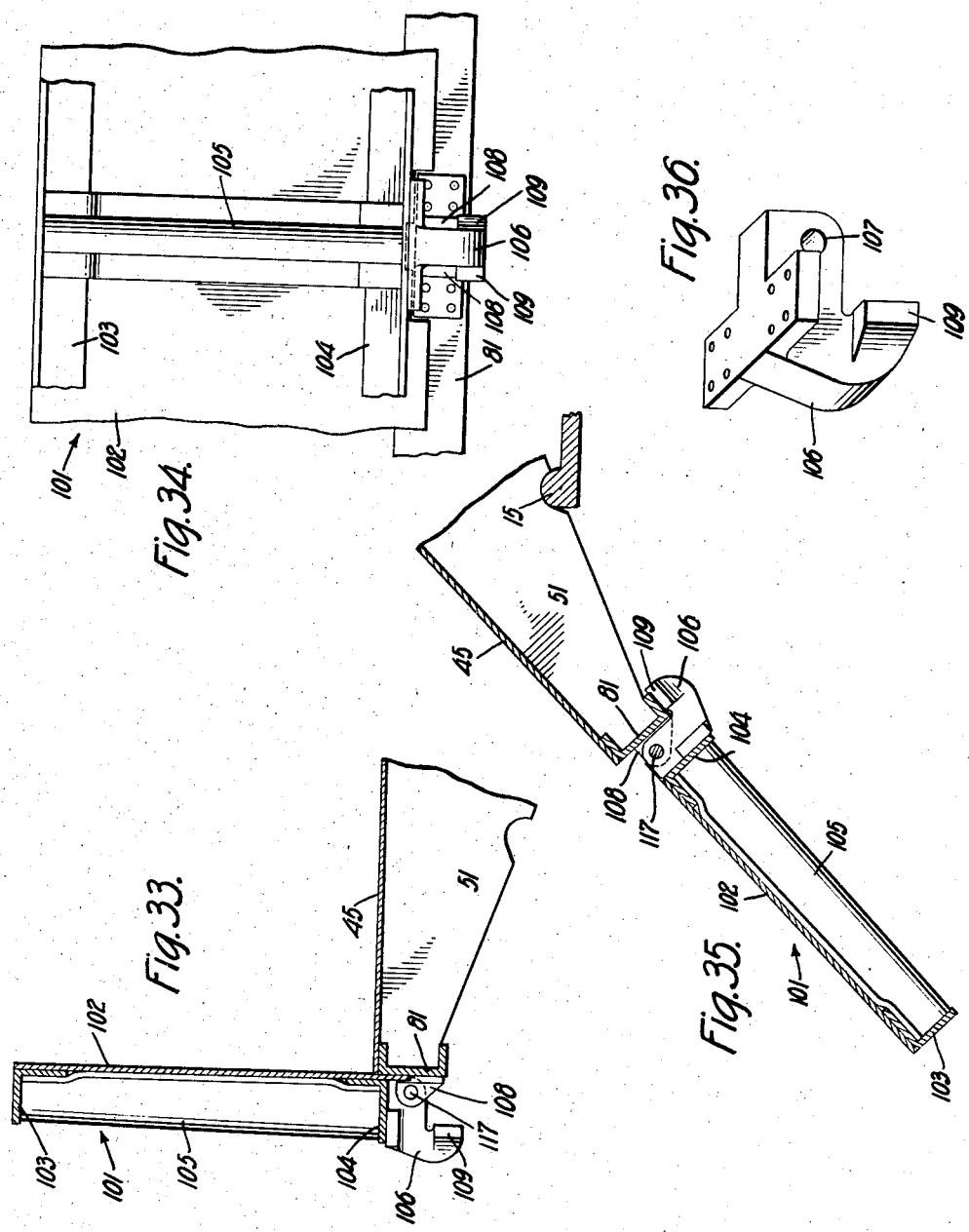

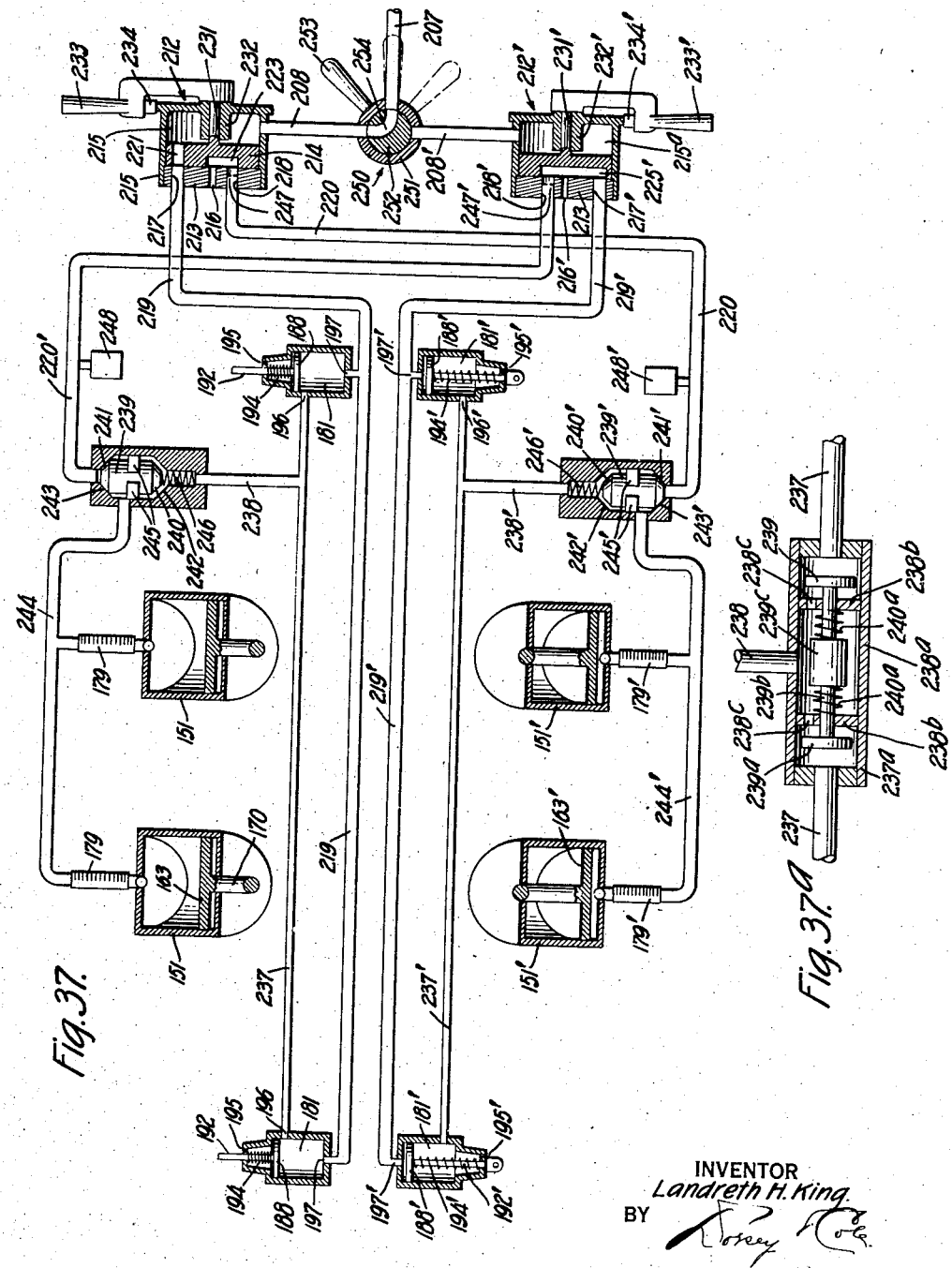

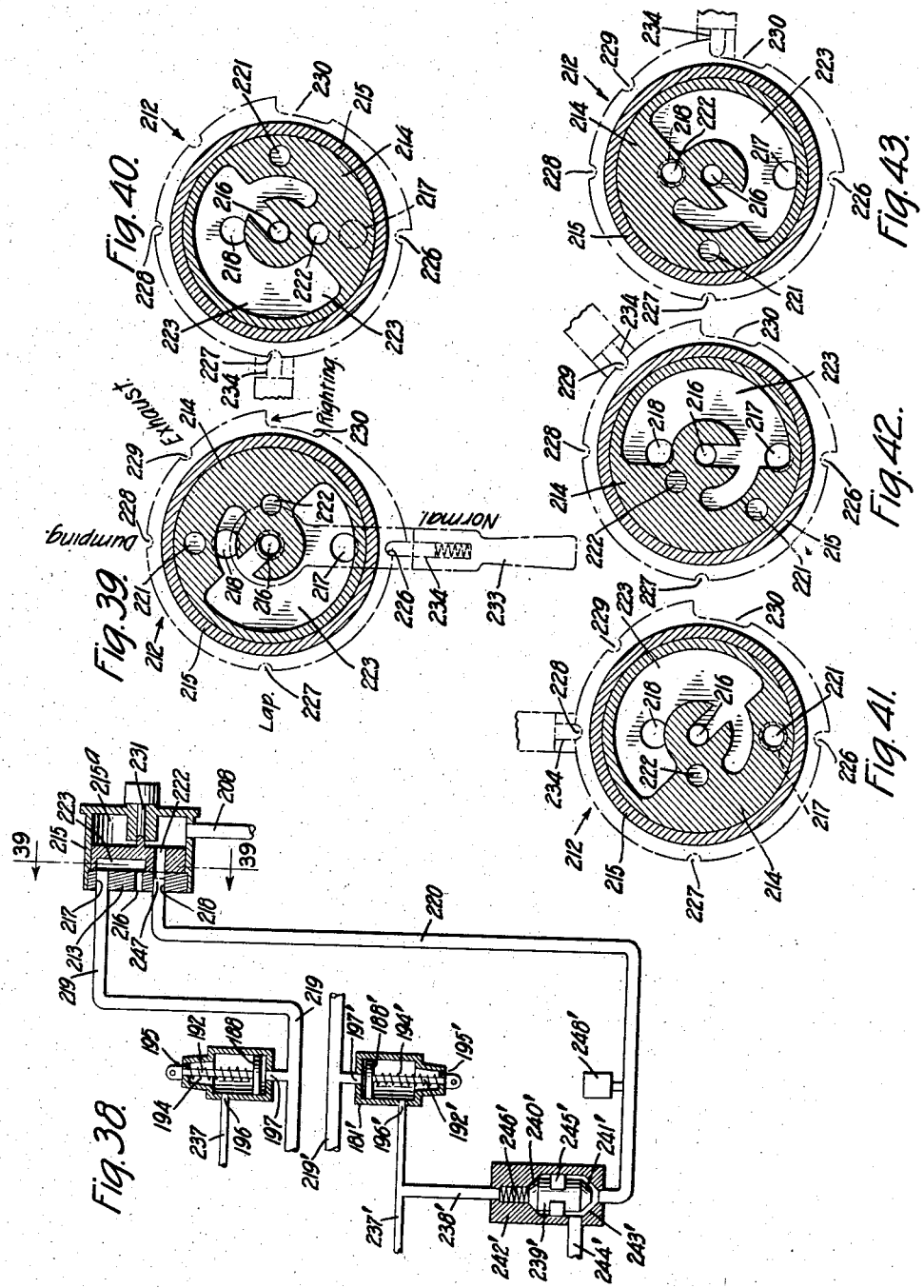

Feb. 7, 1939.    L. H. KING    2,145,881
DUMPING DEVICE
Filed July 6, 1929    26 Sheets-Sheet 17

INVENTOR
Landreth H. King.
BY
ATTORNEYS

Feb. 7, 1939.　　　　　L. H. KING　　　　　2,145,881
DUMPING DEVICE
Filed July 6, 1929　　　26 Sheets-Sheet 18

INVENTOR
Landreth H. King.
BY
ATTORNEYS

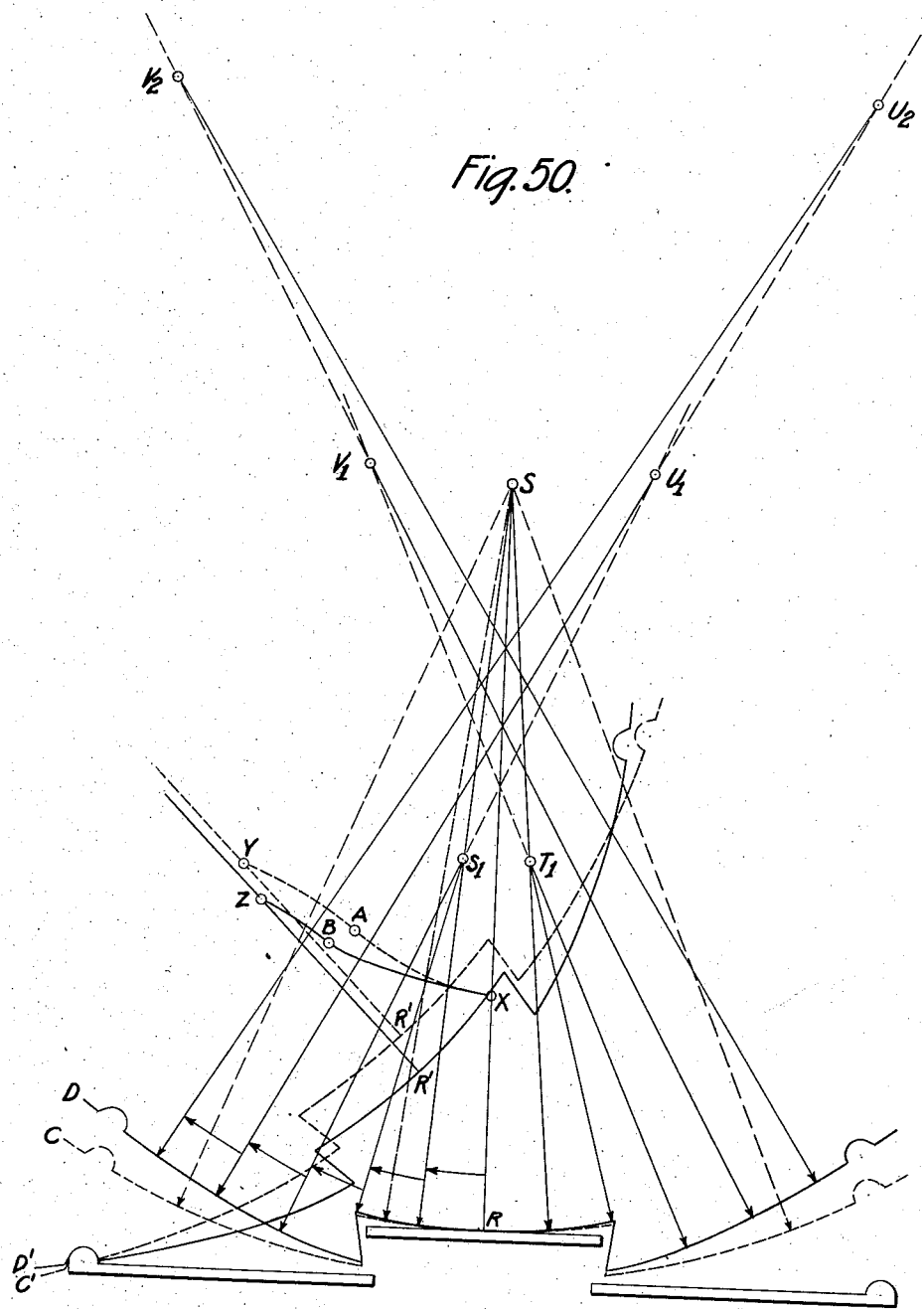

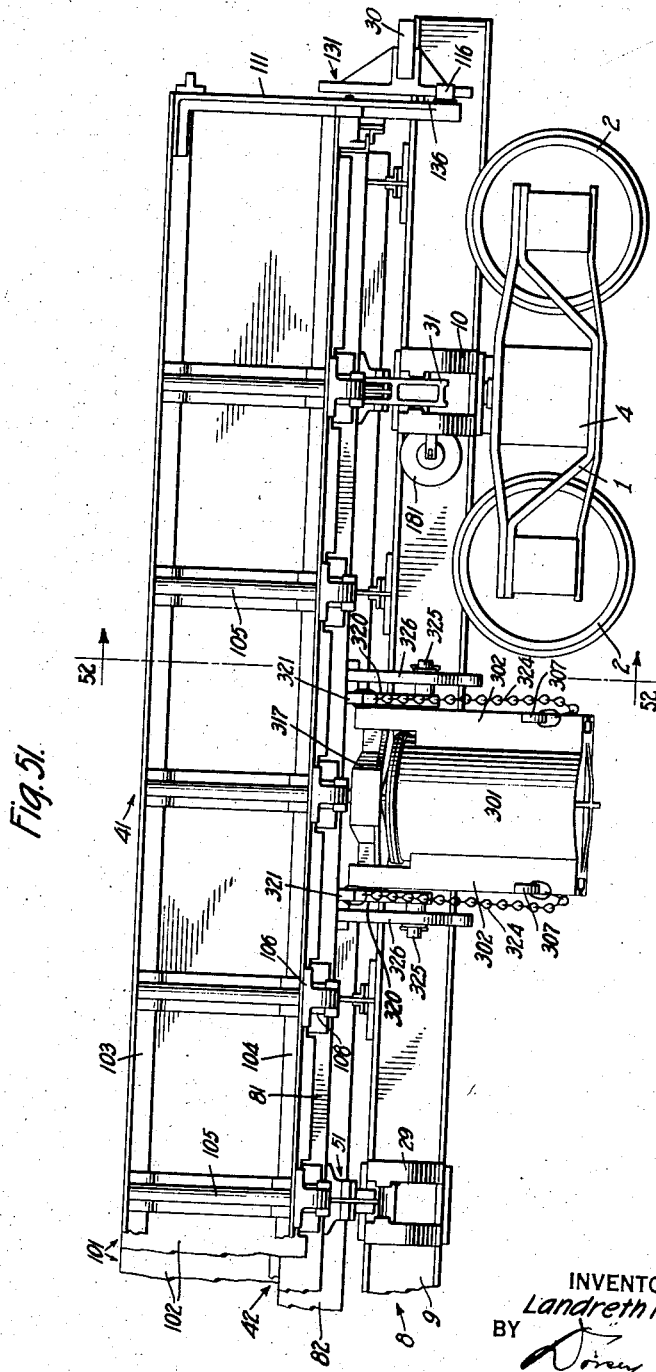

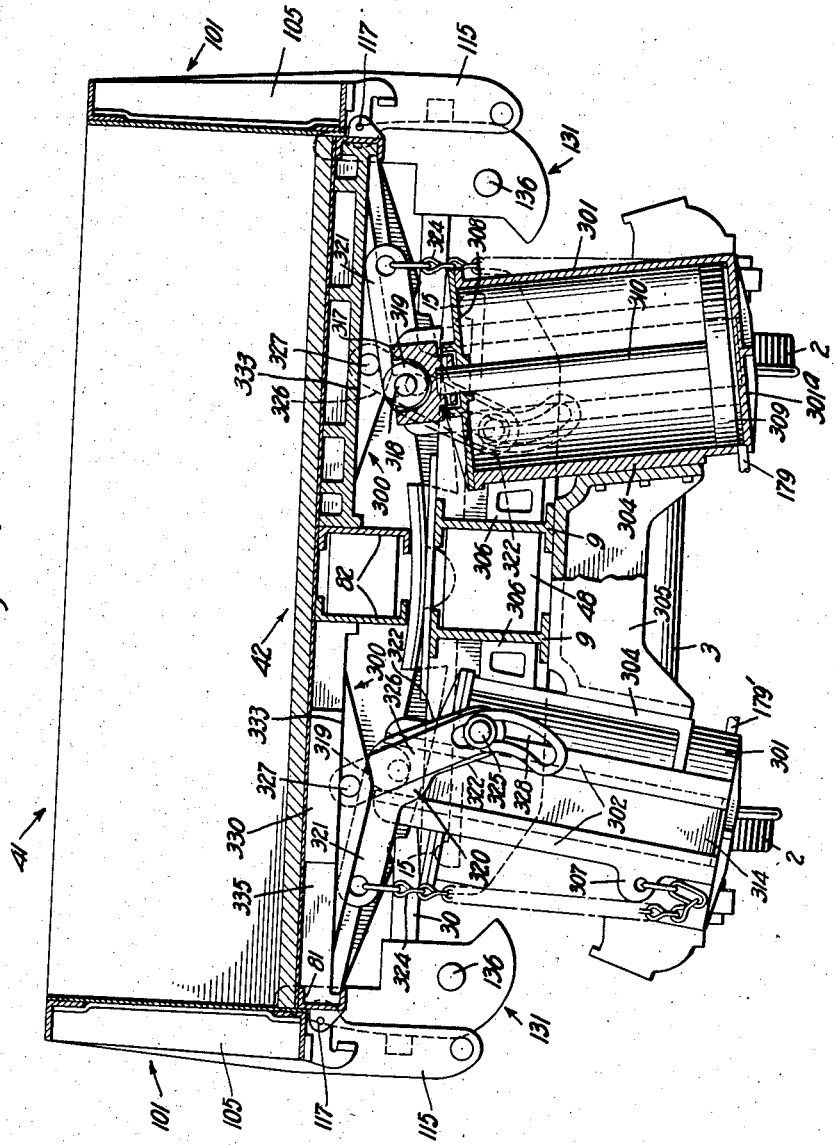

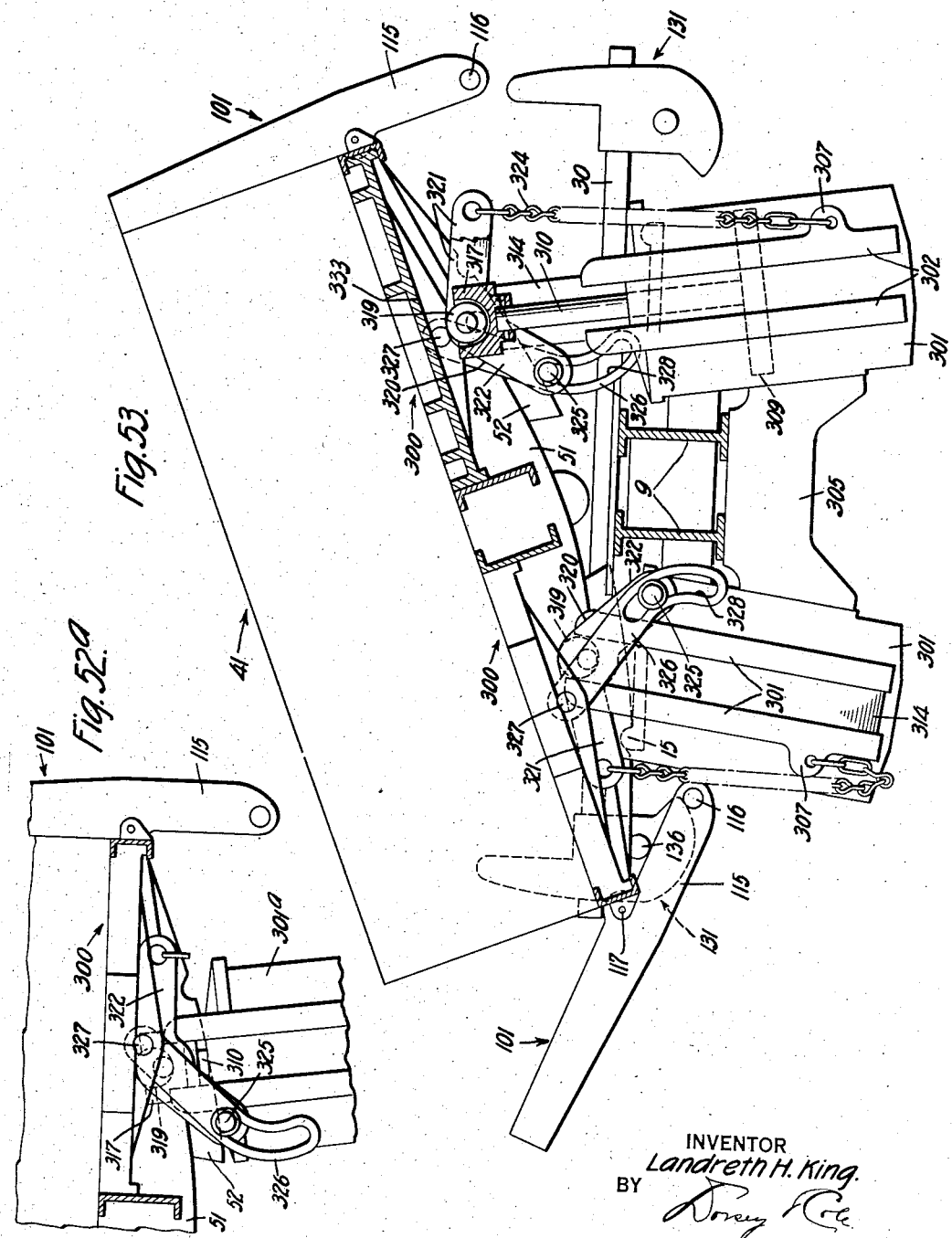

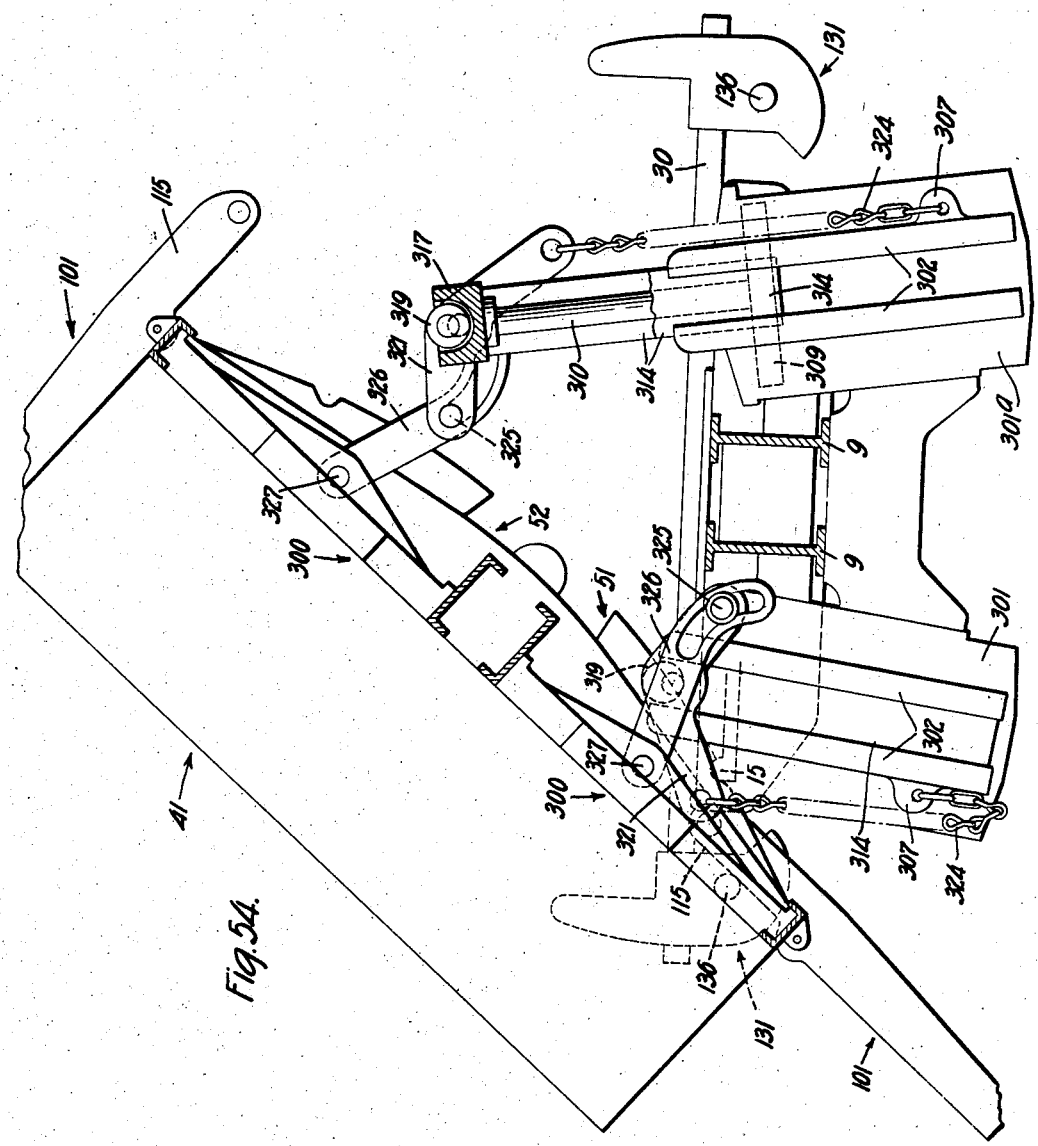

Feb. 7, 1939.　　　　　L. H. KING　　　　2,145,881
DUMPING DEVICE
Filed July 6, 1929　　　26 Sheets-Sheet 24
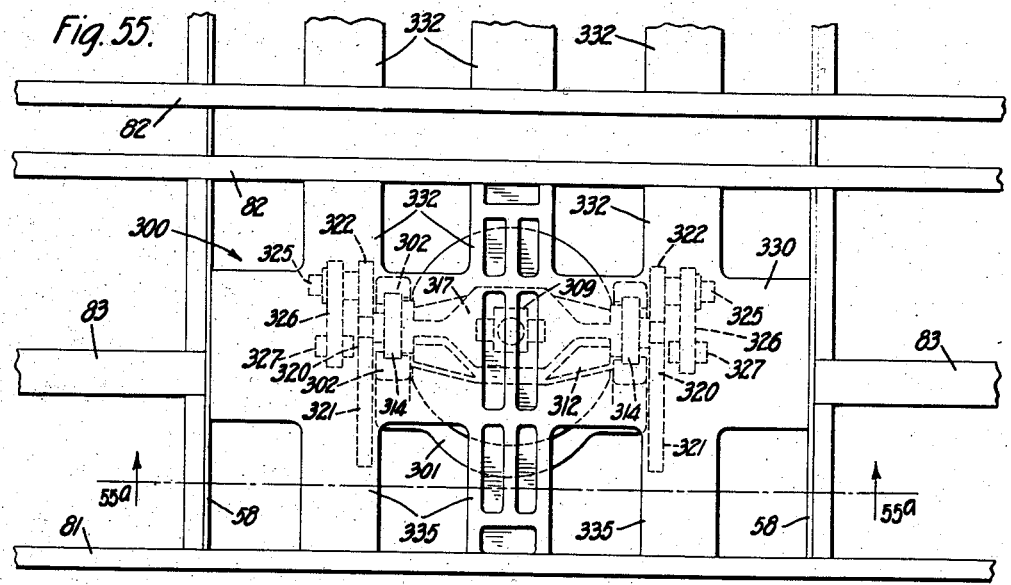
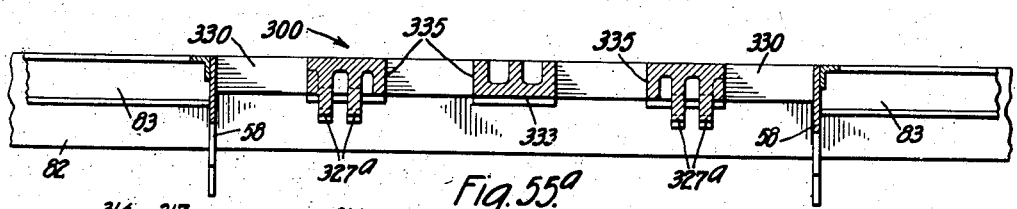
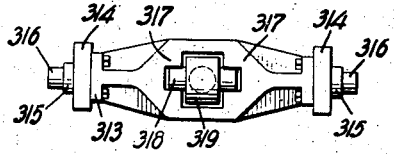
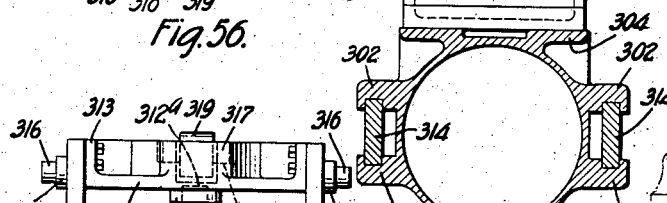
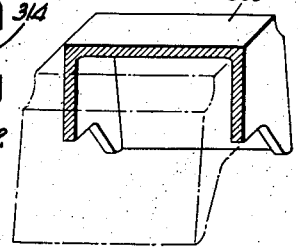
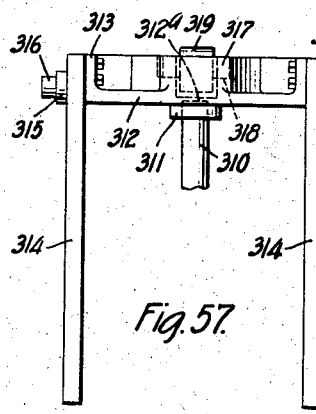
INVENTOR
Landreth H. King.
BY
ATTORNEYS Feb. 7, 1939.  L. H. KING  2,145,881
DUMPING DEVICE
Filed July 6, 1929  26 Sheets-Sheet 25

INVENTOR
Landreth H. King
BY
ATTORNEYS

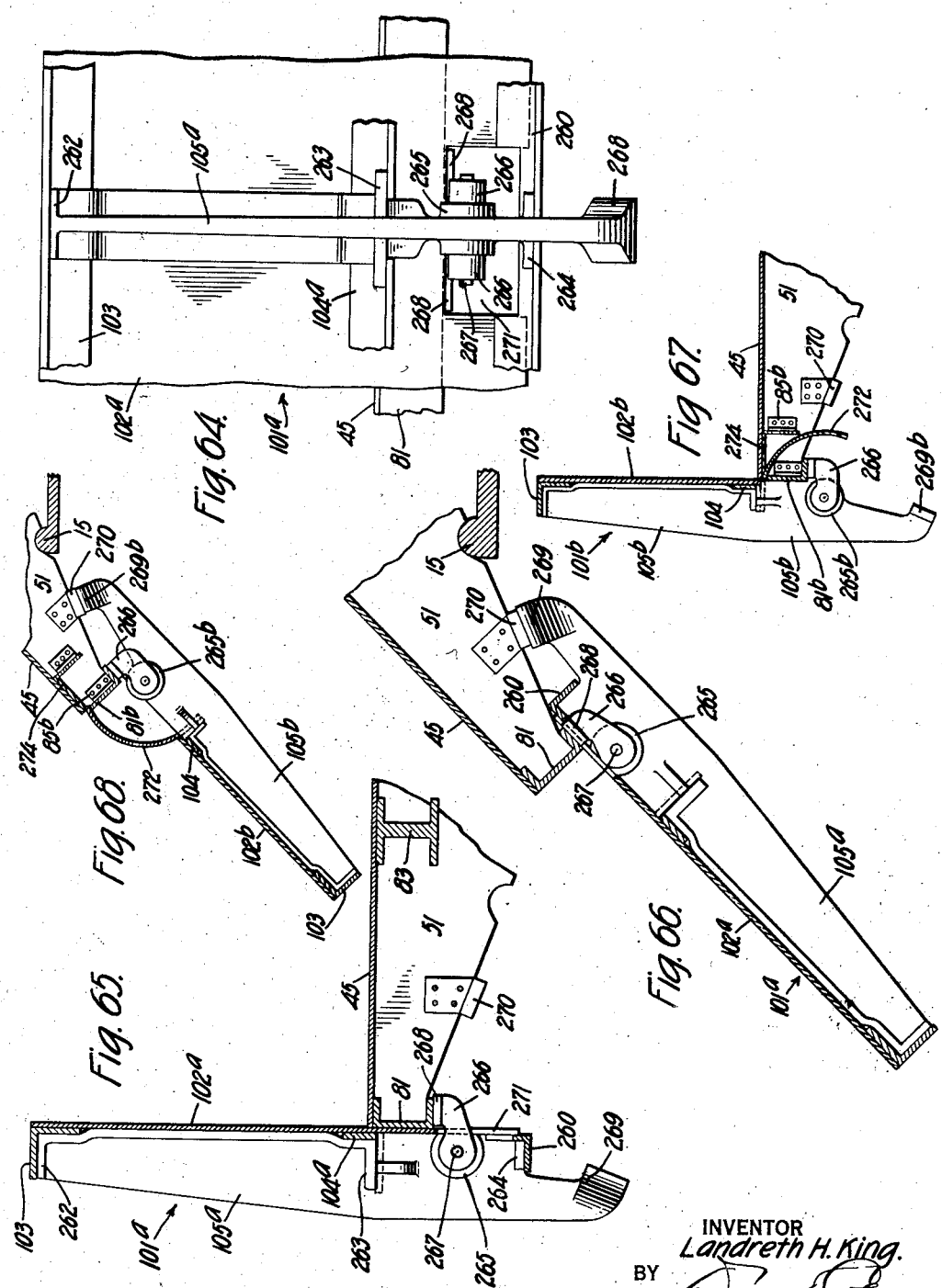

Patented Feb. 7, 1939

2,145,881

UNITED STATES PATENT OFFICE 2,145,881

DUMPING DEVICE

Landreth H. King, Orange, N. J., assignor to King Mechanism and Engineering Company, New York, N. Y., a corporation of New York Application July 6, 1929, Serial No. 376,352

24 Claims. (Cl. 105—276)

This invention relates to dumping bodies on vehicular or other bases, to their means of support thereon, and to the control of forces inherent in or applied to effect the tilting of the dumping bodies for discharge of their loads in whole or in part and thereafter to effect the return of the dumping bodies to normal position.

For purpose of convenient and apt illustration the invention is herein shown as embodied in a railroad dump car of a type having its body set low, power-dumped and gravity-righted, and so constructed and actuated as to deposit its load at a distance from the railroad track. More particularly the invention is illustrated as applied to a drop-door rocker car with compressed air as the motive power. The invention is of many features and characteristics which correlate themselves into a unity of application with particular reference to a dump car of this type. It will be apparent, however, as this description progresses that in large part the features and characteristics of the invention may be employed independently of one another and many of them are inherently independent of the type of dumping body to which they may be applied, and whether of stationary or travelling base. Accordingly no undue limitation is to be inferred from the choice of dumping body herein made for illustrative purposes.

In the rocker type of car the dumping body is characterized by combined angular and sidewise travel and calls for a relation of support of the car body on the car underframe which is theoretically a curve, having in part the purpose of diminishing the power required to effect the desired movement. Whether that curve be complete for constant engagement by the parts or the supporting means be in the nature of points of successive support arranged in a curve is immaterial. It is likewise immaterial whether the curved supporting part be on the bar body or on the underframe and whether one opposing part be straight or both cooperating parts be curved.

Of these forms, to all of which my invention applies, I have chosen for illustration an underframe provided with straight line supporting members, hereinafter denominated "trackways", transverse of the car and in two horizontal planes. At the outer extremities of the trackways in the lower horizontal plane I preferably provide trunnions and have so illustrated. This provision, however, may be considered as a refinement with a view primarily of meeting present day practice as to loading level and position of discharged load in a good mechanical way and is not deemed a limitation on the broad aspect of the invention.

For cooperation with these trackways and trunnions there are provided on the car body curved supporting members, hereinafter denominated "rockers." Two types are illustrated, a simple rocker for cooperation with the upper level trackway alone, and a composite rocker for cooperation with the trackways of both levels and provided with suitable engaging faces for cooperation with the trunnions.

The underframe supporting means illustrated may be considered as embodying three separate and distinct supporting members, to wit, an upper trackway, a lower trackway, and a trunnion, each independent of the other in number, in alignment longitudinally of the car and in means of attachment to the underframe. Likewise the car body supporting means may be considered as embodying three separate and distinct supporting members, to wit, a central rocker, an outside rocker, and a trunnion bearing, each independent of the other in number, in alignment longitudinally of the car and in means of attachment to the car body, but corresponding in number and alignment with their cooperating underframe supporting parts.

The lowering of the load level, the dumping at a distance from the tracks, the control of the dumping motion and the flexibility of design provided by the foregoing structure are objects of this invention.

In the transfer in dumping of the support of the car body from the upper trackway to the lower trackway and from the lower trackway to the trunnion smooth continuity of motion with resultant economy is provided by this invention and forms one of the objects thereof.

In the present day dump car construction the underframe, as herein illustrated, comprises two parallel, adjacent center sills extending the entire length of the car and serving as the sole supporting means of the car body. This center sill structure is comparatively narrow and may well be utilized for the upper trackway having its length substantially commensurate with the width of the center sill structure. In such practice it will be apparent that the sidewise travel of the car body in dumping is mainly along the lower trackway and it is in these parts, therefore, that the curved relationship of support above referred to is of major importance. Accordingly the curvature of the central rockers, or more broadly speaking the curved relationship of the central car body supporting means and upper trackway and whether or not there be present a curved relationship, becomes a matter of design with power considerations a dominant factor. One of the objects of this invention is the conservation of power in effecting dumping and more particularly in starting the dumping movement. To this end I prefer a curved central rocker on a straight upper trackway affording in effect a line support of the car body in normal upright position and have so illustrated herein.

One of the objects of this invention is a dump car of a few strong parts; characterized by economy in initial construction and in maintenance. It is in part with this object in view that I have illustrated simple and composite rockers with trunnion bearings embodied in the composite rockers, and trunnions formed on the lower trackways. In furthering the objective of strength and economy I employ the rockers as an integral part of the car floor constituting the cross-beams thereof, to which end I have extended in unitary structure (the central rockers) the composite rockers beyond the trunnion bearings and also to the outer edges of the car floor. In so doing I not only save much in the duplication of parts but afford a cantilever support of the car body, not only in its normal upright position but throughout its dumping and righting position. Such structure constitutes one of the objects of this invention.

The tilting of the dumping body may be effected in various ways. The motive power for dumping or righting, or both, may be supplied by electricity, gas, steam, compressed air or other suitable agency. The power may be applied either directly or by intermediate transmitting mechanism, such, for example, as gears, cable, or the like. The preferred form, however, is the direct application of the power derived from a source of compressed air, such as the air compressor or main reservoir of the locomotive or motor vehicle. The availability of compressed air for effecting dumping or righting, or both, is well understood in the art and accordingly I have herein merely indicated a source of compressed air for the pneumatic control system herein illustrated. This obviously may or may not be derived from the air brake system of the train or vehicle; and it may be obtained from any available supply in the event that the invention is to be embodied in connection with a dumping body installed on a stationary base.

In adapting this preferred method of effecting dumping or righting, or both, means are shown for extending the reach of the directly acting power parts to compensate for the sidewise travel of the dumping body, and to make possible the use of a relatively short actuating cylinder. Two embodiments thereof are illustrated for the application of power commensurate with the requirements in successive phases of the dumping operation. Novel construction has been developed to this end and forms one of the objects of the invention.

Another object of the invention is the positive locking of the dumping body in normal upright position. In developing this feature I have combined strength, simplicity, and economy and have devised single individual connections between the dumping body and rigid members of the underframe characterized by the absence of working parts.

Another object of the invention is to provide elasticity in the relationship of dumping body and underframe in the normal upright position of the dumping body whereby the dumping body may be termed to have a "floating support" on the underframe. This object is here illustrated as attained by the use of resilient components operatively associated with the locking means.

Unlocking mechanism for releasing the dumping body for tilting is by preference operatively associated with the dumping mechanism in such manner that a single and common means of control may be employed for effecting both functions. The inter-relation is such that the unlocking of the dumping body is possible only as a condition precedent to the application of power for dumping. This arrangement combines efficiency and safety and constitutes one of the objects of the invention.

The pneumatic control apparatus whereby unlocking is effected and the application of power for dumping or righting, or both, is governed, as herein shown, embodies an operating valve having a succession of functional positions so arranged and inter-related as to afford not only a convenient means of control of the dumping body throughout its tilting and righting movements but also to provide against accidental and unintentional movement of the car body. Control so characterized constitutes one of the objects of this invention.

Another object of this invention is the predetermination of the movement of the dumping body in tilting or righting, or both, in such manner as to take advantage of the momentum of the dumping body to assist in the movement and to conserve applied power.

Conservation of power is effected as herein illustrated not only by the curved relationuship in the cooperating supporting parts of the underframe and dumping body but by predetermined relation of dumping angle and angle of door opening throughout the dumping and/or righting movement. To this end the door opening and/or closing control means are correlated with the angular position of the dumping body and the arrangement is such that any desired angle of door opening, respecting any position or succession of positions of the dumping body, may be attained. More simply expressed, advantage is taken of the center of gravity of the door in its opening and/or closing movements to place the center of gravity of the dumping body as a whole and its load in a succession of positions best adapted to reduce the power load; and to combine with this predetermination of centers of gravity flexibility in control with a view of providing for other requirements such as loading level, dumping angle, and position of dumped load. The predetermination of the relation of the angle of door opening to the angle of dumping, the flexibility in such predetermination and the conservation of power effected thereby are independent of the control of the opening and closing of the door by the movement of the dumping body in tilting and righting and are each objects of this invention.

The conservation of power resultant upon a proper predetermination of the relation of the angle of door opening and the dumping angle may be augmented by a controlled extension of the door during the dumping movement, i. e., by an outward movement of the center of gravity of the door and an increase in its reach as an apron or chute beyond its effective dimensions as a retaining side wall of the dumping body in normal upright position. This controlled extensibility of the door and its correlated power factors in the conservation of power form one of the objects of this invention.

Other objects and features of the invention will be apparent in the progress of this specification.

The accompanying drawings forming a part of this application should be understood as illustrative only and not as constituting a limitation upon the invention. In these drawings:—

Figure 1 is a side elevation, broken away slightly beyond the middle point, of a railroad dump car in its normal upright position embodying the invention;

Fig. 2 is a plan of the dump car as illustrated in Fig. 1, the car floor and body being broken away in the lefthand and lower portions of the drawings;

Fig. 3 is an end elevation of the dump car in normal upright position;

Fig. 4 is a vertical cross section of the dump car on the line 4—4 of Fig. 1 illustrating the dump car in normal upright position;

Fig. 5 is a vertical cross section, partly diagrammatic, of the car body, and a portion of its supporting structure, illustrating two positions of the car body in its dumping movement;

Fig. 5a is a detail diagrammatic elevation of the car door controlling mechanism illustrating a position of the car door subsequent to the position in Fig. 5;

Fig. 6 is a vertical cross section, partly diagrammatic, of the car body, and a portion of its supporting structure and its dumping mechanism, illustrating a position of the car body subsequent to that illustrated in Fig. 5a;

Fig. 7 is a vertical cross section, partly diagrammatic, of the car body, and a portion of its supporting structure and its dumping mechanism, illustrating a position of the car body and its dumping movement subsequent to that illustrated in Fig. 6;

Fig. 8 is a vertical cross section of the composite rocker and cooperating trackway structure on the line 8—8 of Fig. 1, the righthand body bolster being shown in full lines in advance of the position of the lefthand trackway;

Fig. 9 is a vertical longitudinal section of the structure of Fig. 8 on the line 9—9 of Fig. 8;

Fig. 10 is a vertical longitudinal section, partly broken away, of a central rocker and its supporting trackway on the line 10—10 of Fig. 8;

Fig. 11 is a plan of a lefthand lower trackway;

Fig. 12 is a front elevation of a composite rocker plate;

Fig. 13 is a front elevation of a simple rocker plate;

Fig. 14 is a vertical longitudinal section of a composite rocker on the line 14—14 of Fig. 12, with attaching angle irons and rocker treads;

Fig. 15 is a vertical longitudinal section of a simple rocker on the line 15—15 of Fig. 13, with attaching angle irons and rocker treads;

Fig. 16 is a side elevation, partly in section, of the upper portion of the car body locking means on the line 16—16 of Fig. 8;

Fig. 16a is a detail of a portion of the locking means;

Fig. 17 is a perspective of a simple trunnion bearing;

Fig. 17a is a perspective of a trunnion bearing with the mounting structure for the locking mechanism incorporated;

Fig. 18 is a perspective partly in section of a locking hook and its cooperating track ledge comprising a part of the locking mechanism;

Fig. 19 is a side elevation of a locking hook and its cooperating track ledge;

Fig. 20 is a side elevation of an intermediate bolster embodying the lower trackways and their trunnions and supporting bearings for the dumping cylinders;

Fig. 21 is a side elevation of the dumping cylinder supporting brackets;

Fig. 22 is a section on the line 22—22 of Fig. 20;

Fig. 23 is a plan of a control cylinder and associated mechanism;

Fig. 24 is a front elevation of a control cylinder and its associated mechanism on the line 24—24 of Fig. 23;

Fig. 25 is a side elevation of a control cylinder and its associated mechanism;

Fig. 26 is a horizontal longitudinal section of a control cylinder;

Fig. 27 is an end elevation of a car body including the door guide arms and hinges;

Fig. 28 is a detail plan of a corner of the car body illustrating the door clamp;

Fig. 29 is a horizontal section of the end of the car body, partly broken away, illustrating the supporting structure of the car body floor and end;

Fig. 30 is a vertical longitudinal section of a portion of the car body, illustrating the structure of the end of the car;

Fig. 31 is a vertical longitudinal section of a dumping cylinder;

Fig. 32 is a perspective of a door guide arm and its cooperating cam structure;

Fig. 33 is a vertical cross section detail of the car door and floor, illustrating a vertical intermediate rib and its hinge and seating stop, the door being in closed position;

Fig. 34 is a side elevation of the structure illustrated in Fig. 33;

Fig. 35 is a vertical cross section of the structure of Fig. 33, the door being seated in its fully opened position;

Fig. 36 is a perspective of the seating stop and attached hinge member, of the structure of Fig. 33;

Fig. 37 is a diagrammatic showing, partly in plan and partly in horizontal section, of the pneumatic control apparatus, the control cylinders and the dumping cylinders, illustrating the position of the parts in dumping the car body to the left;

Fig. 37a is a horizontal section of a balanced valve which may be embodied in the pneumatic control apparatus;

Fig. 38 is a diagrammatic showing, partly in plan and partly in horizontal section, of a portion of the pneumatic control apparatus, and two of the control cylinders, illustrating the righting position of the parts for righting the car from dumping to the left;

Figs. 39 to 43 are horizontal sections of the operating valve of the pneumatic control apparatus illustrating various positions thereof;

Fig. 50 is a study in rocker curvatures and their bearing on the paths of the center of gravity of the dumping body;

Fig. 51 is a side elevation, broken away slightly beyond the middle point, of a railroad dump car in its normal upright position embodying an alternative power mechanism;

Fig. 52 is a vertical cross section of the dump-car and mechanism shown in Fig. 51 on the line 52—52 thereof, illustrating the dump car in normal upright position;

Fig. 52a is an elevation detail of the dumping mechanism shown in Fig. 51.

Fig. 53 is a vertical cross section, partly diagrammatic, of the car body, and a portion of its supporting structure and the dumping mechanism shown in Fig. 51, illustrating one of the dumping positions of the car body;

Fig. 54 is a vertical cross section, partly diagrammatic, of the car body, and a portion of its supporting structure and the dumping mechanism shown in Fig. 51, illustrating the final dumped position of the car body;

Fig. 55 is a plan of a frame forming a portion of the car floor for cooperation with and as a part of the dumping mechanism of Fig. 51, illustrating the mounting and location of the frame in and as a part of the car floor;

Fig. 55a is a vertical longitudinal section of the frame and floor structure of Fig. 55 on the line 55a—55a thereof;

Fig. 56 is a plan of the cross-head, roller, and guide arms forming a part of the dumping mechanism of the structure of Fig. 51;

Fig. 57 is a side elevation of the structure of Fig. 56;

Fig. 58 is a horizontal section of a dumping cylinder and a portion of its mounting means forming a part of the dumping mechanism of the structure of Fig. 51;

Fig. 59 is a perspective of a portion of the mounting means of the dumping cylinder forming a part of the dumping mechanism of the structure of Fig. 51;

Fig. 64 is a side elevation broken away of an alternative form of car door, illustrating a vertical intermediate rib and its hinge and seating stop, a portion of the car floor being shown and the door being in closed position;

Fig. 65 is a vertical cross section of the structure illustrated in Fig. 64;

Fig. 66 is a vertical cross section of the structure of Fig. 64, the door being seated in its fully opened position;

Fig. 67 is a vertical cross section detail of the car door of Fig. 64 with modifications, illustrating a vertical intermediate rib and its hinge and seating stop, the door being in closed position;

Fig. 68 is a vertical cross section of the structure illustrated in Fig. 67, the door being seated in its fully opened position.

DESCRIPTION

Figure 44:
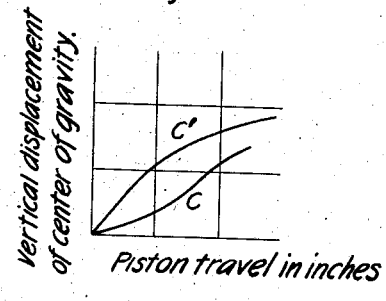
Figs. 44 to 47 are comparative power diagrams variously coordinating power requirements with piston travel and dumping angle.

Referring to Figs. 1 to 4 the dump car therein illustrated comprises trucks, an underframe, a car body, mechanism for maintaining the car body in normal position, and mechanism for effecting the tilting of the car body.

The trucks 1 of which there are as a rule two—one at each end of the car—may be of any standard design and are shown each to comprise two pairs of wheels 2 connected by axles 3. Each truck carries a truck bolster 4, which is provided with a depressed central bearing 5 and two projecting side bearings 6—6. The bearing 5 is provided with a central bore 7. (See Figs. 3.)

Underframe structure

Supported by the trucks is the underframe 8 which comprises two longitudinal I-beams 9—generally called center sills—extending the length of the car, and rigidly connected thereto five transverse bolsters, i. e., two end bolsters 10, supported by the truck bolsters 4 and generally referred to as the body bolsters, a central bolster 29 and two intermediate bolsters 21. The five bolsters are essentially of the same construction differing only in details, later to be pointed out.

The body bolster (Figs. 8, 9 and 11) consists of two brackets 11—11 of steel casing construction, and comprising a vertical end plate 12, two vertical sides 13, a horizontal base 14, and a horizontal web 13a, hereinafter called the trackway, is provided with an elongated slot 14a and ends in a ledge 15, hereinafter referred to in describing its uses as the track ledge, said ledges being strengthened by means of a reenforcing rib 15b. On the inner face of the sides 13, opposite the track ledge 15, are provided lugs 15a. The brackets are fixedly connected by means of their end plates 12 to the center sills 9 and to filler plates 48.

The two brackets 11—11 are tied together by two top plates 16—16 which at the same time serve as connecting members between the two center sills 9 (Fig. 2). The space between the plates 16—16 and the center sills 9—9 constitutes a slot-like aperture 16a. The brackets 11 are also supported and tied together at the bottom by a casting 17 (Fig. 8). The lower central part of the casting constitutes the upper face of a center bearing 18 provided with a king pin 19, and the outer lower parts of the casting constitute the upper faces of side bearings 20—20. The center bearing part 18 and the king pin 19 are adapted to cooperate with a center bearing part 5 and bore 7, and the side bearing parts 20—20 with side bearing parts 6—6 of the corresponding truck bolster (Fig. 3).

The intermediate bolsters 21 (see Fig. 20) are of the same construction as the body bolsters 10, except that the casting 17 of the body bolsters is replaced by a bottom plate 22. These bolsters form a convenient means of support for mechanism employed in effecting dumping of the car body. In the embodiment of the invention herein illustrated the bolsters 21 are accordingly provided on their inward sides 13 with extensions 23 which constitute bearings for the support on one side of dumping cylinders 151, 151 and 151', 151', respectively, later to be described. (See also Figs. 1–2.)

The central bolster 29 mounted midway of the car is identical in construction with the intermediate bolsters except that no extensions corresponding to 23 are provided on it.

The intermediate bolsters and central bolster are fixedly attached to the center sills in like manner as the body bolsters.

Transverse brackets 24 (Figs. 1, 2 and 21) are rigidly connected to the center sills 9 and to filler plates 49 (Fig. 21) to provide for the inner support of the dumping cylinders. The brackets 24 each consists preferably of a steel casting reenforced by means of a rib 25 and fastened together and to the center sills by a top plate 26 and a bottom plate 27. The ends of the brackets form bearings 28 for the support of the dumping cylinders opposite to and cooperating with the supports 23.

Additional connecting means for the center sills are also provided in the form of plates 26a so positioned as to serve with the plates 26 for the upper trackways at the brackets 25 and in pairs for the remaining upper trackways not provided by the plates 16.

On its two ends the underframe carries the platform 30 which may be of any standard design.

On each side of the platform is rigidly mounted a door guide cam 131 (Figs. 1, 2, 3 and 32) consisting of a substantially semi-circular lower portion 132 and a slightly curved upwardly extending portion 133. Two horizontal plates 134 reenforced by ribs 135 are provided on one side of the cam to attach it to the floor of the platform 30. On the side opposite to the plates 134 the cam is provided with a stud 136.

Car body structure

Supported by the underframe 8 is a car body 41, which is the part to be overturned in the dumping operation. It consists in its main parts of a floor 42, ends 43 and sides 101.

The car body floor (Fig. 30) consists of the floor proper 42 and its reenforcing structure. The floor proper is a matter of engineering design and as here shown comprises a wooden surfacing 47 carried on a steel plating 45 which abuts at the two ends of the car against angle irons 46. While I have illustrated the plating as consisting of a single iron plate, in practice it may be made up of a number of plates suitably fastened together; similarly the wooden flooring 47 shown as being in one piece will also be constructed of individual members.

The reenforcing structure, of which I have shown a preferred construction, consists of transverse and longitudinal members properly spaced and adequately fastened together, constituting a very simple and rugged girder construction.

In this construction the cross or transverse members, in addition to supporting and reenforcing the car floor, also constitute rockers for dumping the car body. Such assignment of two functions to a single member results in considerable saving of working parts and material, and in further advantages, one of which is to provide for a low and easily loaded car, while others will later appear.

For the transverse members of the reenforcing structures I here show cross-beams of two types; one, of which I have shown five bearing reference numeral 51, hereafter being referred to as composite rockers; the other, of which I have shown six bearing reference numeral 52, being referred to as simple rockers. It should be noted, however, that the number and character of rockers is a matter of choice and engineering design.

The composite rockers 51 (Figs. 8, 9, 12 and 14) are here shown to consist of an iron plate 54 having a straight upper edge and a symmetrical multi-curved lower edge.

The central portion 55 of the plate 54 is recessed and forms the direct supporting means for the car body on the underframe. It is preferably though not necessarily formed with a curved lower edge, preferably circular, to act as a rocker. Fastened to the two sides at the bottom of the portion 55 are curved angle irons 56, the flanges of which are in alignment with the lower edge of the portion 55 and constitute therewith the central operating part of the composite rocker, which will be hereafter referred to as the central rockers 59. The central rockers, as will be shown later, control the first stage of the dumping movement.

The portion 55 is also extended in the form of a central semi-circular downwardly projecting tooth 57, whose function will be described later.

To the left and right of the recessed central portion 55, the plate 54 has two intermediate portions 61, the lower edges of which are here illustrated as circular and described with a larger radius than that of the central rocker 59. Fastened to the two sides of the portions 61 are curved angle irons 62, the flanges of which are in alignment with the lower edges of the portions 61 and constitute therewith the intermediate operating parts of the composite rockers. These are termed the outside rockers and control the second stage of the dumping movement.

Each of the portions 61 also is extended in a downwardly projecting tooth 63, the function of which will be later described. The portions 61 terminate in curved indentations or notches 64.

Rightly mounted with the plates 54 are two pairs of oppositely disposed complementary castings, these being the castings 65 (Fig. 17) for the three middle composite rockers, and the castings 66 (Fig. 17a) for the two end composite rockers.

The castings 65 each consists of a curved bearing cap-like portion 67, and a mounting plate 68 connected therewith by a web 69 reenforced by a rib 69a.

The castings 65 are connected with the rockers 51 in such a manner that the bearing surfaces of their portions 67 form lateral extensions on each side of the notches 64.

The castings 66 include all of the parts of, and are similarly connected with their rockers 51 as, the castings 65. However, they comprise additional parts, to be described later on in connection with the locking mechanism with which they cooperate.

These castings 65 and 66 are in each case fixedly attached to longitudinal beams 83, hereinafter described, which are in turn fixedly attached to the rocker plates and car floor proper.

The notched portions 64 together with the castings 65 (or 66) control the third stage of the dumping movement, and will hereafter be referred to as the trunnion bearings. They are so positioned as to cooperate with the track ledges 15 in the dumping movement of the car body.

The outer parts of the plates 54, beyond the notches 64, have no function in the rocker movement and are shaped and dimensioned only with regard to structural considerations. They end in rectangular portions 72, and the lower edge of the plate slopes upwardly from the notches 64 to the end portions.

The cross-beams 52 (Figs. 13 and 15), referred to as the simple rockers, each consists of an iron plate 58, the central portion 55a of which has the same shape and is provided in the same manner with a tooth 57a and with angle irons 56a as the central portion 55 of the composite rockers. These constitute with their associated parts additional central rockers 59.

The outer parts of the plate 58 which end in a rectangular portion 72a have no function in the rocker movement and are shaped and dimensioned only with regard to structural considerations.

It is not necessary that the outside rockers, trunnion bearings and track ledges 15 should be either of the same number as or located in the same transverse planes as the central rockers. The functions differ, for the outside rockers, trunnion bearings and track ledges 15 are employed only in the occasional action of dumping; whereas the central rockers are employed also as the supporting means of the car body in normal upright position in receiving the heavy shock of loading and sustaining the weight in transportation.

In addition to the cross members just referred to the floor structure comprises at each end beneath the floor proper a transverse U-beam (Figs. 1 and 30).

The longitudinal members of the car floor comprise two outside U-beams 81 running the full length of the car and four rows of short angle irons placed between the cross-beams 51, 52 and 73 respectively. These angle irons are of two varieties, the central rows being U-beams 82 of considerable depth, and the two intermediate rows I-beams 83 of smaller depth. All of the longitudinal beams 81, 82 and 83 are fixedly connected to the cross beams by means of angle plates 85 and are also connected to the car floor proper 42. Furthermore, the cross-beams are connected by means of angle plates 86 to the car floor proper 42.

It should be noted that the rectangular end portions 72 and 72a of the cross-beams 51 and 52 respectively are shaped to fit exactly within the flanges of the U-beams 81. This provision tends to reduce the stress on the riveted or welded connection of the longitudinal and transverse beams.

From the foregoing it appears that the car floor proper, is supported and reenforced by a very simple girder construction of great strength and rigidity, well able to withstand all possible strains to which the car body may be subjected in the loading, hauling and dumping of its load.

*Rocker functions*

In addition to their function as structural members the cross-beams 51 and 52 as already pointed out also serve as rockers to control the dumping movement of the car body.

When the car body is in its normal upright position (as shown in Figs. 1, 2 and 4) the car body is supported by its central rockers 59, 59 bearing on the center sill, plates 16, 26 and 26a respectively. In this position the central teeth 57 and 57a mesh with the slot-like apertures 16a formed between the plates and the center sills, while the outside teeth 63 of the outside rockers mesh with the slots 14a.

The teeth 57, 57a and 63 are so shaped and positioned as to provide a positive locking of the car body to the underframe against lateral and longitudinal displacement in normal upright position and to serve as a guide to prevent longitudinal displacement in the dumping and righting movement of the car body. While I have shown a single tooth for the central rockers 59, 59, and a single tooth (on each side) for the outside rockers 62, the number, conformation and mounting of teeth is a matter of choice and engineering design.

In the first stage of the dumping movement (as shown in Fig. 5 in full lines) the central rockers travel on the center sill plates. In the second stage of the dumping movement (as shown in Fig. 5 in semi-dotted lines) the central rockers leave their track plates and the outside rockers engage and travel along their tracks 13a. In the third stage of the dumping movement, the outside rockers having reached the end of their trackways (Fig. 6) the trunnion bearings 67 engage the track ledges or trunnions 15, and the dumping movement of the car body which so far has been a combined tilting and lateral displacement becomes a plain tilting movement about the track ledges 15.

After the dumping of the car body has progressed beyond a certain point the teeth 63 on the raised side of the rockers 51 and the central teeth 57 and 57a leave their respective slots 14a and 16a, but the outside teeth 63 on the dumping side remain engaged with their slots, throughout the whole dumping movement.

The teeth 57 and 63 enter into mesh with their cooperating slots, with a degree of precision commensurate with the requirements of service, in controlling the travel in dumping as far as the contact and engagement of the track ledges with their trunnion bearings 67, and the return travel in righting until the central rockers are again in contact with their trackways, and the teeth 57 in mesh with their slots, which latter engagement results in correctly seating the car body in normal position along the median longitudinal line of the center sills.

As an additional means to prevent displacement of the car body in the last part of the dumping, the trunnion bearings are guided in a channel formed by the track ledge 15 and the bolster lugs 15a.

The foregoing description of the trackways and their track ledges 15 and the rockers and their trunnion bearings 67 has been with a view of presenting these features of invention broadly and in a manner readily to be understood. Precise proportions have been omitted, for the invention is not limited thereto. Thus, as brought out in the preamble hereof, the composition of the rocker system as a whole is a matter of choice in engineering design; for example, whether the recessed sector of the rocker cross-beams, referred to above as the central rockers, is a curve of long or short radius or a straight line, whether the curve of the outside rockers be circular or composite (whether with increasing or shortening radii) or a succession of isolated contacts, and whether the rocker relation be provided by the curvature of the rockers or of the tracks or both, and where the trunnion line or lines are located. Features entering into these considerations are attainment of a lower loading level, dumping at a distance from the track, power factors, stability and clearances. In the car herein shown in the drawings for purposes of illustration, I have shown particular proportions and dimensions having in mind these five factors and employing the features of invention now under discussion in a preferred manner. These I will now describe but upon the distinct understanding that the description is for illustrative purposes and does not constitute a limitation upon the invention.

The particular car illustrated herein is a typical thirty yard dump car of the center sill type and the dimensions of the car have been substantially followed. For example, in Figs. 3 to 7 inclusive the drawings originally filed as a part hereof follow the scale substantially of ¾ inch to the foot. Thus the two center sills of such a car are substantially 36 feet long and 15 inches in depth with their combined upper surfaces over all 20 inches in width, said upper surface being 3 feet 8 inches above the heads of the rails. The plate comprising the trackway for the central rocker may conveniently be 1 inch thick and extend laterally flush with the outer edges of the center sills. I have found it advisable to locate the upper surface of the lower trackways 13a substantially 4 inches below the upper surface of the upper trackway and to position the track ledges 15 thirty-five inches from the vertical plane passing through the median line of the center sills.

The curvatures of the central and outside rockers are herein illustrated (Fig. 5) as struck from the same center, well above the center of gravity of the car body and an ordinary load, to wit, from a point in the vertical longitudinal median plane of the car 8 feet 3 inches above the top surface of the upper trackway. However, tests have been conducted of refinements in the curvatures of the rockers and advantages have been indicated under certain requirements of practice in the employment of composite curves. This matter will receive subsequent treatment.

It will be seen (Fig. 5) that in the overturning position of the car body there is a point of travel at which the car body is supported both on the upper level and on the lower level of trackways simultaneously, the upper and lower curvatures of the rockers slightly overlapping as indicated in the drawing; for which, advantage has been taken of the recessed form of the I-beams constituting the standard railroad center sills 9.

The central rocker of the character illustrated as well as of the particular dimensions described is advantageous in economizing power at the beginning of the dumping movement when the inertia of the car body and its contents must be overcome. The overlapping of the curvature of the central rocker with that of the outside rockers assures a smoothness in travel as the weight of the car body and its contents shifts from the central rockers to the outside rockers, which further economizes power.

By means of outside rockers of the character illustrated as well as of the particular dimensions described the car body on continued tilting is given a smooth continuous movement, lateral as well as angular, economical of power by its conservation of momentum; in which movement the center of gravity of the car body is raised and is retarded behind the advancing vertical plane of support of the car body, factors which contribute to an automatic return of the car body to normal horizontal position on completion of dumping and of the cutting off of the power from whatever source employed to dump the car and to maintain it in dumped position.

The positioning of the track ledges 15 and their cooperating trunnion bearings 67 as just described affords a normal dumping angle for the car body of 45 degrees (which may be increased to 50 degrees) and a discharge of its contents at a considerable distance from the track rails and does so without interference by the car door in its fully open position with roadbed clearances. At the same time the center of gravity of the car body is further raised in the circular turning movement of the car body on its trunnions and is still kept to the rear of the vertical plane of the trunnions to assure automatic return of the car body to normal position as set forth in the preceding paragraph.

The curvatures of the central rockers and the outside rockers illustrated and as just described, and the positioning of the track ledges 15 and trunnion bearings have a further object, to wit, to afford stability to the car in dumping. If the dumping motion were too swift or if the center of gravity of the car body in dumping advanced beyond the vertical plane of its support the stability of the car would be lessened and the car might overturn itself in dumping under the influence of its own momentum and that of its contents; also great strain would be placed on the parts which must arrest the car body in its final dumped position. These detrimental features are avoided by giving the car stability in the manner just described.

The proportioning and positioning of the parts now under consideration as illustrated and just described contribute to economy of power as will later be shown in detail in connection with power diagrams. Generally speaking they provide for taking advantage during dumping of the momentum of the car body and its contents, and of the movement of the contents in the car body in advancing the center of gravity of the contents to assist in the tilting and rotating movement of the car body.

The said proportioning and positioning of the parts has a cushioning effect in the righting of the car body tending to diminish the strain on the parts which check and secure the car body in normal position. The center of gravity of the car body in righting follows a path gradually approaching horizontal after a preliminary circular descent. That this may readily be seen I have traced the path of the center of gravity of the empty car body in the dotted line $x$—$y$, Fig. 7. As will later be seen the positioning of the door in relation to the car body in righting may contribute to this cushioning effect.

A lower load level is obviously provided in the two-function characteristic of the recessed rockers whereby they constitute a structural part of the car floor as well as rockers and thus enable the upper surface of the car floor to be supported at a minimum distance above the center sills and also to be tilted for dumping from this initial line of support. The travel on the central rockers as shown is minimized to the over-all width of the center sills and the load is shifted to the lower trackways at points inside the outer edges of the central rockers for a continuance of the travel at the lower level from a point immediately below the edges of the center sills, thus providing a central rocker of minimum length of arc. By describing this arc with the long radius stated the curve is quite flat and has a short versed sine resulting in a normal position of the car floor at a short distance above the center sills. The center of the curvature and consequent length of the radius of the central rockers is in large part controlled by factors of clearance, power and stability of the car body in their relation to the curvature of the outside rockers and their cooperating trackways and the position of the trunnion bearings and cooperating track ledges above discussed.

From the foregoing it will be apparent that the structure is not limited to a system of castings embodying trackways and of plates embodying and bearing cantilevers and rockers. Questions of first cost, weight of material, maintenance costs and other matters of economy are for consideration in design, in which there is wide latitude of choice of expedients to realize the embodiment of the two functions of economical structure and economical operation.

*Car body ends and side doors*

The ends 43 of the car body (Figs. 27 to 30) consist each of a plate 91 reenforced by a transverse angle iron 92 extending across the top and by intermediate vertical ribs 93, the latter being fixedly connected to the plate 91 and to the angle iron 92. The ribs extend below the U-beams 73 and are inter-connected on their lower ends by means of an L-beam 94. The upper corners of the ends are also reenforced by gusset plates 95.

The ribs 93, the U-beams 73 and the L-beam 94 are fixedly connected together and with the car floor into a rigid structure, filler plates 95a being inter-connected between the ribs and the U-beams by means of angle plates 85.

The two sides 101 of the car body (Figs. 1, 4 and 33 to 36) are of the drop-door type, adapted to open outward and downward by gravity when the car is tilted for dumping. The sides 101 each consists of a plate 102 reenforced on the top and on the bottom by angle irons 103 and 104 respectively running the length of the side and by vertical intermediate ribs 105 and vertical end ribs 111. (Fig. 32.)

The ribs 105 consisting of channel irons or U-shaped beams are flush with and fastened to the side plate 102 and are made to conform with the angle irons 103 and 104 to which they are also fastened.

At each rib 105 a casting 106 (Fig. 36) is fixedly connected with the angle iron 104; the casting 106 is provided with a bore 107 through which it hingedly engages by means of a pin 117 the brackets 108 carried by the beam 81 of the car floor. A downward projecting portion 109 of the casting 106 acts as a stop for the door when in the fully dumped position of the car body it abuts against the bottom face of the beam 81 (see Fig. 35).

The end ribs 111 (Fig. 32) serve as operating members of the doors and are castings each consisting of a rib proper 118 and a portion 119 at right angles thereto, a bearing 112 and a portion 119 at right angles thereto, a bearing 112 and two horizontal projections on the top. Of these projections one, a clamp 114, serves to grip the upper corners of the car body ends 43 when the doors are in a closed position thereby stiffening the car body; and the other, projection 122, is provided for stiffening the upper corners of the doors.

The ribs 111 are attached to the doors by means of the portions 119 and the projections 122.

The portion 115 of the rib below the bearing 112 is called the door guide. It is provided at its lower end with a short projecting shaft 120 carrying a roller 116. The ribs 11 are hinged by bearings 112 and pivot 113 to brackets 121 carried by the U-beams 13. The hinge pins 113 and 117 on each side of the car body are in line, supporting the door and permitting operation thereof.

It should be noted that the door 101 is hinged below the line of intersection of the door plate 102 and the car floor plate 45, thereby allowing the door when fully opened to extend further than would be the case if the door were to be hinged in said line. This means provides for a greater reach of the car body in dumped position and it is further discussed below.

Door guide cam

The cams 131 and their studs 136 (Fig. 32) heretofore referred to afford a means for determining the desired positions of the door respecting the car body during dumping by selecting and designing their respective curvature and position in relation to the curvature of the rockers and location of their trunnion points. The selected curvature and position here illustrated are such as to make advantageous use of the door to assist in tilting the car, primarily at the peak of the power load.

In the normal upright position of the car body the cams 131 engage their respective rollers 116 in a position to maintain both doors in their vertical and closed positions. As the dumping of the car body starts, the rollers 116 on both sides of the car move along their respective cams. The rollers on the lowered side of the car body, under the influence of the weight of the door and the load pressing against the door, move down inwardly along the edge of the lower portion 132 of their cams allowing the door to open gradually (Fig. 5). The rollers on the raised side of the car body move up along the cooperating edges of the upward projections 133 of their cams which are extended as high as desired in order to prevent the opening of the door on that side until the car body has reached such a dumped position that the door on the raised side of the car is maintained closed by gravity alone (Figs. 5, 6 and 7). The bearing edges of the upward projections 133 thus are formed to follow the paths of the rollers in their rising movement with the door closed, and their curvature is then a function of the rocker curvature and the angular position of the car body.

As the dumping movement progresses the opening of the door accelerates to attain a substantially horizontal position shortly after the rockers leave their tracks and the weight of the car body and its load is shifted to the trunnion bearings 67 and the track ledges 15, at which time the power requirement for dumping theoretically is highest and it is advantageous to have the center of gravity of the door at its maximum distance from the trunnion. It must be borne in mind that with the rocker type of car herein illustrated under practical conditions the load on the pistons is not static. Because of this end of the momentum of the car body and contents, the peak of the power load comes shortly after the shift from the rockers to the trunnions. Consequently, as illustrated in Fig. 5a, the horizontal position of the door is not attained with the cams herein illustrated until the tilting of the car continues slightly beyond the point of the first contact of the bearings 67 with their cooperating track ledges 15.

Upon further progress of the dumping movement the car body 41 assumes the position shown in Fig. 6, the control of the door movement is transferred from the roller 116 and cams 132 to the door guides 115 and their cooperating cam studs 136. The door has passed beyond its horizontal position but still continues to exert useful leverage in tilting the car.

The final position in the dumping movement is shown in Fig. 7 in which the car body now supported by the trunnion bearings on the track ledges 15 is elevated by the pistons to a dumping angle of about 45 degrees. Here the door 101 is shown extended as an apron or chute in a plane approximately parallel to the plane of the floor of the car body, being held therein by the vertical end ribs 111 by means of the contact of the door guides 115 with the cam studs 136 and also being seated by the intermediate ribs 105 by means of the contact of their castings 106 and projecting portions 109 with the beam 81 of the car floor.

At this position of the dumping angle of 45 degrees the piston travel permits a further tilting movement to approximately the tilting angle of 50 degrees; which movement, under the control of the operator by means later to be described, does not change the seated position of the door just described.

In the righting movement, the cams 131 and their cam studs 136 cooperate respectively with the roller 116 and door guides 115 to close the door 101 on the lowered side of the car, which closure, with the relation of the parts above described, is effected substantially on the car body attaining horizontal position. The door reassumes the same sequential positioning for the different positions of the car body in righting as in dumping but in reverse order. The righting of the car body, under normal ordinary conditions, takes place solely under the force of gravity. The effect of the center of mass of the door in righting in its sequential positions respecting the car body is, during the early righting stages, to retard the speed of the return movement. As has been seen in the foregoing discussion the preferred curvature of the rockers is such as to tend to diminish the speed of the righting movement during the later stages of righting. Thus the curve of the cams 131 cooperates with the curves of the rockers to predetermine a smooth righting movement permitting the car body to come to rest in normal horizontal position without undue strain on the parts which arrest the car body in that position.

As the raised side of the car is lowered in righting its door remains closed by gravity during part or all of the movement and at least until the door guide rollers come in contact with the cam faces of the projections 133 down which they travel to normal positions and by which the door is maintained closed throughout the latter part of the righting movement. Upon completion of the righting movement it is seen, therefore, that both doors have been guided into their normal vertical positions and are then held by cooperation of their door guides 115 and rollers 116 with the cams 131.

As indicated above it is entirely within the province of the designer in selecting the curvature, extent and position of the cams and the cam studs in respect to their cooperating guide arms and rollers to meet the specific requirements of door control and operation of a car designed for a special load or service, or for average dumping purposes. This will be further elaborated.

Car body locking hooks

To secure the car body in its normal position against angular displacement there are provided four locking hooks 31 (see Figs. 16, 16a, 18 and 19). Each hook consists of a bifurcated casting 33 rounded at its bottom and there provided with an inwardly projecting nose 32, and bifurcated in its upper part to form two bearings 35, being reenforced by a web structure 34.

The hooks 31 are pivotally supported from the rockers 51 which cooperate with the body bolsters 10, by means of pairs of complementary castings, one of which is illustrated as casting 66 (Fig. 17a) previously referred to. These castings are fixedly attached to the said rockers 51, one pair at each end of the rockers and embracing the rocker plate. These are located, as previously described, at the curved notches 64. They are each provided with an elongated reenforced aperture 70 which is rounded at its upper end. The rocker plates are punched with apertures 70b coinciding therewith. A draft spring 38, one for each hook, is suitably positioned within the aperture 70, presses against a saddle plate 39 (Fig. 16a) and takes up the slack provided in the aperture 70. The saddle plate 39 is provided with a small cylindrical projection 39a which acts as a guide for the draft spring 38. The hooks 31 are pivoted to the complementary castings and rocker plates by pins 36 which extend through the apertures 70 and are carried by the saddle plates 39.

The outside edges of the bearings 67 in normal position lie approximately in vertical planes above the outside edges of the corresponding track ledges 15 and serve as inner stops 67a for the hooks 31. In the locked normal position of the car body each nose 32 of the hooks 31 engages the underframe at the bottom face of the track ledge 15, such engagement being automatically effected by gravity but assisted by compression guide springs 37, one each attached between the hooks 31 and stops 70a of the castings 66.

The slack in the aperture 70 provides for movement of the pins 36 to compensate for angular deviations in the position of the car body with respect to the underframe which may occur under running conditions. It may be noted that the draft springs 38 and guide springs 37 cooperate with gravity in tending to maintain the noses 32 in proper engagement with their track ledges 15 irrespective of such deviations and thereby lock the car in normal upright position, cushioned by constant spring pressure. Thus the car body may be said to have a floating support on the underframe.

When the car is to be dumped the hooks 31, on the side of the car body which is to be raised in dumping, are unlocked by suitable means, by preference operatively connected with the dumping mechanism. Means of this character will later be described.

After the hooks 31 have been disengaged from their cooperating track ledges 15 by their unlocking mechanism, the springs 37 press the hooks against the stops 67a where they remain in the upward travel of that side of the car body in dumping (Fig. 7). In the righting of the car body the rounded under surfaces of the lower part 32 of the hooks 31 as they descend contact and cooperate with the rounded upper surfaces of the track ledges 15, by reason of which the hooks are deflected outwardly compressing the guide springs 37 and on passing the track ledge the hooks reengage thereunder by reason of gravity and the guide springs 37.

On the dumped side of the car the hooks underlie the track ledges 15. In the righting of the car body they of necessity rise into locking engagement with the underside of the track ledges 15, thereby arresting the upward movement of the car body at normal position. The draft springs 38 permit a slight overbalancing of the car body on its return and thus afford a leeway for engagement of the hooks on the descending side of the car with their track ledge locking means.

Thus the hook structure and its method and means of support are such that on righting the car body the noses of the hooks inevitably engage on both sides of the car directly with their cooperating track ledges which are a rigid part of the underframe structure and lock the car in normal upright position.

Power mechanism

Referring now to the mechanism by which dumping is effected, for the embodiments of the invention herein illustrated, I prefer, as stated above, compressed air as a source of power.

As illustrated in Figs. 1, 2, 37 to 43 there are provided four dumping cylinders, 151—151 and 151'—151', two for each side of the car. The cylinders (illustrated in detail in Fig. 31) are shown as being of the oscillating telescoping type. They are reenforced and supported by saddles 152 which are provided with a trunnion 153 on each side. The trunnions 153 are pivotally supported, the outer trunnion by a bearing 154, and the inner trunnion by a bearing 154a. The lower parts of the bearings 154 and 154a comprise the extensions 23 and 28 (suitably lined) of the intermediate bolsters 21 and of the brackets 24 respectively; the upper parts of both bearings consist each of a plate 155 connected to the lower bearing by means of bolts 156.

The telescoping cylinders 151 each consists in its main part of an outer cylinder 161, an inner cylinder 162, and a piston 163. The outer cylinder 161 has on its upper end a flange 164 on which is bolted an annular head 164a.

The inner cylinder 162 is reciprocally positioned within the cylinder 161 and acts as a piston therein. It is provided at its upper end with a head 165, and at its lower end it is open and is provided with a flange 166, which acts as a guide for the cylinder in its reciprocating movement and also as a stop in the upward movement thereof in cooperation with the head 164a. The flange 166 extends inwardly to form an annular shoulder 167.

The piston 163 which is positioned within the inner cylinder 162, and adapted to reciprocate therein, is formed with a central socket 168 in which is rigidly connected by means of a pin 169 a piston rod 170.

The piston rod 170 projects through a bushing 171 of the cylinder head 165 and constitutes at its free end a cross head 172 which is pivotally connected with the car body floor by means of a pin 173 and brackets 174 fixedly supported by the I-beam 83.

The chambers formed in the cylinders 161 and 162 above their respective pistons are not airtight, but to exclude possibility of back pressure above the pistons, I provide atmospheric vents 175 and 176 in the upper ends of the cylinders 161 and 162 respectively.

In the embodiment of the invention herein particularly described it has been seen that the car body and its load are or may be under power for dumping throughout the dumping operation. The dumping angle attained by the car body in its final dumping position may be adjusted to the requirements of service, depending in part upon the character of the material to be unloaded. This dumping angle approximates 45 degrees under ordinary conditions. I have developed adjustable automatic means for determining this angle within useful limits at the will of the operator.

As illustrated these means comprise a check valve 177 in the piston 163 and a cooperating adjustable stop 178 in the cylinder head 165. When the valve 177 is open, by contact with the adjustable stop 178, pressure air beneath the cylinder 162 acting as a piston and beneath the piston 163 is bled to atmosphere through the vent port 176. This arrests upward travel of the piston 163. On the assumption that pressure air is still supplied beneath the piston the car body will be maintained approximately at the dumping angle but under certain conditions there may be a fluctuation of the piston 163 due to the inter-action of the check valve and the pressure air which causes oscillation of the car body and assists in clearing the load, these conditions obtaining generally where the center of gravity of the car body and so much of the load as has not been discharged is so located as to cause partial righting of the car body in the repeated opening of the valve 177.

Flexible pipe or hose connections 179 are provided between the cylinders 151 and the rigid pipe lines forming a part of the air control system to permit oscillating of cylinders.

In the normal condition of the dump car the connections 179 for all of the dumping cylinders as will appear are in communication with atmosphere. In this condition (as shown in Fig. 4) the inner cylinder 162 is in its lowest position. The piston 163, however, is somewhat raised from its lowest position, being suspended by means of the attachment of the piston rod to the floor of the car body, the additional piston stroke being provided for a further downward movement of the piston 163 when the car body in its dumping movement forces downwardly the piston rods on the side toward which it is dumped (Fig. 6).

To dump the car body, the locking hooks 31 having been disengaged in a manner and by means later to be described, air pressure is admitted to the dumping cylinders on the opposite side of the car from that toward which the dumping is intended, whereupon the air pressure exerted on the piston 163 and the bottom of the flange 166 of the piston 162 forces the pistons upwardly. As the cylinder 162 is normally free of the load it moves upwardly until it engages with its shoulder 167 the piston 163 which carries the load, whereupon the two pistons move upwardly in unison thereby lifting the car body. When (as shown in Fig. 6) the inner cylinder 162 has assumed a position whereby its flange 166 engages the head 164a of the cylinder 161, its further upward movement is stopped and the further lifting and dumping of the car body is effected by the piston 163 alone.

While, due to the just mentioned decrease of useful pressure area, less power is available for the further dumping movement, this reduction in available power—as will be later fully explained— is of no operating consequence, as from this point on little or no power is required to complete the dumping movement.

The upward movement of the piston 163 is preferably limited by the opening of the check valve 177 as previously described.

As will later be seen in the description of the air control system the chamber at the bottom of the two pistons may thereby be alternately opened directly to atmosphere and supplied with pressure air in such manner as to move the car body by a series of oscillations to assist in clearing the car body of its entire load; but throughout these oscillations the extreme dumping angle of the car body is automatically regulated by the check valve 177 and its adjustable stop 178 just described.

When the car body is to be returned to its normal position, the dumping cylinders 151 are brought in communication with atmosphere by the air control system to be described later, whereupon the pistons 163 and 162 as well as the car body itself are returned by gravity.

It may occur under adverse conditions that the car body will not be able to right itself by gravity alone, in which case air is admitted to the cylinders on the depressed side of the car body. This will be explained later on.

The preferred unlocking mechanism for the locking hooks 31 is shown in detail in Figs. 23 to 26.

The unlocking mechanism for each side comprises two unlocking or control cylinders 181 and 181' (Figs. 1 and 2), these actuated from the same power source as the dumping cylinders, and in case compressed air is used standard air brake cylinders may be advantageously adopted for this purpose. Such cylinders consist of a cylinder body 182 provided with a pressure head 184 and a non-pressure head 185. The cylinder body 182 is attached by means of a base plate 186 to the inward vertical plate 13 of the body bolster 10 and secured thereto by means of bolts 187. Within the cylinder 181 reciprocates a piston 188, to which is attached a piston rod 192, projecting through a bushing 193 of the non-pressure head 185. A compression spring 194 presses against the piston 188 and normally maintains it in its inward position. I provide three ports in the control cylinder, namely, one atmospheric vent port 195 in the non-pressure head, a port 196 in the cylinder body 182 and a port 197 in the pressure head 184.

The piston rod is provided with a cross head 200 which by means of a link 201 is connected with a lever 202, this lever being hinged in a fork-extension 203 of the outer vertical plate 13 of the body bolster 10. Suitable slots 204 and 204a are provided in the plates 13—13 for the passage of the lever 202. At a point intermediate its two ends the lever 202 is provided with a cam 205 which contacts with but normally does not press against the nose 32 of the hook 31.

When compressed air is admitted to the cylinder 181, via the inlet port 197, the piston 188, piston rod 192, link 201 and lever 202 are pushed outwardly and the cam 205 pressed against the nose 32 of the hook 31 thereby causing the hook to disengage from the under face of the track ledge 15.

For reasons later to be explained the travel of the piston 188 and the movement of the cam 205 are so proportioned and the ports 196 and 197 so located relative to the piston stroke that full disengagement of the hook 31, with a safe leeway, shall take place before atmospheric communication between ports 196 and 195 is cut off and power communication between ports 196 and 197 established.

On opening the control cylinders to atmosphere through the port 197 by the air control system the compression spring 194 returns the piston and the unlocking lever 202 to normal position.

*Pneumatic control apparatus*

The pneumatic control apparatus is shown diagrammatically in Figs. 37 to 43. It comprises as its manual operating part a main line valve 250 and two operating valves 212 and 212'.

The main line valve 250 is a three positioned valve of any suitable construction consisting of a valve housing 251, a rotary valve 252, and an operating handle 253. Three pipes 207, 208 and 208' are connected to the housing 251. The pipe 207 is a main supply pipe connecting the main valve with the source of pressure air. The pipes 208 and 208' are branch supply pipes leading to the operating valves 212 and 212'. The rotary valve is provided with a passageway 254 so formed that in one of the extreme positions the main valve establishes communication between the pipes 207 and 208, and in the other extreme position between the pipes 207 and 208'. In the intermediate position of the valve 250 the three pipes, 207, 208 and 208' are blanked.

The operating valves 212 and 212' are mounted on the platform 30 as shown in Fig. 3, one on each side. For convenience the valve 212 will be referred to hereafter as the righthand valve and valve 212' as the lefthand valve. The righthand valve is operated when the car is to be dumped to the left and vice versa.

As illustrated in Fig. 37 valves 250, 212 and 212' are only provided on one end of the car but if so desired this equipment may be duplicated so as to permit control from either end of the car.

The operating valves 212 and 212' are similar in construction and operation. It is preferred, though by no means necessary, that the valves be one a righthand valve and the other a lefthand valve, that is, that one of the valves be operated by movement in clockwise direction and the other in counter-clockwise direction. It is immaterial which of the two valves is a righthand valve and which a lefthand valve. As illustrated the valve on the right of the car is a righthand valve and the valve on the left of the car is a lefthand valve. The valves are of the rotary type and each consists in its main parts of a rotary valve, a valve body forming a seat thereof, and a valve housing. The rotary valve is provided with certain passages and a cavity and the seat of the valve body with cooperating passages. As will be apparent the positional relation of the said passages and cavity will be reversed where a righthand valve and a lefthand valve are employed. It is believed, however, that the valve structure and operation will be readily understood from a description of but one of the valves and for this purpose the righthand valve 212 is chosen.

The valve body 213 which embodies a valve seat for the rotary valve is provided with three passages extending through the valve seat parallel to the axis of the valve, to wit, a central passage 216 which leads to atmosphere, and passages 217 and 218 which connect with pipes 219 and 220 respectively.

The rotary valve 214 is provided with two passages 221 and 222 extending therethrough and parallel to the axis of the valve which in certain operative positions, later to be specified, coincide (but not simultaneously) with passages 217 and 218 respectively. There is also provided in the rotary valve a cavity 223 in its face which by means of its central part is in continuous communication with atmosphere via passage 216 of the valve seat, and which in certain operative positions of the rotary valve 214 is brought in juxtaposition with either one or both of the passages 217 and 218.

The housing 215 of the operating valve is in airtight connection with the valve body 213 and provides a chamber 215a above the rotary valve 214. The chamber 215a is in direct connection with the main line valve 250 by means of pipe 208.

The top of the valve housing 215 is provided on its periphery with semi-circular notches 226, 227, 228 and 229 and an elongated notch 230

(see Figs. 39 to 43), these notches corresponding with the five positions of the valve, denominated "normal", "lap", "dumping", "exhaust" and "righting."

As appears from the figures the sectors between the notches 226, 227, and 228 and 229 are of circular circumference but the radii of the sectors between the notches 229 and 230 and between the notches 230 and 226 increase in a clockwise direction and provide a stop on one side of each of the notches 230 and 226.

Fixedly connected with the rotary valve is a spindle 231 which is guided in a bushing 232 of the housing 215. This spindle 231 carries an operating handle 233 which is provided with a spring-biased latch 234 (see Fig. 39) of well-known construction.

It should be noted that if the latch 234 is brought in engagement with any one of the notches it is securely held therein by its spring, but can be disengaged from the notch if sufficient pressure is exerted on the handle whereby the handle is free to move clock-wise and counter-clockwise from any one of the notches 227, 228 and 229, but clockwise only from the notches 226 and 230, due to their stops above referred to.

Figs. 39 to 43 give a diagrammatic illustration of the various positions of the operating valve 212, which will be discussed hereafter in their connection with the rest of the pneumatic equipment.

Referring now to Fig. 37 and to the pneumatic apparatus connected with the righthand operating valve 212, the pipe 219 leads from the operating valve 212 to the ports 197 of the two righthand control cylinders 181. The ports 196 of these control cylinders are interconnected by a pipe 237 from which branches a pipe 238 leading to a double check valve 239.

The double check valve 239 comprises two valves 240 and 241 which cooperate with corresponding valve seats 242 and 243 respectively and move in unison, whereby, when valve 240 is open valve 241 is closed and vice versa. The valve 240, when open, establishes communication between the pipes 238 and a pipe 244 leading via the flexible connections 179, 179 to the righthand dumping cylinders 151, 151; and the valve 241, when open, establishes communication between the pipe 244 and a pipe 220' which leads to the passage 218' of the lefthand operating valve 212'. The double check valve is normally maintained by a light compression spring 246 in a position whereby the valve 240 is open and valve 241 is closed. Guides 245 are provided for proper guiding of valve 239 in its movement.

The lefthand pneumatic equipment illustrated in Fig. 37 is a duplication of the righthand equipment and the corresponding parts bear corresponding reference characters with the superscript."'" No specific reference to the construction of that appears necessary, but it should here be pointed out that the pipes 220 and 220' form cross connections between the equipments of the two sides of the car for righting purposes later to be described.

As will later be fully explained the operating valve can be connected with and supply air to the dumping cylinders on either side of the car. For dumping, the operating valve supplies air to the cylinders on its own side and for righting by power to the cylinders on the opposite side.

In describing the various positions of the operating valve in its cooperation with the pneumatic equipment governed thereby reference will be made primarily to the righthand equipment. In the schematic assembly drawing Fig. 37 the righthand (upper) equipment is in dumping position and the lefthand (lower) equipment is in normal position. This necessitates cross reference to the two sides of the equipments for ready explanation.

The "normal" position of the operating valve is shown in Fig. 39 (and schematically in the lefthand operating valve 212' in Fig. 37). In this position the passages 221 and 222 in the rotary valve are blanked and the cavity 223 coincides with the passages 217 and 218 in the valve seat, thereby connecting pipes 219 and 220 to atmosphere through the passage 216.

The "lap" position of the operating valve is shown in Fig. 40. In this position the passages 221 and 222 in the rotary valve are blanked, and the cavity 223 coincides with the passage 218 in the valve seat, thereby connecting the pipe 220 to atmosphere through the passage 216. The passage 217 in the valve seat is blanked, thereby closing pipe 219.

The "dumping" position of the operating valve is shown in Fig. 41 (and schematically in the righthand operating valve 212 in Fig. 37). In this position the passage 221 in the rotary valve coincides with the passage 217 in the valve seat, thereby connecting the pipe 219 to pressure air. The passage 222 is blanked. The cavity 223 coincides with the passage 218 in the valve seat thereby opening pipe 220 to atmosphere through the passage 216.

The "exhaust" position of the operating valve is shown in Fig. 42. In this position the passages 221 and 222 in the rotary valve are blanked and the cavity 223 coincides with the passages 217 and 218 in the valve seat thereby connecting pipes 219 and 220 to atmosphere through passage 216. It will be noted that this position of the valve parts corresponds functionally with their position in "normal."

The "righting" position of the operating valve is shown in Fig. 43 (and schematically in Fig. 38). In this position the passage 221 in the rotary valve is blanked. The passage 222 coincides with the passage 218 in the valve seat, thereby connecting the pipe 220 to pressure air. The cavity 223 coincides with the passage 217 in the valve seat, thereby connecting pipe 219 to atmosphere through the passage 216.

In the foregoing description of the positions of the operating valve it has been assumed for readiness of understanding that the chamber 215a is supplied with pressure air.

The relation of the various positions of the operating valves to the control cylinders and dumping cylinders is as follows:

In "normal" position it has been seen that the passages 217 and 218 with their cooperating pipes are connected with atmosphere. This relation of parts is illustrated in the lower half of Fig. 37 wherein the operating valve 212' is in "normal" position. Obviously the condition of the parts on the righthand side of the car would be identical therewith were the operating valve 212 in "normal" position. Referring, therefore, to the lower half of Fig. 37, it is seen that the pipe 219' being connected to atmosphere, the piston 188' of the control cylinder 181' is maintained by its spring 194' in its inward position, in which position the pipes 237' and 238' are connected to atmosphere via the ports 196' and 195'. The pipe 220 is connected to atmosphere by the cavity 223 and passage 216 of the righthand operating valve, assumed above to be in "normal" position. The pipe 220 being open to atmosphere the double check valve 239' is maintained in its normal position by its spring 246' closing its valve 241', and opening its valve 240' to atmosphere through pipe 238' as above described. Thus connection to atmosphere is established for the pipes 244, 244', the flexible pipes 179, 179' and the dumping cylinders 151 and 151', the pistons of which are in their normal position heretofore described in the discussion of Fig. 31.

The "dumping" position of the operating valve is as the term indicates employed for dumping the car, in which event the valve on the side of the car which is to be raised is placed in "dumping" position and the other valve is left in "normal" position. Such a condition of the parts is illustrated in Fig. 37 wherein the righthand (upper) operating valve is in "dumping" position and the lefthand (lower) operating valve is in "normal" position. To dump the car, the main line valve 250 is moved from its normal cut-off position to the position illustrated in full lines and air pressure is admitted from pipe 207 via main line valve 250, pipe 208, chamber 215a, passages 221 and 217 to the pipe 219 leading to the ports 197, 197 of the righthand control cylinders 181. The air pressure overcomes the thrust of the springs 194, 194 and forces the pistons 188, 188 outwardly. After a fixed travel of the pistons 188, 188 communication between respective ports 196 and 195 in each control cylinder is cut off and communication between ports 196 and 197 is established and air is admitted from pipe 219 to the pipes 237 and 238. The valve 240 of the double check valve being open (as pipe 220' remains connected to atmosphere through the lefthand operating valve) air is admitted from pipe 238 via pipe 244 and flexible pipe connections 179, 179 to the righthand dumping cylinders 151, 151, causing their pistons to move upwardly and start the dumping of the car body.

It has been explained in connection with the unlocking mechanism that cutting off communication between ports 195 and 196 and establishing communication between ports 196 and 197 only takes place after the piston 188 has traveled a distance exceeding that required for complete unlocking of its corresponding hook 31. Thereby, whether the two pistons 188 on the side to be unlocked move in unison or one is ahead of the other in its operation, no actuation of the dumping cylinders is initiated before both pistons 188, 188 have traveled a distance sufficient fully to unlock both hooks 31, 31 because no pressure can build up in the dumping cylinders 151, 151 as long as communication exists between the pipe 237 and either of the vents 195.

The "exhaust" position of the operating valve is for the purpose of exhausting the pressure air from the dumping cylinders and in its broadest aspect the operating valve is placed in "exhaust" position after dumping has been completed. Thus, for example, the righthand operating valve is turned to "exhaust" position when the control parts and dumping cylinders are as schematically shown in Fig. 37, the lefthand operating valve remaining in "normal" position as there indicated. It is immaterial whether or not the main valve is left in the position indicated in full lines at the time the righthand operating valve is placed in "exhaust" position or whether it is moved back to normal. As pressure air may be required in righting it may be assumed to remain in the position shown. In "exhaust" position it has been seen that both passages 217 and 218 with their cooperating pipes are connected to atmosphere. Connection of the passage 217 to atmosphere causes the air to exhaust from the control cylinders 181 via pipe 219; whereupon the pistons 188 being relieved from air pressure are returned by their springs 194 to their normal position. This reestablishes connection between ports 196 and 195. As the valve 240 remains open, pipe 220' being connected to atmosphere through the normally positioned lefthand operating valve, the dumping cylinders 151, 151 are now vented to atmosphere via pipe 244, valve 240, pipe 238, pipe 237, and ports 196, 196 and 195, 195.

The "lap" position of the operating valve is for the purpose of arresting the admission of air to the dumping cylinders at any point in the travel of their pistons and consequent dumping position of the car body, and of retaining in the dumping cylinders (subject to leakage) their then compressed air. Accordingly the operating valve will ordinarily be moved to "lap" position either from "dumping" position or "exhaust" position depending on whether it is desired to arrest the car in a position intermediate normal and dumping during the dumping operation or in full dumping position, or to arrest the car body in an intermediate position during righting. Assuming, for illustration, that it is desired to hold the car body in its full dumping position to the left and that the righthand operating valve is to be moved from "dumping" position to "lap" position, Fig. 37 may again be referred to. It has been seen that in "lap" position the passage 218 and its cooperating pipe are connected to atmosphere and the passage 217 and its cooperating pipe blank. The pipe 220' is open to atmosphere through the lefthand operating valve and check valve 241 is closed. Closing pipe 217 on moving the righthand operating valve to "lap" position maintains the existing pressure air condition and thereby retains the control cylinder pistons and the dumping cylinder pistons in the positions shown, holding the car in full dumping position. For reasons indicated in the above discussion of "exhaust" position the main valve may be assumed to be as shown in full lines in Fig. 37 when the righthand operating valve is lapped.

The "righting" position of the operating valve considered broadly from the standpoint of pneumatic control apparatus has a two-fold function: (a) to start and/or to move the car body from its full or an intermediate dumping position toward its normal position, completing the movement when necessary and (b) to assure the locking of the car body at the completion of its righting movement in the event that locking means are provided which are incidental to or controlled by the movement of the car body. To what extent and when the righting position of the operating valve may be employed depends upon the principle of operation of the dumping body and the design employed therein. Considerations entering into this, for example, are the relation of the points of application of power to the dumping body to the points of support of the dumping body on the underframe, and whether the dumping body is automatic or partly automatic in its return from a dumping position to normal position or of a type in which the return must be made solely by the application of power. In the design of car herein chosen for purposes of illustration the "righting" position of the control valve is available during the latter part of the righting movement to complete the movement and to assure the locking of the car body in normal position. Independent of these considerations, however, in the ordinary operation of the pneumatic equipment now under consideration the operating valve, the control cylinder pistons, the double check valve and the dumping cylinder pistons (albeit depressed below normal) on the dumped side of the car will be in normal position as shown in the lower half of Fig. 37 at the time the righthand operating valve is moved to "righting" position.

The righthand operating valve may be moved to "righting" position from either "lap", "dumping" or "exhaust" position. For purposes of illustration it may be assumed to be moved to "righting" position from the "dumping" position illustrated in Fig. 37. The main line valve should be in the full line position illustrated in Fig. 37 under these conditions to place the operating valve chamber 215a in communication with the compressed air source. Fig. 38 illustrates schematically the "righting" position of the righthand operating valve and its effect upon the control cylinders 181' and the double check valve 239' and should be considered in connection with Fig. 37 in the present explanation. Moving the righthand operating valve to "righting" position opens the pipe 219 to atmosphere and restores the control cylinder pistons 188, 188 and the pistons of the dumping cylinders 151, 151 to normal position in the manner above described in the discussion of "exhaust" position of the operating valve 212; the check valve 241 (Fig. 37) remains in normal closed position by reason of the connection of its pipe 220' to atmosphere through the normally positioned operating valve 212' (Fig. 37). Connecting the pipe 220 with pressure air on moving the righthand operating valve 212 to "righting" position closes the check valve 240' and opens the check valve 241'. The seating of the check valve 240' interrupts the connection of the dumping cylinders 151', 151' to atmosphere through pipe 238', pipe 237', port 196', 196' and port 195', 195'. The opening of the check valve 241' admits pressure air to the cylinders 151', 151', the movement of whose pistons effects either or both of the two functions above ascribed to the "righting" position of the operating valve.

In the event that the dumping body is automatic or partly automatic in its return to normal position it is desirable (though not compulsory) to cut down the rate of supply of compressed air to the cylinders on the dumped side when "righting" position is employed and to that end, with particular reference to the design of car herein shown for illustration, but by no means limited thereto, the passages 218 and 218' in their respective seats in the two operating valves are restricted as at 247 and 247' respectively.

Furthermore, and with a view of providing an elastic control of the compressed air employed in the "righting" position of the operating valve, I have provided as a refinement thereof an elongated notch 230 in the periphery of each of the operating valves. This elongated notch permits the operator to move his handle to-and-fro in the "righting" position and thereby to move the rotary valve to-and-fro across the passages 218 and 218' (restricted or not as desired) to regulate as he desires the supply of compressed air to the dumping cylinders.

Where the power requirements in righting permit, a factor of safety is added to the pneumatic control equipment by installing whistling safety valves 248 and 248', one each in the pipes 220 and 220', set to blow at a low pressure. These valves prevent the building up of pressure air in the cylinders on the dumped side and avoid unnecessary and undue strain on the locking mechanism in the event that the operator fails to move his handle from "righting" position to "normal" position on completion of locking. In this they obviously afford convenience in operation particularly in the event of individual control in a train of dump cars, permitting the operator to go the length of the train, placing the valves successively in "righting" position and moving them to "normal" position on his return.

As has been pointed out the sector of the "righting" position of the operating valve can only be approached in a clockwise direction. This prevents the inadvertent admission of pressure air into the dumping cylinders on the side of the car toward which it is desired to dump, with the attendant unexpected results possibly disastrous with certain types and designs of car, particularly in the event that the aforesaid restricted passages 247 and 247' and whistling safety valves 248 and 248' are not employed.

The extended side of the "righting" notch toward the "exhaust" sector prevents the movement of the operating valve from "righting", through "exhaust" to "dumping" position, thereby preventing accidental and unintentional reversal of movement of the car body when righting is desired.

It should be understood that these two factors of safety in the pneumatic control equipment are refinements in construction and operation and are not essential thereto.

A refinement in the foregoing pneumatic control apparatus in the line of safety but without change in the function or functioning thereof is illustrated in Fig. 37a. This comprises a balanced valve 237a, one each contemplated to be inserted at the junction of pipes 237 and 238, and at the junction of pipes 237' and 238'.

The balanced valve 237a comprises a valve body 238a illustrated as a hollow cylinder closed at the ends in open connection midway with the pipe 238 (238') and at each end with the pipe 237 (237'). The valve body is provided with webs 238b, 238b interiorly located one on each side of the pipe 238 (238') and each containing an aperture 238c substantially of the interior dimension of the pipe 237 (237') and serving as valve seats and as a mounting for a reciprocating valve. This valve comprises the valve heads 239a, 239a, the valve stem 239b and the spring seat 239c. The valve heads 239a are positioned to the outside of the webs 238b in the normal position of the valve, being there maintained by balance springs 240a and are of such form and construction as to close the openings 238c when moved by pressure air in a direction toward the pipe 238 (238') to closed position.

In operating, the reciprocating valve moves to close one or the other of the web openings 238c in the event that pressure air is built up on the outside of one of said webs in excess of that on the outside of the other. This operation of the valve should be apparent from the foregoing description and the drawing without elaboration.

The function of the balanced valve 237a is to prevent the effective admission of pressure air into the pipe 238 (238') and thence to the dumping cylinders on admission of pressure air to the control cylinders 181, 181 (181', 181') in the event that for any reason the pistons in one of the control cylinders are not moved to unlocking position. It has been seen that for pressure air to pass through a control cylinder to the pipe 237 (237') and thence to the dumping cylinders that control cylinder must be in unlocking position. With the balanced valve present the failure of either of the control cylinders 181, 181 (181', 181') to effect unlocking of its locking hook results in moving the unbalanced valve to a closed position with attendant cut-off of pressure air to the dumping cylinder.

With the foregoing described means and method of dumping, righting, and locking the car body in normal position it will be observed that by no manipulation of the power operating parts can the locking hooks be moved from their positions requisite for locking engagement with their respective track ledges on completion of the righting movement of the car body. This characteristic it must be understood is not limited to the precise means and method of operation illustrated. Thus, for example, the position of the car body may be employed as a determining means in affording this characteristic. The invention in respect thereto must not be considered as limited to the means and method illustrated.

It will be observed that with the foregoing particularly described means and method of dumping and righting the car body there are provided means affording safety in these operations. In dumping the ultimate dumping angle is predetermined and automatically controlled within limits of safety; in righting means are provided for preventing an excess of power and for assuring the cut-off of power on completion of the righting movement. These pertain not only to the protection of the car body against damage but broadly to the safety of operation of the car. It should be understood that the particular means and method shown are purely for illustration and that this characteristic of safety provision is not limited to the means and method illustrated.

GENERAL OPERATION

In the foregoing description of construction I have described the operation of many individual units or groups of closely associated parts of the invention, for the purpose of a ready presentation and understanding of the invention. The present description is directed to the operation of the invention as a whole and presupposes an understanding of the operation of these units or groups on the basis of the preceding description. For the sake of uniformity the description of the general operation of the car will be directed to the particular embodiment of the invention above described, but upon the understanding above set forth that no limitation upon the invention is to be interpreted therefrom.

Under normal running conditions the car body 41 rests on the underframe 8 in a substantially horizontal position (Figs. 1 and 4) supported by its central rockers 59, (that is to say, the central portions 59 of the composite rockers 51 and the central portions 59 of the simple rockers 52) on the top plates 16, 26 and 26a of the center sills 9. The rocker teeth 57 and 63 are in engagement with their respective slots 16a and 14a and safeguard against dislocation of the car body.

The locking hooks 31 are in engagement with the track ledges 15, thereby firmly but resiliently locking the car body to the underframe against angular displacement.

The doors 101 are in their normal position as sides of the car body, being held upright by engagement of the door guide rollers 116 with the outer faces of the cams 131. As the slack between the rollers 116 and the cams 131 in this position is negligibly small the doors are positively maintained in close contact with the ends 43 of the car body which they positively engage by means of the clamps 114.

The air equipment is in its normal position, i. e., the main line valve 250 is in its central position, thereby cutting off air supply from both operating valves 212 and 212'; the operating valves are in "normal" position, thereby connecting the pipes 219 and 220 (219' and 220') to atmosphere; the pistons of the control cylinders 181 are retained by their springs 194 in their seated positions; the valves 240 and 240' of the double check valves 239 and 239' are open; the dumping cylinders 151—151 and 151'—151' are connected to atmosphere; the inner cylinders 162 are seated on the annular heads 164a; and the pistons 163 depend from the car body near to the power head (Fig. 4).

For illustrative purposes assume that the car is to be dumped toward the left, it being understood that corresponding operations obtain when the car is dumped to the right.

In dumping to the left the main line valve 250 is turned to its righthand position to admit pressure air from its source to the chamber 215a of the righthand operating valve 212. The righthand operating valve is then turned to "dumping" position, in which position it is retained until dumping is completed. The air equipment thereby assumes the condition diagrammatically indicated in Fig. 37.

With the main and righthand operating valves in these positions, pressure air is admitted to the righthand control cylinders 181, 181. As air pressure builds up in these cylinders, the pistons 188 and the piston rods 192 move outwardly, whereby through the links 201 and the levers 202 and the cams 205 (Figs. 23 to 26) the hooks 31 on the righthand side of the car are disengaged from their cooperating track ledges 15.

In the further travel of the pistons 188 connection is established between the ports 196 and 197, thereby admitting pressure air through the now open valve 240, to the righthand dumping cylinders 151, 151.

Pressure air being admitted to the dumping cylinders the pistons 162 and 163 begin their upward movement sequentially as heretofore described, and start the dumping movement of the car body which will be described below in its successive stages.

It is apparent that the disposition of the load and the comparative elevation of the rails might be such that the resultant location of the center of gravity of the load and the car body would be sufficiently to the left to effect the initial dumping movement upon release of the locking hooks 31. While such a condition accords with economy of power afforded by the rocker feature of the invention, it is thought that a better understanding of the operation as a whole may be had if it is assumed that power is initially required.

Accordingly when the inner cylinders 162 engage their respective pistons 163 and the two sets of pistons begin their upward travel together, power is applied to raise the righthand side of the car body and dumping is initiated.

In its first stage the dumping movement consists of a combined angular and lateral displacement of the car body wherein the central rockers cooperate with their tracks 16, 26 and 26a, the outside rockers remaining out of engagement with their tracks 13a, all as above described.

As soon as the car body has assumed a sufficiently inclined position, the lefthand door begins to open downwardly by gravity. Due to the cooperation of the rollers 116 with cams 131, the door 101 on the left side of the car body is restrained in its opening movement and unfolds gradually with the progress of the dumping movement, as above set forth in detail.

On continued tilting of the car body, due to the coordination of the central and outside rockers the weight of the car body and its contents passes gradually from the central rockers to the left hand outside rockers, there being a transitory status (herein treated as a part of the first stage of the dumping movement) in which the weight is supported simultaneously by both rockers as shown in Fig. 5. This affords evenness and uniformity of travel with the attendant beneficial results above specified. This shifting of the load from the central rockers to the outside rockers does not disturb the gradual opening of the lefthand door now controlled by the cooperation of its door guide rollers 116 with the lower portions 132 of the cams 131.

Throughout the tilting during the first stage of the dumping movement, detrimental creeping of the rockers on their trackways is prevented by the engagement of the central teeth 57 and of the outside teeth 63 with their cooperating slots.

During this movement, the righthand door is maintained in its closed position by cooperation of the door guide rollers 116 with the upward projections 133 of the cams 131, which persists until on further tilting of the car body in a subsequent stage of dumping the inclination of the righthand door is such as to assure its continued closure by gravity.

In the second stage of the dumping movement the central rockers 59 leave their tracks 16, 26 and 26a and the outside rockers 68, traveling along the horizontal web 13a of the bolsters (as shown in Fig. 5 in dotted lines) take control of the dumping movement.

The character of the dumping movement will remain substantially the same as in the first stage of dumping, when controlled by the central rockers, namely, it will consist of a combined angular and lateral displacement. However, the relation between angular and lateral displacements may be different, this relation depending on the adopted curvature of the rockers. It should be noted that to alter the character of the dumping movement, in addition to, or instead of, varying the curvature of the rockers, the shape of the track may be varied. Thereby various desired dumping movements may be obtained.

Throughout the second stage of the dumping movement the opening of the door on the dumping side of the car body initiated in the first stage continues and is controlled by the cooperation of the rollers 116 and the lower faces 132 of the cams 131 on the dumping side of the car, as heretofore explained. The door on the raised side of the car remains closed, the cooperation of its rollers 116 with the upwardly projecting cams 133 assuring this closure during the first part of the travel and gravity during the second part. The contribution of the weight of the door on the dumping side to the movement of the car body during this stage of dumping has been gone into at length above and will not here be repeated.

As above stated during the second stage of dumping the righthand operating valve remains in "dumping" position in which it was placed to initiate the first stage of the dumping movement. The inner cylinders 162 operating as pistons in conjunction with the pistons 163 continue their upward travel together as a unit exerting maximum power.

Throughout the tilting during the second stage of the dumping movement, detrimental creeping of the rockers on their trackways is prevented by the engagement of the outside teeth 63 on the dumping side with their cooperating slots.

As tilting of the car body continues its composite rockers 51 travel on the webs 13a until the trunnion bearings 67 come into cooperation with the track ledges 15 which terminates the second stage of the dumping movement, as here treated.

In the third stage of the dumping movement the character of the motion is no longer that of a combined angular and lateral displacement but now becomes solely angular, the dumping proceeding around a fixed pivot.

As the outside rockers on the dumping side of the car body leave their trackways and the trunnion bearings 67 engage their respective track ledges 15 on starting the third stage of the dumping movement the function of preventing lateral creeping is taken over from the teeth by the trunnion bearings and track ledges and lugs 15a, and the teeth 63 on the dumping side of the car body function merely to prevent longitudinal creeping. This continues throughout the third stage of the dumping movement. It will be observed that the central teeth 57 and the outside teeth 63 on the raised side of the car body are no longer in engagement with their respective slots on starting the third stage of the dumping movement.

The door movement on the dumping side of the car body during the third stage of dumping has been explained in detail in the foregoing discussion of the relation of the lower cams 132 and the cam studs 136 to the rollers 116 and door guides 115 respectively and will not here be repeated. In brief, the relation of these parts is such as to make advantageous use of the door in economy of power in dumping. During the first part of the dumping movement in this stage the opening of the door continues under control of the cams 132 and the rollers 116 on the dumping side of the car and during the second part of the movement the control is taken over by the cam studs 136 and the door guides 115. Note Fig. 5a and the above description of the showing thereof. The arrangement of these door-controlling instrumentalities illustrated provides that the door reach a plane parallel to that of the upper surface of the car floor substantially coincident with the dumping angle attaining 45 degrees. When in this position the door may be considered as operating most advantageously as an apron or chute although as will be apparent it functions to this end during the latter part of the third stage of the dumping movement. As above stated, the ultimate dumping angle is a matter of engineering design based upon physical requirements, and the mechanism herein illustrated provides for an increase in the dumping angle to about 50 degrees, during which increase the door guide arms 115 leave the studs 136 and the door is maintained in its plane parallel with the floor of the car, being seated by the cooperation of the door stops 109 with longitudinal outside beams 81.

The foregoing assumes that in the third stage of the dumping movement the car is to be tilted to its final position (herein shown as a dumping angle of 45 degrees with an extra 5 degrees provided for in the mechanism). Under these circumstances the righthand operating valve is retained in dumping position until the final position of the car body is attained; whereupon, in the event that it is desired to retain the car in this position, it is moved to "lap" position.

During the early part of this stage of the dumping movement the inner cylinders 162 reach their final upward position, being there arrested by the annular heads 164a of the outer cylinders 161. The pistons 163 continue their upward thrust until their check valves 177 come into cooperative relation with their adjustable stops 178, as and with the results heretofore explained. This diminished power stroke is compensated for by the correlated position of the door respecting the car body, the momentum of the car body and its load, and the relation of the center of gravity of the car body and its load to the center of gravity of the car body itself, also above explained in detail.

It may well be again noted that the relation of the factors of cylinder power, rocker curvature, trunnion position and door opening is within the province of the designing engineer to be determined by the physical requirements and the results sought to be obtained. The relation illustrated and described herein is recommended but should by no means be considered a limitation of the invention.

In the event that it is desired to arrest the dumping movement prior to reaching the final position as above treated this may be done by shutting off the supply of pressure air to the righthand dumping cylinders when the desired dumping angle has been obtained by moving the righthand operating valve to "lap" position, employing the "exhaust" position to attain equilibrium in case of necessity. By proper manipulation of the righthand operating valve a stable intermediate dumping position of the car body may be established, as will readily be understood.

There are several factors which enter into the righting of the car which may well be noted. From the immediate foregoing it will be apparent that the car may be maintained in the "dumping" position, intermediate or final, by proper manipulation of the righthand operating valve (still assuming the car to have been dumped to the left). The intermediate position may be used when it is desired only partially to dump the car or when it is unnecessary or impossible to tilt the car to its final dumping position. Whether or not the dumping movement of the car body is arrested at an intermediate position or progresses to its final position the load, or so much of it as it is desired to dump, may not be completely discharged. Thus, for example, the door may rest upon an obstacle beneath and may be weighted down above by a portion of the load in the car. Difficulty of this sort may in some cases be overcome by moving the car forward or backward on the track with the car body held in its attained position or permitted to assume a greater dumping angle if in an intermediate position.

This method of overcoming the difficulty will in many cases not be satisfactory and by proper manipulation of the righthand valve by which air may be exhausted from, admitted to, or held in the dumping cylinders the car body and its door may be rocked on its trunnions and/or rockers, by which process the load, or so much of it as is desired, may be completely discharged.

It may be poined out that leakage and loss of power attendant on holding the car body in any desired dumping position for an extended time with the operating valve in "lap" position may be compensated for by supplying additional air to the dumping cylinders by moving the operating valve handle to "dumping" position.

When the load, or so much of it as desired, is completely discharged, the righthand operating valve is moved to "exhaust" position and the righthand dumping cylinder opened to atmosphere. Righting, door closure, and locking under normal conditions of operation will then be effected by gravity. Conditions may arise, however, where gravity alone is insufficient to complete the righting of the car and the closing of the door, and to effect locking of the car in normal position. In a car of the type shown it is primarily to meet these conditions that the "righting" position of the operating valve is provided. It will be recalled that when, for example, the righthand operating valve is in "righting" position air is exhausted from the righthand dumping cylinders and admitted to the lefthand dumping cylinders through a restricted opening, its pressure being controlled by a whistling safety valve. The "righting" position of the operating valve on the raised side of the car is effective in the righting, door closing, and locking functions when the points of application of power of the dumping cylinder pistons on the lowered side of the car are beyond the points of support of the car body rockers on the trunnions or trackways, a relationship within the control of the designer. As here illustrated the "righting" position of the operating valve may be effectively employed throughout the support of the car body on the central rockers and for the greater part of the support of the car body on the outside rockers. In the event that the righting, door closing, and locking is not completed by gravity alone the requirement for power ordinarily occurs well toward the end of the righting movement and with the design of car herein chosen for illustration ample provision is thus made to employ the "righting" position of the operating valve for the requisite application of power.

As the car body attains normal position the locking by engagement of the locking hooks 31 with their cooperating track ledges 15 is facilitated by compression of the draft springs 38 on the dumped side of the car, where the hooks, carried below the track ledges 15 in dumping, have risen into engagement with their under surfaces. By this compression of their draft springs the movement of the car body downward on the righthand side of the car body is accommodated sufficiently to permit the descending hooks on that side to pass downward and beyond the track ledges 15 and into engagement with their under surfaces.

On completion of the righting, door closure, and locking of the car in normal position the righthand operating valve is moved to "normal" position and the main line valve 250 is preferably moved to its central, i. e. cut-off position.

*Power characteristics*

The low power requirement for dumping cars made in accordance with the foregoing description of my invention will now be graphically presented in power diagrams. For purposes of comparative tests a model of a car was chosen whose dumping body was characterized by the same dimensions, the same pivotal (trunnion) line of overturning, and the same point of attachment of piston rod as the model of the car hereinbefore described, but without rocker travel, the tilting being initiated from the horizontal directly about the pivotal (trunnion) line. The results of these engineering tests are set forth in Figs. 44 to 47 incl. For ready description the model of the car overturning throughout dumping on its trunnions will be hereafter referred to as the "lift car", and the model of the car employing the rocker travel in conjunction with the trunnions will be referred to as the "King car."

In Fig. 44 the ordinates represent the vertical displacement of the center of gravity of the car body and the abscissae represent the travel of the piston in the dumping cylinders. Curves $c$ and $c'$ of Fig. 44 show the vertical displacement of the center of gravity in relation to piston travel for the "King car" and the "lift car" respectively. The curves relate to an empty car and do not take into consideration the effect of the door opening movement.

The force required at any selected point on the curves $c$ and $c'$ to continue the dumping movement is proportionate to the tangent of the angle enclosed between the line tangential to the curve at said point and positive portion of the abscissa axis. A comparison of the curves $c$ and $c'$ shows the characteristic advantage of the "King car" over the "lift car" during the early progress of the dumping movement.

Figure 45:
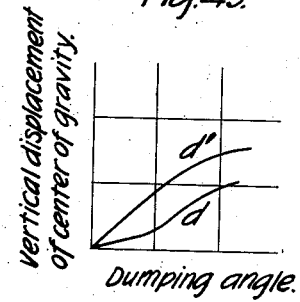

In Fig. 45 the ordinates represent the vertical displacement of the center of gravity of the car body and the abscissae represent the dumping angle of the car body. Curves $d$ and $d'$ of Fig. 45 correspond with the curves $c$ and $c'$ of Fig. 44 respectively and show, therefore, the vertical displacement of the center of gravity of the car body in its relation to the dumping angle of the car body instead of to the position of the dumping cylinder pistons. As in Fig. 44 the curves relate to an empty car body and the effect of the door opening movement is not taken into consideration. The same characteristic advantage of the "King car" obtains.

In the further progress of the dumping movement the center of gravity of the "King car" is raised more rapidly than before, but the force required to further the dumping movement does not increase in practice at the same rate due in part to the controlled opening of the door (momentum and angular relation to car floor), the shifting of the load, and the momentum of the car body and the load, as heretofore described. This is graphically shown in Figs. 46 and 47.

Figure 46:
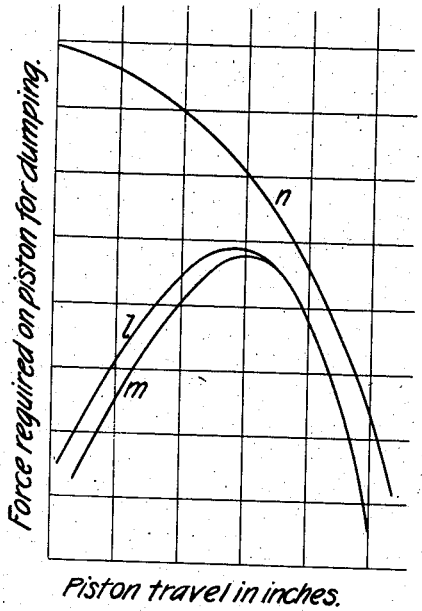
Figure 47:
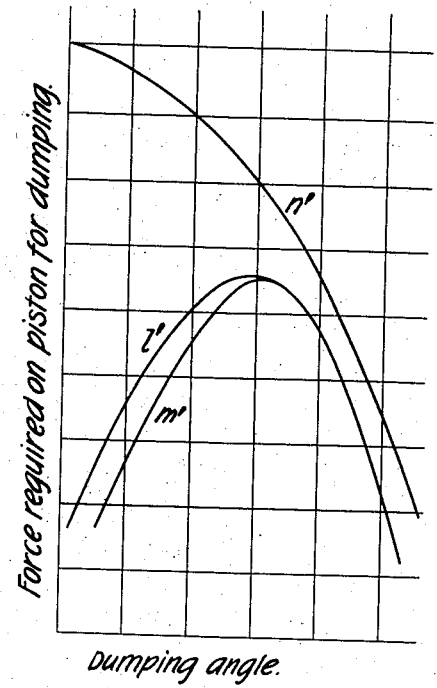

In Figs. 46 and 47 the force on the piston required for dumping is represented by the ordinates. The abscissae in Fig. 46 represent the piston travel and in Fig. 47 the dumping angle. Two sets of tests were made, one for step by step movement in dumping, and the other for continuous movement in dumping. The curves $l$ and $l'$ show the results of the step by step tests of the "King car." The curves $m$ and $m'$ show the results of the continuous movement tests of the "King car." The curves $n$ and $n'$ show the results of both the step by step and the continuous movement tests of the "lift car", i. e., the curves for the two sets of tests for the "lift car" coincide. The tests were made with identical full loads and with characteristic door operation, and the curves represent the average of the several readings in each case.

Examination of these curves (Figs. 44 to 47) shows that the "King car" by means of its characteristic relations of curvature of rockers and door guide cams employs gravity and momentum and energy of velocity to diminish both the maximum provision of power and also the aggregate total expenditure of force in operation. These economies in the car described herein appear in relatively smaller cylinders and elimination of storage reservoirs for compressed air.

At no point in the dumping movement does the power requirement for the "King car" equal that for the "lift car." The required force at the pistons is highest for the "lift car" in its static initial position, in which the practical contingencies of banked rails, unbalanced loads, etc., create the greatest need for surplus provision of power; whereas for the "King car" the peak load occurs when the car body and its load are in motion, and the obstacles of the foregoing contingencies have already been overcome.

The maximum power requirement for the "King car" is shown as about 35 percent less than for the "lift car", and the indicated expenditure of force as about one-half.

Dominating factors in power economy as thus described reside (1) in the predetermined relation of the center of gravity of the car body to the dumping angle of the car body during the tilting thereof; (2) the predetermined relation of the angle of the door opening to the dumping angle of the car body during the tilting thereof. By suitable coordination of these two relations the forces of gravity, momentum, and velocity are employed to best advantage commensurate with the other requirements of the car such as loading level, dumping position and location of dumped contents. Furthermore as seen by Figs. 44 and 45 marked advantage resides in the first relation independent of the second, and this would obviously be true of the second relation independent of the first. The determination of said relations for the most advantageous use of the forces of gravity, momentum and velocity in accordance with the broad teaching of my invention is independent of the use of rockers, cams and their coordinating curvatures. One reason for the choice of these parts for illustrative purposes herein is the flexibility and precision of control afforded by them in predetermining, and in executing without the use of intervening mechanism, the two important relations above enumerated. This is well illustrated in Figs. 48, 49 and 50. Before discussing these figures, however, it is important to note that the economy of power provided for need not be taken advantage of in reduced dumping cylinder size and air consumption. Surplus of power may be of more value in meeting the other requirements mentioned above, of lower loading level, higher dumping position and further deposit of dumped contents. Such surplus of power would be provided for, as indicated in Figs. 44 to 47, while keeping cylinder size and air consumption within the limits prescribed for other types of car not embodying the feature of my invention now under discussion and having no such power surplus.

Figure 48:
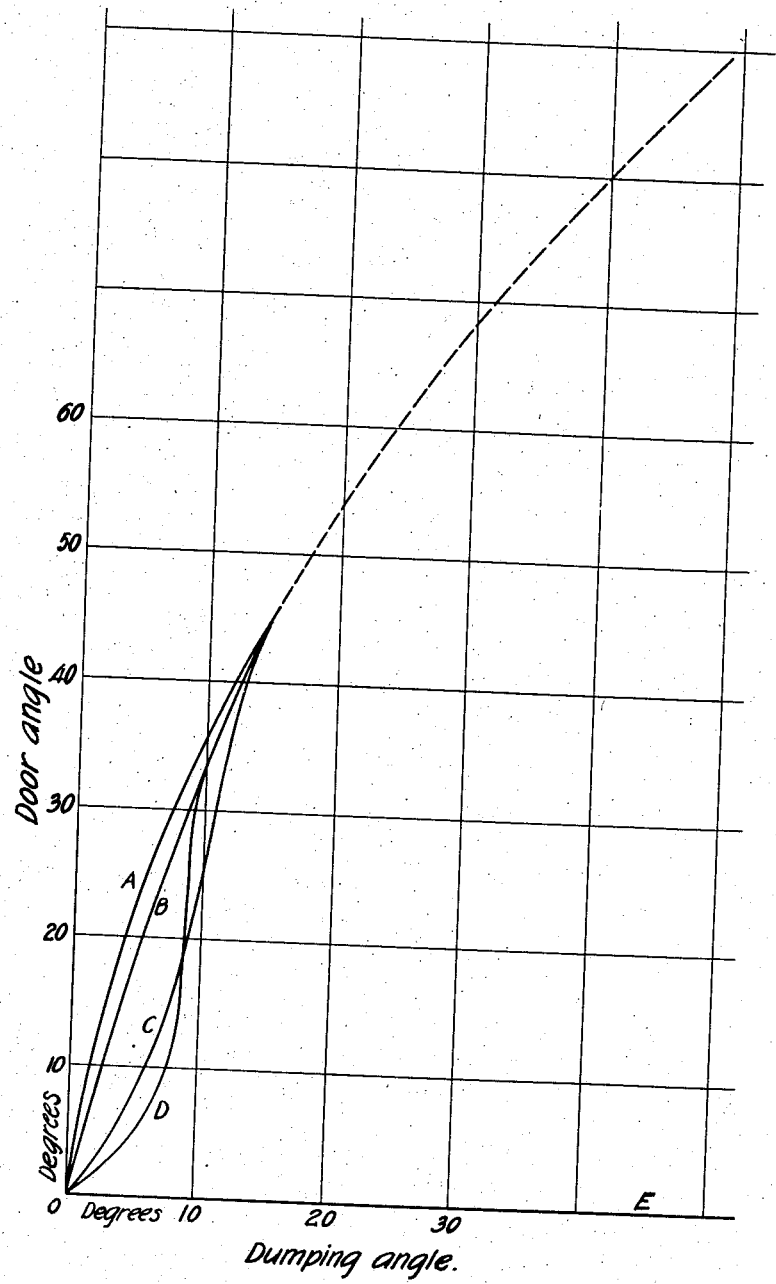
Figs. 48 and 49 are studies in door cam curvatures.

In Fig. 48 the abscissae represent the angular displacement of the car body and the ordinates the angular opening of the door in respect to the floor of the car body. Five curves are traced: E, coinciding with the axis of the abscissa for a door not opened, and A, B, C and D, representing varieties of more or less rapid door openings for comparison.

Figure 49:
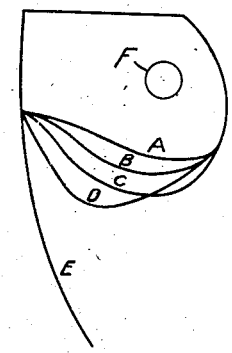
Figure 60:
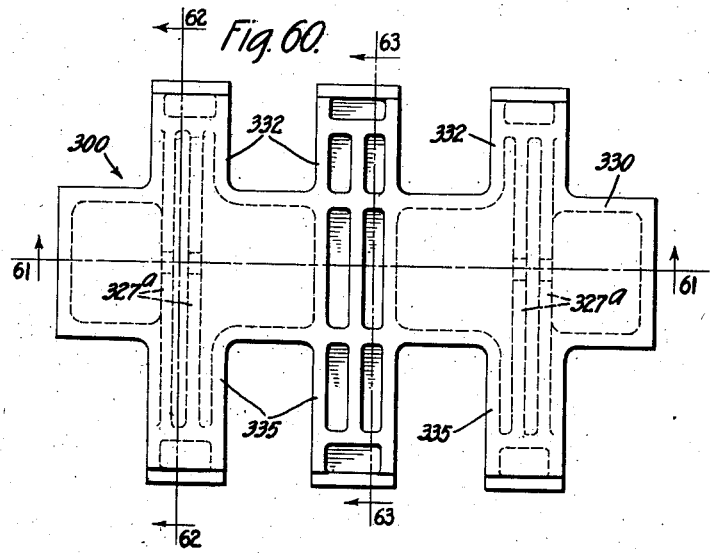
Fig. 60 is a plan of the frame of Fig. 55.
Figure 61:
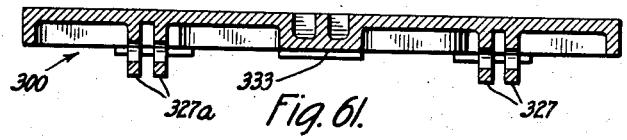
Fig. 61 is a vertical longitudinal section of the frame of Fig. 60 on the line 61—61 thereof.
Figure 62:
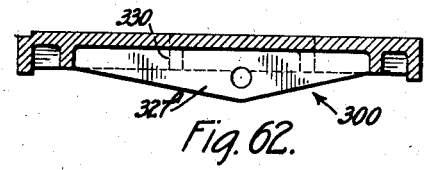
Fig. 62 is a vertical cross section of the frame of Fig. 60 on the line 62—62 thereof.
Figure 63:
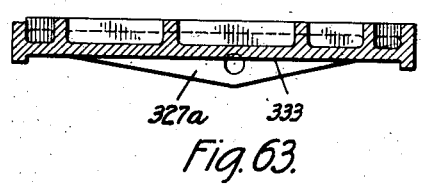
Fig. 63 is a vertical cross section of the frame of Fig. 60 on the line 63—63 thereof.

In Fig. 49 the curves A, B, C, D and E of Fig. 48 are translated into actual cam curvatures for the lower cam surface 132 heretofore illustrated and described. The cam curvatures of Fig. 49 are obviously for the cams on the lefthand side of the car as shown in Figs. 3 to 7. The cam stud 136 is illustrated by the circle F which is given a size and position in the figure to accord with any one of the curves A, B, C and D and is of the size and position of the cam stud 136 of the structural figures hereof. The dimensions represented in Fig. 49 chosen to accord with the particular embodiment of my invention illustrated in Figs. 1 to 7, are as follows. The common starting point of the curves (representing the inside contact point of the door guide roller 116 with the cam 132 in normal position) is 6½ inches below a horizontal plane coinciding with the top of the central rocker trackway and 56 inches from the vertical longitudinal median plane of the car in a line perpendicular thereto. The center of the cam stud is 3½ inches below the said horizontal plane and 47 inches from the said median plane in a line perpendicular thereto. The radius of the cam studs is 1½ inches.

Bearing in mind that the curve E in Fig. 49 corresponds with the path of the contact line of the door guide roller 116 during the tilting movement of the car body with the door maintained in its closed position, the flexibility and precision of control determinable by the lower cam surface 132 is very evident from Fig. 49, as the door may be controlled to open with cam curvatures lying anywhere between curve E and a horizontal line passing through the common starting point of the curves shown.

It has been above pointed out that at a predetermined point in the opening movement of the door the rollers 116 leave the cam faces 132 and the door guide arms 115 take over the control of the door in cooperation with the cam studs 136. In dumping the cam faces 132 afford a control means for door operation only so long as they offer resistance to the door guide arms and their rollers 116. When the path of those rollers prescribed by the rocker curvature and trunnion bearings and by the desired angle of door opening results in a cam of such curvature that the roller may take a free upward travel thereon, resistance is no longer offered to the opening of the door and the control is lost. Furthermore in righting a different system of leverage is introduced from that obtaining in dumping. In dumping the power to open the door is the weight of the door acting around the hinges. In righting the force of gravity acting on the center of mass of the car body as a whole (and additional power if necessary) is applied at the hinges to raise and close the door about the fulcrum provided by the cams and cam studs. The path of the hinges is upward. A fulcrum must be provided, therefore, as to impose a downward and outward movement of the door guide arms and rollers in order to raise and close the door. These two functions of the cams and cam studs are physically correlated. The point in the curvature of the cam where no further resistance would be offered to the door guide roller in dumping is identical with the point from which the roller in righting would tend to travel up the inner face of the cam rather than to retrace its path on the cam and operate to raise and close the door. This point is subject to ready determination when the designer has determined the curvatures of his rockers and the position of the trunnion bearings and the correlated cam curvature. The transfer of control from the cam to the cam studs should be sufficiently in advance of this point to effect the two functions just recited. The cam stud is illustrated as circular in form for cooperation with the door guide arm of straight face, as shown in the structural figures hereof, to provide that portion of door operation controlled thereby as particularly set forth in the description and general operation portions of this specification.

From the immediate foregoing it will be apparent that the cam stud is in its ultimate analysis a fixed cam for cooperation with the door guide arm to perform certain definite functions in door operation. Accordingly, the shape of the cam stud and the shape of the cooperating face of the door guide arm as also their relative positions become purely matters of engineering design in the carrying out of these functions, which, for example, may be effected by a suitable continuation of the cam face 132 in cooperation with the door guide roller positioned for coordination therewith. Obviously, therefore, my invention is not limited to the form and position of these parts chosen herein for illustrative purposes. Nevertheless, the off-set positions of the roller 116 and the cam stud 136 are effective devices to enable the designer advantageously to utilize the flexibility and precision of control of the dumping and righting movements heretofore described and discussed. The roller furnishes a leverage of fixed amount and frictionless contact, which may be employed in conjunction with the variable leverages provided by the cam stud contacts.

Referring now more particularly to the predetermined relation of the center of gravity of the car body to the dumping angle of the car body during tilting thereof, which has been recited above as one of the dominating factors in power economy, it will be recalled that in the structural figures hereof the curvatures of both central and outside rockers are described from the same center (Fig. 5), located well above the center of gravity of the car body. Smooth continuity of movement is assured in describing the curves from the same center and is made doubly sure by the curvature overlap, all as above described. It may be desired to give the car body motions and positions other than those incident to curves struck from the same center with radii of constant length for the central rocker and for the outside rockers respectively. Thus, for example, it may be necessary to elevate the car body during the dumping movement and desirable to accelerate this movement initially. This example will be used to illustrate in general how practical variations in position and motion may be brought about.

Fig. 50 is an illustrative diagram exemplifying a method of varying curvatures in any mechanical device to regulate the positions and motions of the car body. It is without stated dimensions, but composite rocker characteristics have been retained for illustration. The figure is prepared with the above-mentioned specific example in mind. The center of gravity of the car body is assumed to be at X. Two sets of curves are illustrated; RC, the set for a composite rocker in which the curves of the central and outside rockers are struck from the same center at S with a uniform length of radii for the central and outside rockers respectively (as shown in the structural figures hereof); and RD, the set for a composite rocker in which the curvature of the central rocker increases from the center toward the ends, and the curvature of the outside rockers decreases from the inside outwardly. The increasing curvature in the central rocker would tend to increase the speed of the dumping movement and diminish the power requirements in the first stage of dumping, and the decreasing curvature in the outside rockers would elevate the car body in the second stage of dumping and would tend to increase the power requirements.

Referring to the curve RD the sectors of different radii are each illustrated as of equal arbitrary angles. Starting from the median line contact of the central rocker with its trackway and considering the formation of the curve to the left for convenience: the first sector is struck with a length of radius commensurate with the desired curve as from the point S. The center S—1 for describing the next sector of the curve is then located in the final radius of the first sector at a distance from the centers commensurate with the sharper curve desired. In stepping down to the curve for the outside rocker the inside sector is struck from the center S—1 of the outer sector of the central rocker, although this is not essential. It may be struck from any center located in the final radius (or in extension thereof) of the last-named sector. From the initial inside sector on, the same method of continuing the curve, sector by sector, as described in connection with the curve for the central rocker is followed except that the centers U—1, U—2, etc., are located in extensions of respective final radii instead of in the radii themselves.

The various centers for the sectors to the right are indicated at the points T—1 for the central rocker, and V—1, V—2, etc., for the outside rocker.

The path of the center of gravity of the car body with the rocker curvature RC is indicated by the curve XY; that with the rocker curvature RD is indicated by the curve XZ. These curves are actual for the dimensions of the figure and plotted in well known manner.

Referring particularly to the curves RD and XZ in Fig. 50 it is seen by comparison with the curves RC and XY that there is accomplished a comparative downward movement of the center of gravity of the car body and its load following the initial application of power, securing thereby the important aid of velocity, thereafter employing such aid in an upward movement of the center of gravity, securing thereby a more gradual transition from the combined angular and sidewise travel on rockers to the purely angular movement around the trunnions, both heretofore described.

Furthermore, it will be evident that the movement and position of the car body during dumping can be correlated with the power requirements at the will of the designer without departing from the smooth continuity of movement desirable in dump car operation.

Broadly, therefore, the feature of my invention now under discussion resides in cooperating means for supporting a dumping body on an underframe which afford a low loading position and an elevated dumping position of the dumping body, and are variable at the will of the designer and determinable to provide such a path for the center of gravity of the dumping body during the dumping and righting movement as will economize power. In apparatus so characterized the preferred relationship of the supporting parts is such that the peak of the power load in dumping is reached after the dumping movement is under way so that the momentum of the dumping body and load and the energy of its velocity will assist in passing the peak.

In the light of the foregoing discussion of power characteristics it is believed that the previous statements as to the scope of this feature of the invention not being limited to the form and character of the parts employed for illustration should well be understood.

"Achilles lever" power application

It has been pointed out in the preamble of this specification that the preferred motive power for effecting dumping, and when necessary for effecting righting, is compressed air and it has been stated in connection therewith that direct application of power is preferable; further that two embodiments of this feature of the invention are illustrated for extending the reach of the directly acting parts to compensate for the sidewise travel of the car body and for the application of power commensurate with the requirements in the successive stages of the dumping operation.

The first of these embodiments, i. e., the telescopic dumping cylinder mechanism, has already been discussed. The second embodiment of this feature of my invention I have termed the "Achilles lever" mechanism. The telescopic cylinder is employed in the construction just discussed not because of known superiority over the "Achilles lever" mechanism but because of its common employment in dumping car practice, particularly where the car body is to be elevated during dumping.

The "Achilles lever" mechanism is illustrated in Figs. 51 to 63. The mechanism is illustrated in connection with the same embodiment of dumpcar as shown in the first form and the same reference numerals are employed where they apply. Consequently a description of the construction and operation of these common parts will not be here repeated.

The "Achilles lever" mechanism comprises a plurality of dumping cylinders (four being indicated) conveniently arranged in pairs, the cylinders of each pair being oppositely disposed on each side of the car and inclining upwardly toward one another.

The structure of each dumping cylinder illustrated comprises a housing 301 and a pressure head 301a with two sets of sidewise extensions 302, 302 which form guide rails for piston guides, later to be described. These guide rails are diametrically disposed in the line of the car in the plane of the axis of the cylinder. The inner side of each cylinder is provided with a base 304 to serve as a convenient means for mounting.

Rigidly secured to the under side of the center sills 9 is a supporting saddle 305, one for each pair of oppositely disposed dumping cylinders, to which the cylinders are rigidly attached by means of their respective bases 304. This saddle may be conveniently made hollow as is illustrated in Figs. 52 and 59. Additional mounting blocks 306, one for each cylinder, are rigidly attached to the center sills above the base thereof and the cylinder bases 304 are in turn rigidly attached to the blocks. Intermediate each pair of mounting blocks 306 the center sills are reenforced with a filler plate 48 as heretofore described in connection with the structure of Figs. 4, 5, 8, etc.

Communication is made with the air control system heretofore described (see, for example, Fig. 37) at the bottom of each of the cylinders as diagrammatically indicated by the broken away pipe extensions 179 and 179' which lead respectively to the piping 244 and 244' as heretofore described. The connection with this piping may be rigid, since the cylinders are rigidly mounted.

Within each cylinder is reciprocally mounted a piston 309 provided with a piston rod 310 which extends through a non-pressure head 308 removably secured to the top and comprising a part of the dumping cylinder. The check valve 177 and its cooperating adjustable stop 178 heretofore described are embodied in the piston 309 and head 308 respectively.

On top of each of the piston rods is mounted a cross-head 312 by convenient means, as with an attaching collar 311, the cross-head being apertured to receive the end of the piston rod. The cross-head is elongated in the line of the car and at each end has pivotally attached a lever 320 illustrated in the form of a bell-crank mounted for movement about its angular point in a plane preferably, but not necessarily, transverse to the car. One arm of the lever 320 (which arm, a matter of design) here illustrated as the outer arm 321, cooperates with means for arresting its upward movement at a predetermined point in the piston travel such as a flexible loose motion connection 324 attached at one end to the arm and at the other end to a stationary means of attachment such as the apertured lug 307 shown as mounted on the outside guide rail 302. The other arm of the lever 320, here illustrated as the inner arm 322, is employed in the dumping movement of the car, said arm 322 applying power either directly or indirectly or both, here illustrated as indirectly, as will later be explained.

The cross-head near each end is provided with downwardly extending guides 314 which reciprocate within the guide rails 302. These serve to maintain the alignment of the cross-head throughout its movement and to reenforce the piston particularly in its extended positions in sustaining leverage strains.

Mounted midway of the cross-head and above the upward end of the piston rod is a roller 319 through which the power of the piston is directly transmitted to the car body in the early phases of the dumping movement. This roller may be conveniently mounted on the cross-head by means of a shaft 318 mounted in suitable journals 317, so as to have free rotation in a plane transverse to the car.

On the arm of the lever 320 which is not attached as aforesaid by loose motion connection to a stationary part is mounted a short shaft 325 for actuation of a link 326, effective for the transmission of power in the later phases of dumping. This shaft 325 is mounted near to the end of its supporting arm on the outside thereof respecting the dumping cylinder; and its cooperating link 326 provides for loose motion in its lower part by means of the slot 328. The lower part of each link, as illustrated, is curved for clearance reasons. The upper part of each link is pivotally connected with the bottom of the car floor, as by a pivot 327, for movement in a plane transverse to the car.

The rigid mounting of the dumping cylinders on the underframe of the car as well as the location and number of the dumping cylinders are matters of design. When a rigid mounting is employed and two pairs of cylinders are used, clearances and advantageous application of dumping power indicate the positioning of the cylinders at the trackway for the intermediate composite rockers in the car illustrated in the embodiment of my invention first described and I have so illustrated. These trackways (including the supporting means for the telescopic cylinders) and their cooperating intermediate composite rockers (including their attaching angle plates 86) are accordingly omitted from the present illustration of the employment of the "Achilles lever" mechanism. It will be understood that the remaining trackways and their cooperating rockers will be accordingly strengthened to compensate for additional loads and strains to which they are subjected.

The floor of the car body above the "Achilles lever" dumping cylinders is suitably altered to accommodate the substituted transmission of power. To this end I may employ the frame 300 illustrated in Figs. 55, 55a and 60 to 63 inclusive.

This frame embodies a downwardly extending face 333 which serves as a runway abutment for the roller 319 and is of such size and dimensions as to provide for the entire path of the roller 319 during its dumping and righting action. The face 333 is illustrated as a rectangular plane lying in a plane parallel to the car floor, a construction and mounting well adapted to the construction and positioning of the "Achilles lever" mechanism carried on the underframe of the car as heretofore specifically described. Obviously these correlating parts should be designed for efficient cooperation, one with the other, and the abutment for the roller may accordingly take many forms. Thus, for example, if the roller has a movement transverse to the car it may be desirable to provide a socket abutment therefor; if it is desired to postpone the transition of power application from roller to link, hereinafter discussed, by extending the reach of the roller and prolonging its dumping contact the abutment may take the form of a downwardly and outwardly extending curve; such last mentioned curve may, if desired, be described with a view of aligning its radius at the point of contact of the roller with the piston rod 310 or of approaching such alignment as closely as the design of the car permits, thus increasing the effectiveness of the piston stroke; similar considerations apply to the form of the abutment for righting by power. It is believed that modifications of this character will be apparent without specific illustration herein.

The frame 300 also embodies two downwardly extending bifurcated journal brackets 327a (Fig. 61) for pivotal attachment of the links 326 as by pins or shafts 327.

The frame 300 (Fig. 60) is illustrated as a casting having a strong central web 330 with three inwardly extending members 332 and three outwardly extending members 335 by which suitable attachment of the frame to the car floor is made.

One of these frames is installed opposite each of the dumping cylinders. Referring to Fig. 52, in mounting the frames not only are the intermediate composite rockers above referred to omitted but also the longitudinal beams 83 between the composite rockers and the simple rockers 52 to the right and left thereof, the omitted longitudinal beams being substituted by the strong webs 330. The web 330 of each frame is rigidly attached at each end to the rocker plates 58 of the simple rockers adjacent the dumping cylinders to the right and left thereof and the frame members 332 and 335 are rigidly attached to the inside U-beams 82 and the outside U-beams 81 respectively.

In considering the operation of the "Achilles lever" mechanism it must be remembered that the present illustration assumes the employment of the pneumatic control apparatus heretofore described. Reference is made to the description and operation thereof without repetition. Likewise there are assumed to be present the control cylinders 181 and 181' with their attendant connections and unlocking mechanism. It will be apparent, therefore, that prior to the admission of pressure air to the dumping cylinders of the "Achilles lever" mechanism the car body will be unlocked on the side to be raised for dumping.

When pressure air is admitted to the cylinders of the "Achilles lever" mechanism on the right side of the car for dumping (following the previous assumption of dumping to the left, for purposes of illustration), the pistons rise and after a short lost motion herein provided for clearance purposes bring the rollers 319 into contact with their cooperating runway abutments 333. As the pistons continue to rise the right side of the car body is elevated, moving with a combined angular and sidewise travel, and carrying the runway abutments along the rollers to the left.

During this movement the levers 320 move upwardly with their cross-heads without effective change of relative position until the loose motion connections 324 are straightened to their full length. During this movement the links 326 are carried upwardly and to the left by their pins 327 pivoting about their shafts 325 and taking up the loose motion in the upper part of the slots 328.

When the loose motion connections 324 are extended to their limit on continued rise of the pistons the levers 321 pivot about their cross-head shafts, raising the links 326 which now take over from the rollers 319 the application of power. This transition of control is illustrated in Fig. 52a. From there on until the car body has reached its final position dumping is effected by means of the links 326.

In the construction herein illustrated the transition of power application from the rollers to the links occurs when the points of application of power by the links are approximately in line with the piston rods and the ratio of the effective power arm in the leverage system to the work arm is approximately 1:1. This arrangement of the parts assures the transition with negligible step-down in power application. The reach is extended gradually with corresponding gradual diminution in applied power. The curves of Figs. 44 to 47, while not of accurate application in the present consideration because taken with oscillating cylinders with a fixed point of piston rod attachment throughout the dumping movement, are generally applicable to the "Achilles lever" mechanism particularly in illustrating the gradual falling off in the power requirement during the latter part of the dumping movement. So gradual is the diminution of power from the point of transition that it is of little moment whether the peak of the power load comes slightly before, slightly after or at the transition point. Flexibility of design is thus afforded, as will be apparent. As here illustrated, following the precise design of car adopted for illustration with the telescopic cylinders and employing dumping cylinders rigidly mounted with due consideration for clearances, the transition point comes slightly in advance of the peak of the power load.

The transition of power application from the rollers to the links is a matter of predetermination to accord with the power demands dependent upon the particular design of car employed and is controlled by the lost motion of the lever 320 herein illustrated as determined by the loose motion connection 324. Whatever be the lost motion of the lever 320, that of the link 326 above the shaft 325 (if any is required, dependent upon design) should preferably be correlated therewith so that the link starts its transmission of power immediately upon the arrest in the upward travel of the lever power arm. The loose motion in the link below the shaft 325 is likewise provided for clearance purposes and where clearance does not demand, it may, of course, be omitted.

The "Achilles lever" mechanism is particularly adapted for use in dumpcars which contemplate extensive lateral movement in dumping and which require application of power throughout the dumping movement (though not limited to such types). The righting of such cars is primarily effected by gravity and as herein illustrated the application of power for righting is incidental to the latter part of the righting movement for effecting the completion of the righting movement, the closing of the doors and the locking of the car in the event that gravity does not suffice for these purposes. The point of the availability of the righting position of the control valves with the "Achilles lever" mechanism is determined in the same manner as with the telescopic cylinders, i. e., by the relation of the points of support of the car to the points of application of the power in righting. If the dumping cylinders are stationary the points of application of power for both dumping and righting depend upon the position and angular placing of the cylinders; if the cylinders are mounted for oscillation they depend upon the location of the cylinders and the angles contemplated to be assumed during the oscillation thereof. Obviously telescopic cylinders may be employed in the characteristic "Achilles lever" mechanism if desired.

*Extension door*

Among the objects of this invention heretofore discussed is the provision of employing the weight of the door as a power factor in effecting the dumping movement and at the same time using the door as an apron or chute for depositing the dumped contents of the car body at a distance from the tracks. The features of this provision exemplified in the structure heretofore discussed are augmented in the alternative door construction and mounting illustrated in Figs. 64 to 68 inclusive wherein the weight of the door is given a more advantageous leverage than in the construction heretofore considered and the reach of the door is extended beyond that of the said construction.

The augmentation of these features is brought about in the structures of Figs. 64 to 68 by further lowering and extending outwardly the pivotal points of support of the doors on the frame of the car. Two types embodying this characteristic are illustrated, one in Figs. 64, 65 and 66 and the other in Figs. 67 and 68. These differ in means for closing the opening between the door and the car floor during and at the completion of the opening of the door. In both alternative constructions the door is hinged to the outside girders of the car floor, preferably at the rocker plates, throughout the length of the car. A composite rocker broken away is chosen for convenient illustration.

Referring first to the construction of Figs. 64 to 66 inclusive the construction of the door as a whole is similar to that previously described. It embodies an iron plate 102a reenforced at the top with an angle iron 103 extending throughout the length of the door, and an angle iron 104a likewise extending throughout the length of the door and mounted opposite the car floor (in the closed position of the door). Also vertical ribs 105a are provided at each of the cross-beam rocker plates intermediate those at the ends of the car body, the whole being rigidly connected to form a solid door structure.

In this case, however, the plates 102a extend a suitable and convenient distance below the surface of the car floor so that when the door is in its open position they extend beneath the outer edges of the rocker plates and bridge the gap between the door and the floor. Furthermore, instead of the vertical U-beams of the previous structure I have shown castings. These castings 105a are formed with lateral flanges and the inner surfaces thereof conform and are flush with and attached to the plates 102a and the upright portions of the angle irons 103 and 104a. The flanges extend above with outward projections 262 which underlie and are attached to the outwardly extending portion of the angle irons 103. The outwardly extending portion of the angle iron 104a is cut away to admit the vertical beams, the flanges of which on each side are extended outwardly and laterally as is 263 to span the cutaway portion of the angle iron and to serve as an additional means of rigid attachment of the casting to the door structure. A third angle iron 260 running throughout the length of the door is rigidly attached to the bottom of the plate 102a and the lower portion of the casting 105a is made to conform therewith and is provided with outwardly and laterally extending flanges 264 for attachment thereto. Beneath these and to the outside the casting terminates in flanged stops 269.

The longitudinal U-beams 81 running the length of the side of the car body carry rigidly attached thereto downwardly and outwardly projecting bifurcated journals 266. These span a bearing 265 formed in the casting 105a and together therewith serve as hinge members for the door which pivots on the hinge pins 267. The plate 102a is cut away as at 271 opposite each of the journals 266 to admit their extension through the plate in the closed position of the door and for clearance during the range of door opening. A rigid stop 270 is mounted on the lower face of each rocker plate for cooperation with the stop 269 on the casting when the door assumes its completely opened position in a plane substantially parallel with the plane of the car floor as illustrated in Fig. 66 seating the door in this position.

The opening of the door in the structure shown for illustration is, as described in connection with the previous structure, controlled by the cooperation of the door guide arms 111 with cams 131 (see previous figures). This matter has been gone into in such detail above that it is not thought necessary to repeat any portion of the discussion at this point. It will, of course, be understood that the hinges between the car body and the door guide arms 111 will be aligned with the hinges 265—266—267 and that this new alignment will be compensated for in the position and formation of the cams 131 in their entirety (including their lower faces 132 and their upper faces 133 and their cam studs 136), adequate leverage being provided.

Eliminating, therefore, discussion of the means for controlling and effecting the opening and closing of the door and the relation of its angle of opening to the dumping angle and referring only to the two functions of the downwardly and outwardly extended points of hinge support above discussed: it will be observed in comparing Figs. 65 and 66 and therewith Figs. 33 and 35 and Figs. 4 to 7 incl. that as the door opens it is extended outwardly from the floor of the car with corresponding outward extension of its center of gravity, whereby the weight of the door is rendered more effective than that of the previously discussed structure in the dumping movement; and at the same time the reach of the door as an apron or chute is extended with the resultant deposit of the contents at a greater distance from the track than is heretofore provided.

In the modification shown in Figs. 67 and 68 curved spanning plates 272 replace the function of the lower extending portions of the door plates 102a of Figs. 64 to 66, i. e., prevents the spilling of the car body contents between the floor of the car and the door during and at the conclusion of the dumping movement. Except for this modification of the entire door structure is substantially identical with that of Figs. 64 to 66 incl. and a discussion thereof will not be repeated. The following differences may, however, be noted: The door plate 102b of the structure of Figs. 67 and 68 extends merely to the bottom of the car floor 45. This eliminates the angle iron 260 and permits the lower portion of the castings 105b to extend directly from the bearing 265b to the stop 269b.

The spanning plates 272 extend the length of the car door one each between adjacent intermediate vertical ribs 105b and between the last vertical intermediate rib near each end and the vertical end rib adjacent thereto. Each spanning plate is formed with a horizontal member for rigid attachment to the lower face of the angle iron 104b and a curved portion described from the hinge pins 267b of an extent to span the opening between the door plates 202b and the floor of the car 45 in the fully opened position of the door and to slightly underlie the floor plate 45, as illustrated in Fig. 68. The ends of the curved portions of the spanning plates lie in planes parallel with the cross-beam rocker plates. The ends of adjacent spanning plates in normal upright position of the car body lie to each side of the outer ends of the cross-beam rocker plates with which they form as tight a fit as practicable.

The longitudinal U-beams 81 are replaced by longitudinal L-beams 81b which extend the length of the car and by sections of L-beams 274 which extend between the cross-beam rocker plates. These L-beams are fastened in place by angle irons 85b, the L-beams 81b on the outside ends of the cross-beam rocker plates, and the L-beams 274 at the outer upward extremities of the cross-beam rocker plates immediately beneath the car floor structure to which they are rigidly attached; a sufficient space being provided between the longitudinal L-beams 81b and the sections 274 for the reciprocating movement therebetween of the curved members of the spanning plates 272. The bifurcated journal members 266 are rigidly attached to the L-beams 81b in like manner as to the U-beams 81 in the structure of Figs. 64 to 66, and stops 270 are provided. In the fully opened position of the door the inner edges of the spanning plates overlie the upper edges of the L-beams 81b which, under the weight of the matter being dumped, serve as supporting means therefor.

Except for the provision of the spanning plates 272 to prevent the escape of a portion of the contents on door opening, the operation of the structure of Figs. 67 and 68 is identical with that of Figs. 64 to 66 and accordingly will not be repeated.

The controlled extensibility of the door and correlated conservation of power here illustrated are attained by combination of control of door opening, previously discussed, with the particular means here discussed by which the amount of door extension is determined. But the controlled extensibility of the door in the broad aspects of this invention is not limited to the particular means illustrated and may obviously be attained by the provision of an extensible member or members associated with or forming an integral part of the door with or without a location of hinge line contributing to the extensibility. However extensibility is attained, it contributes a new factor to be taken into the design in selecting the desired angular and lateral door movement relative to the dumping angle of the car body, as well as a new expedient for extending the reach of the door as a chute. Any change in position of hinge line involves either change in cam design or a different motion of door opening, and it permits combination of both; or, a shifted center of gravity by means of an extended member of the door would shift accordingly the combined center of gravity of door and car body, and so permit a change of design. It is obvious that hereby a multiplied flexibility or range of choice in design is afforded by introduction of this added element; and that this advantage is obtained not extensively by adding mechanical parts but by intensive analysis of motions and inherent forces, although I am not thereby limited against employment of extensive apparatus.

Furthermore, the construction illustrated in Figs. 64 to 68 incl. are in themselves novel and useful, independent of the particular type of car and of the particular character of door control herein illustrated and, while contributing factors in the unitary design of the car chosen for illustrative purposes, should not be considered in their application as limited thereto.

The foregoing detailed description has been given for purposes of illustration and no undue limitation should be deduced therefrom, but the appended claims should be construed as broadly as possible in view of the prior art.

What I claim as new and desire to secure by Letters Patent, is:—

1. In a dumping device embodying a dumping body characterized by a low load carrying position and a high dumping position, and a base for supporting the dumping body, the combination of longitudinal and transverse floor supporting members for the body, the transverse members being operatively positioned as cantilever girders for supporting the body in all of its positions, being upwardly recessed at the middle, and being provided with trunnion bearings at their bottoms beyond the recessed portions; trackways carried on the base for cooperation with said transverse members, said trackways being depressed on each side of their middle portions for cooperation with the recessed structure of the transverse members and being provided with trunnions for cooperation with the trunnion bearings of the transverse members, the transverse members and trackways being characterized by a curved relationship such that in dumping the line of support of the body on the base travels outwardly from the center to the trunnions and advances beyond the center of gravity of the body to provide for gravity righting; pivotal connections between the sides and floor of the dumping body around which the sides of the body move to open outward and downward on the dumping side thereof in the tilting of the body, said pivotal connections being so located that in the dumped position the lowered side of the body extends the floor by a greater width than the height of the body; control means for the sides of the dumping body comprising arms on the sides and cams supported on the base for cooperation with the arms to predetermine the positions in dumping and righting of the lowered side of the body in relation to the body and to maintain closed both sides of the body in upright position; means for securing the dumping body in normal upright position comprising hooks flexibly attached to the body and rigid extensions attached to the base for cooperation therewith, the hooks being normally biased into engagement with their respective securing extensions; manually controlled power operated means for disengaging the securing hooks to permit tilting of the dumping body and for tilting the body, said means comprising interlocking devices preventing the application of power for tilting prior to disengagement of the securing means and embodying dumping cylinders and pistons and means for extending the normal reach of the pistons for continuous application of power during the tilting of the dumping body and means for automatically cutting off the application of power to determine the length of the stroke, substantially as described.

2. In a dumping device embodying a dumping body characterized by low load carrying position and a high dumping position, and a base for supporting the dumping body, the combination of longitudinal and transverse floor supporting members for the body, the transverse members being operatively positioned as cantilever girders for supporting the body, and being provided with trunnion bearings at their bottoms beyond the middle portions; supporting means carried on the base for cooperation with said transverse members embodying trunnions for cooperation with the trunnion bearings of the transverse members, the transverse members and supporting means being characterized by a relationship such that in dumping the line of support of the car body on the base travels outwardly from the center to the trunnions and advances beyond the center of gravity of the body to provide for gravity righting; pivotal connections between the sides and floor of the dumping body around which the sides of the body move to open outward and downward on the dumping side thereof in the tilting of the body, said pivotal connections being so located that in the dumped position the lowered side of the body extends the floor by a greater width than the height of the body; control means for the sides of the dumping body to predetermine the positions in dumping and righting of the lowered side of the body in relation to the body and to maintain closed both sides of the body in upright position; manually controlled power operated means for tilting the body, said means comprising dumping cylinders and pistons and means for extending the normal reach of the pistons for continuous application of power during the tilting of the dumping body, substantially as described.

3. In a dumping device embodying a dumping body characterized by a low load carrying position and by a high dumping position, and a base for supporting the dumping body, the combination of structural means for support of the body and its load or contents in low load carrying position and high dumping position and in a predetermined series of intermediate positions, comprising a plurality of transverse and longitudinal members, each transverse member of cantilever type constituting by means of its upper chord the support of the body and its floor and the load or contents, and by its lower contours embodying a relation of curvature between the opposing parts of the body and of the base whereby a series of positions is predetermined from the low load carrying position to the high dumping position and return therefrom, securing means for the low position of the body embodied in opposing parts of the body and of the base in contact in the low position of the body, manual controlled means operable to release the securing means in the act of dumping, automatic control means to isolate the securing means from the manual controlled means in all other conditions than the act of dumping, power means for movement from low position to high or intermediate position, and manual controlled means operable to apply the power means in aid of gravity to establish the low position of the body and contact of the body and the base therein and the operation of the securing means therein and thereby.

4. In a dumping device embodying a dumping body characterized by a low load carrying position and by a high dumping position, and a base for supporting the dumping body, the combination of the sides or a side of the dumping body attached thereto in such manner as to permit outward and downward opening of the side by gravity, side connecting means for extending the floor of the body in the dumping position of the body by a width greater than the height of the side, side control means to control the opening of the side by gravity characterized by a relation of curvature embodied in opposing parts of the side and of the base, the side control means predetermining the series of positions assumed by the side in opening by gravity and in closing against gravity, securing means for the low position of the body embodied in opposing parts of the body and of the base in contact in the low position of the body, manual controlled means operable to release the securing means in the act of dumping, automatic control means to isolate the securing means from the manual controlled means in all other conditions than the act of dumping.

5. In a dumping device embodying a dumping body characterized by a low load carrying position and by a high dumping position, and a base for supporting the dumping body, the combination of structural means for support of the body and its load or contents in low load carrying position and high dumping position and in a predetermined series of intermediate positions, comprising a plurality of transverse and longitudinal members, each transverse member of cantilever type constituting by means of its upper chord the support of the body and its floor and the load or contents, and by its lower contours embodying a relation of curvature between the opposing parts of the body and of the base whereby a series of positions is predetermined from the low load carrying position to the high dumping position and return therefrom, the sides or a side of the dumping body attached thereto in such manner as to permit outward and downward opening of the side by gravity, side connecting means for extending the floor of the body in the dumped position of the body by a width greater than the height of the side, power means for effecting movement of the body in dumping and righting embodying a system of levers inoperative under heavy burden and automatically operative under diminished burden to extend movement of the power means, and adjustable automatic control means to divest and thereafter alternately apply and divest the power means at predetermined angle of dumping.

6. In a dumping device embodying a dumping body characterized by a low load carrying position and by high dumping position, and a base for supporting the dumping body, the combination of structural means comprising a cantilever support of the body and its floor and the load or contents thereof and a relation of curvature embodied in the opposing parts of the body and of the base, thereby predetermining a series of positions of the body with relation to the base, and also thereby effecting the convenience and economy of two functions of strength and of motion in one structure; the sides or a side of the dumping body attached thereto in such manner as to permit outward and downward opening of the side by gravity; side control means to control the opening of the side by gravity characterized by a relation of curvature embodied in opposing parts of the side and of the base, the side control means predetermining the series of positions assumed by the side in opening by gravity and in closing against gravity; power means for effecting movement of the body in dumping and righting; manual control means for governing said power means, and adjustable automatic control means to divest and thereafter alternately apply and divest the power means at predetermined angle of dumping.

7. In a dumping device, in combination, an underframe comprising longitudinal center sills and a dumping body provided with central rockers and outer rockers and tracks for said central and outer rockers, whereby the track of the central rocker is substantially on a level with the top of the center sills, and the track of the outer rockers is depressed below said level; the dumping of the body being controlled in its initial stage by the central rockers and in the further stage by the outer rockers.

8. A normally upright dumping body and controlling mechanism for the dumping thereof, said mechanism including rockers of two varieties individually positioned lengthwise of the body, whereby the rockers of one variety control the dumping movement from a low normal upright position to an intermediate dumping position and the rockers of the other variety control the dumping movement from the intermediate position to a final higher dumping position, the rockers of both varieties being simultaneously effective only in said intermediate position.

9. The combination of a dumping body and control mechanism for the dumping thereof, said mechanism including central rockers and outer rockers and tracks of different levels for the two kinds of rockers, the control of the dumping movement being initially effected by the central rockers and passing thereafter to the outer rockers, whereby at the point where the control passes from the central rockers to the outer rockers, the effective portions of the two kinds of rockers are parts of circles having a common radius.

10. In a dumping device having a base provided with a center sill, a dumping body provided with rockers having central portions to support the body at a low loading level in normal position on said center sill, and outer lower portions to control the dumping of the body in a relatively high position.

11. In a dumping vehicle, a carbody and a supporting underframe therefor, locking hooks connected to the carbody and engaging the underframe to normally maintain the carbody locked thereto and equalizing springs to permit slight movement of the carbody relative to the underframe in the locked position.

12. In a dumping mechanism for vehicles, a motor cylinder and a fluid actuated piston moving therein, manual means which when placed in operated position admit fluid to said cylinder, adjustable control means partly associated with the cylinder and partly with the piston for venting pressure fluid from the cylinder and effective to predetermine the position of the piston and thereby the dumping angle and to retain the piston in this position in spite of the manual means being in their dumping position.

13. In a dumping vehicle, in combination, an underframe and a carbody supported thereby, said carbody being provided with drop-doors, gravity-opened as the dumping of the carbody progresses, door guides embodying bearing faces and offset rollers connected with the doors and cams connected with the underframe, the bearing faces and offset rollers of said guides and cams cooperating to control the opening and closing movement of the door.

14. In a dumping vehicle, in combination, an underframe and a carbody supported thereby, said carbody being provided with gravity-opened drop-doors, members of two characters attached to said doors to control the opening movement thereof, mechanism connected to the underframe to cooperate with said members of the car doors in the control of the opening movement, whereby the members of each character are instrumental in different parts of the dumping movement.

15. Air controlled mechanism for a dumping vehicle including an operating valve, said operating valve being provided with a plurality of operative positions including dumping and power righting positions whereby the operating valve is free to move in both directions of rotation, from and to a plurality of the operative positions, but only in one direction from and to one of the operative positions.

16. In a dumping vehicle, a carbody normally locked in its upright position and a plurality of mechanisms to unlock the carbody on each side of the car; motor cylinders to dump the carbody when actuated by fluid pressure, and means to prevent the fluid pressure from actuating the motor cylinders unless all the unlocking mechanisms on the side from which the carbody is to be dumped have completed their operation, said last named means including a fluid interlock to atmosphere between the unlocking mechanisms.

17. In a dump car, a dump body, fluid operated cylinders on one side of the car to dump the carbody towards the opposite side and cylinders on the opposite side to right the carbody after such dumping has been effected; an operating valve in one position of which air is admitted to the dumping cylinders and in another position of which air is admitted to the righting cylinders; locking means normally maintaining the body in upright position; and a fluid interlock to atmosphere between the dumping cylinders and the locking means.

18. In a dump car, a carbody and fluid operated cylinders to dump and right the carbody, an operating valve having a plurality of operative positions including a normal position, a dumping position, and a righting position, the righting position being accessible from the normal position only by way of the dumping position.

19. In a dump car, a carbody normally locked in its upright position, means to unlock the carbody when it is to be dumped, fluid actuated cylinders to raise one side of the carbody for the purpose of dumping or righting of the carbody, selective control means to actuate the unlocking means in case the cylinders are operated for dumping but not when they are operated for righting.

20. In a dumping vehicle, a dumping body, tension locking means to lock positively and automatically said carbody in its normal upright position and unlocking mechanism to act upon the locking means for the unlocking of the dumping body; fluid actuated cylinders to effect the dumping of the carbody, fluid being admitted to the cylinders for the purpose of dumping only in case the unlocking mechanism has effected the unlocking of the dumping body.

21. In a dumping vehicle, a normally locked dump body, pressure actuated unlocking cylinders, pressure actuated motor cylinders, said unlocking cylinders also acting as admission valves for the motor cylinders, and a fluid interlock to atmosphere between the unlocking cylinders to prevent actuation of the motor cylinders before completion of unlocking.

22. In a dump car, a carbody normally locked in its upright position, unlocking means to unlock the carbody for its dumping, fluid actuated power cylinders to raise one side of the carbody for the purpose of dumping or righting of the carbody, selective control means to actuate the unlocking means only in case the power cylinders are operated for the purpose of dumping but not when such cylinders are operated for the purpose of righting.

23. In a dumping device, an underframe comprising longitudinal center sills, a dumping body provided with central and outer supporting members, and central and outer trackways on said frame for engagement by said supporting members, said central trackway being substantially on a level with the top of the center sills and the outer trackways being depressed below said level.

24. In a dump vehicle, in combination, an underframe comprising a center sill and a trackway and a trunnion at each side of and below the top of the center sill, said trackways being intermediate the center sill and the trunnions; a body resting upon the center sill when in horizontal position and tiltable to either side onto the trackway and thence onto and upon the trunnion; a power cylinder upon and adjacent each side of the underframe; and power-transmitting means connecting each cylinder with the adjacent side of the body.

LANDRETH H. KING.